US011139722B2

(12) United States Patent
Velderman et al.

(10) Patent No.: US 11,139,722 B2
(45) Date of Patent: Oct. 5, 2021

(54) MOTOR HAVING AN EXTERNAL HEAT SINK FOR A POWER TOOL

(71) Applicant: Black & Decker Inc., New Britain, CT (US)

(72) Inventors: Matthew J. Velderman, Baltimore, MD (US); Andrew E. Seman, Jr., Pylesville, MD (US); Daniel J. White, Baltimore, MD (US); Paul Becke, Stewartstown, PA (US); William A. Rigdon, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 16/281,475

(22) Filed: Feb. 21, 2019

(65) Prior Publication Data

US 2019/0273421 A1 Sep. 5, 2019

Related U.S. Application Data

(60) Provisional application No. 62/637,810, filed on Mar. 2, 2018, provisional application No. 62/641,008, filed
(Continued)

(51) Int. Cl.
*H02K 9/22* (2006.01)
*H02K 11/215* (2016.01)
(Continued)

(52) U.S. Cl.
CPC .............. *H02K 9/22* (2013.01); *B23B 45/02* (2013.01); *B24B 23/02* (2013.01); *B25F 5/008* (2013.01);
(Continued)

(58) Field of Classification Search
CPC .. H02K 9/08; H02K 7/14; H02K 5/15; H02K 3/02; H02K 11/27
(Continued)

(56) References Cited

U.S. PATENT DOCUMENTS

| 3,353,042 A | 11/1967 | Baumann |
| 4,839,547 A | 6/1989 | Lordo et al. |

(Continued)

FOREIGN PATENT DOCUMENTS

| DE | 839064 C | 5/1952 |
| DE | 3147501 A1 | 6/1983 |

(Continued)

OTHER PUBLICATIONS

EP ESSR dated Aug. 2, 2019 in co-pending EP application 19160235.8.

*Primary Examiner* — Jose A Gonzalez Quinones
(74) *Attorney, Agent, or Firm* — Amir R. Rohani

(57) ABSTRACT

A motor assembly is provided with a stator including a lamination stack forming a stator core, stator teeth inwardly projecting from the stator core, and stator windings wound around the stator teeth in connected in phases. A rotor is rotatably disposed within the stator with a shaft, a rotor lamination stack mounted on the shaft, and at least one bearing mounted on the shaft. An external heat sink is provided including a main body defining a hollow opening form-fittingly receiving the stator therein in thermal communication with the stator. A bearing support structure is provided having a main body radially arranged and secured the main body of the external heat sink, the bearing support structure forming a central bearing pocket arranged to receive and support the bearing of the rotor therein to axially and radially support the rotor with respect to the heat sink.

12 Claims, 65 Drawing Sheets

Related U.S. Application Data on Mar. 9, 2018, provisional application No. 62/693,564, filed on Jul. 3, 2018.

(51) Int. Cl.

| | |
|---|---|
| *H02K 5/10* | (2006.01) |
| *H02K 7/08* | (2006.01) |
| *H02K 21/16* | (2006.01) |
| *B23B 45/02* | (2006.01) |
| *B24B 23/02* | (2006.01) |
| *B26B 15/00* | (2006.01) |
| *H02K 5/16* | (2006.01) |
| *H02K 5/20* | (2006.01) |
| *H02K 7/116* | (2006.01) |
| *H02K 7/14* | (2006.01) |
| *H02K 9/06* | (2006.01) |
| *B25F 5/00* | (2006.01) |
| *H02K 5/15* | (2006.01) |
| *H02K 5/18* | (2006.01) |

(52) U.S. Cl.
CPC ............. *B26B 15/00* (2013.01); *H02K 5/10* (2013.01); *H02K 5/15* (2013.01); *H02K 5/161* (2013.01); *H02K 5/18* (2013.01); *H02K 5/20* (2013.01); *H02K 7/083* (2013.01); *H02K 7/116* (2013.01); *H02K 7/145* (2013.01); *H02K 9/06* (2013.01); *H02K 11/215* (2016.01); *H02K 21/16* (2013.01)

(58) Field of Classification Search
USPC .................................................. 310/50, 64
See application file for complete search history.

(56) References Cited

U.S. PATENT DOCUMENTS

| | | |
|---|---|---|
| 4,961,016 A | 10/1990 | Peng et al. |
| 5,331,238 A | 7/1994 | Johnsen |
| 5,630,461 A | 5/1997 | CoChimin |
| 5,763,969 A | 6/1998 | Metheny et al. |
| 5,770,933 A | 6/1998 | Larson et al. |
| 5,783,881 A | 7/1998 | Best et al. |
| 5,877,576 A | 3/1999 | CoChimin |
| 5,925,947 A | 7/1999 | Kajiwara et al. |
| 5,982,074 A | 11/1999 | Smith et al. |
| 6,047,765 A | 4/2000 | Zhan |
| 6,084,328 A | 7/2000 | Yamashita et al. |
| 6,093,990 A | 7/2000 | Meeks et al. |
| 6,104,112 A | 8/2000 | Vanjani |
| 6,111,235 A | 8/2000 | Ritter et al. |
| 6,118,202 A | 9/2000 | Pinkerton |
| 6,163,097 A | 12/2000 | Smith et al. |
| 6,181,048 B1 | 1/2001 | Smith et al. |
| 6,411,002 B1 | 6/2002 | Smith et al. |
| 6,411,006 B2 | 6/2002 | Suzuki et al. |
| 6,734,584 B1 | 5/2004 | Browne et al. |
| 6,765,326 B1 | 7/2004 | Nakazono et al. |
| 6,833,649 B2 | 12/2004 | Suzuki et al. |
| 6,876,550 B2 | 4/2005 | Sri-Jayantha et al. |
| 7,183,689 B2 | 2/2007 | Schmidt et al. |
| 7,365,464 B2 | 4/2008 | Brown |
| D576,941 S | 9/2008 | Evon et al. |
| 7,541,713 B2 | 6/2009 | Cheng |
| 7,633,194 B2 | 12/2009 | Dawsey et al. |
| 7,642,679 B2 | 1/2010 | Riedl et al. |
| 7,812,487 B2 | 10/2010 | Bi et al. |
| 8,384,256 B2 | 2/2013 | De Filippis |
| 8,410,645 B2 | 4/2013 | Lau |
| 8,415,842 B2 | 4/2013 | Lau |
| 8,525,375 B2 | 9/2013 | Pal |
| 8,803,377 B2 | 8/2014 | Lau |
| 8,823,234 B2 | 9/2014 | Ortt et al. |
| 8,844,118 B2 | 9/2014 | Hessenberger et al. |
| 9,124,145 B2 | 9/2015 | Lau |
| 2002/0171324 A1 | 11/2002 | Smith et al. |
| 2003/0067228 A1 | 4/2003 | Vanjani |
| 2003/0079860 A1 | 5/2003 | Hoffmann et al. |
| 2004/0135465 A1 | 7/2004 | Smith et al. |
| 2005/0005588 A1 | 1/2005 | Jager |
| 2006/0012263 A1 | 1/2006 | Smith et al. |
| 2006/0082271 A1 | 4/2006 | Lee et al. |
| 2006/0192448 A1 | 8/2006 | Hill |
| 2006/0284511 A1 | 12/2006 | Evon et al. |
| 2008/0083527 A1 | 4/2008 | Horng et al. |
| 2008/0084141 A1* | 4/2008 | Schueren ............... H02K 5/225 310/68 B |
| 2008/0150375 A1 | 6/2008 | Shima |
| 2008/0238237 A1* | 10/2008 | Nishihama ........... H02K 17/165 310/166 |
| 2008/0290745 A1 | 11/2008 | Riedl |
| 2011/0001368 A1 | 1/2011 | Lau |
| 2011/0278966 A1 | 11/2011 | Osborne et al. |
| 2011/0278970 A1* | 11/2011 | Lau ........................ H02K 5/18 310/63 |
| 2011/0298313 A1 | 12/2011 | Osborne et al. |
| 2012/0133223 A1* | 5/2012 | Liu .......................... H02K 9/14 310/62 |
| 2013/0076174 A1 | 3/2013 | Wibben et al. |
| 2013/0209076 A1* | 8/2013 | Groves ................ F26B 21/001 392/410 |
| 2013/0229071 A1* | 9/2013 | Lau ........................ H02K 5/08 310/43 |
| 2014/0015356 A1 | 1/2014 | Chamberlin |
| 2014/0021279 A1 | 1/2014 | Rittler et al. |
| 2014/0097048 A1 | 4/2014 | Wiker et al. |
| 2014/0131059 A1 | 5/2014 | Verbrugge et al. |
| 2014/0139058 A1 | 5/2014 | Wei et al. |
| 2014/0292163 A1* | 10/2014 | Lau ........................ H02K 5/18 310/60 R |
| 2015/0194848 A1 | 7/2015 | Osborne et al. |
| 2016/0294231 A1 | 10/2016 | Andres et al. |
| 2018/0175679 A1 | 6/2018 | Seo et al. |
| 2019/0058374 A1* | 2/2019 | Enomoto ................ F28D 15/02 |

FOREIGN PATENT DOCUMENTS

| | | |
|---|---|---|
| DE | 3151731 A1 | 7/1983 |
| DE | 4 230 379 A1 | 3/1994 |
| DE | 19 618 996 A1 | 11/1997 |
| DE | 19 635 196 A1 | 3/1998 |
| DE | 10361748 A1 | 7/2005 |
| DE | 102010036831 A1 | 5/2011 |
| DE | 102012223715 A1 | 6/2014 |
| DE | 102012223839 A1 | 6/2014 |
| DE | 102014210915 A1 | 12/2015 |
| DE | 102015219476 A1 | 12/2016 |
| DE | 102016210853 A1 | 12/2017 |
| DE | 10347943 B4 | 8/2018 |
| DE | 102017202752 A1 | 8/2018 |
| EP | 0293706 B1 | 9/1991 |
| EP | 0854560 A1 | 7/1998 |
| EP | 0974430 B1 | 10/2003 |
| EP | 0980743 B1 | 11/2003 |
| EP | 1147319 B1 | 6/2005 |
| EP | 1446583 B1 | 9/2007 |
| EP | 15 11 156 B1 | 4/2008 |
| EP | 1398864 B1 | 11/2008 |
| EP | 02036681 A1 | 3/2009 |
| EP | 1647366 B1 | 2/2010 |
| EP | 1677946 B1 | 4/2010 |
| EP | 1715565 B1 | 11/2010 |
| EP | 2523785 A1 | 11/2012 |
| EP | 2536006 A1 | 12/2012 |
| EP | 2608365 A1 | 6/2013 |
| EP | 2752976 A2 | 7/2014 |
| EP | 2324944 B1 | 12/2014 |
| EP | 02973957 A1 | 1/2016 |
| EP | 2982481 A1 | 2/2016 |
| EP | 2996225 A3 | 9/2016 |
| EP | 3258573 A1 | 12/2017 |
| GB | 2 214 722 A | 9/1989 |

(56) References Cited

FOREIGN PATENT DOCUMENTS

| GB | 2436944 B | 4/2009 | |
|---|---|---|---|
| JP | 56-129550 A2 | 10/1981 | |
| JP | S6311272 A | 1/1988 | |
| JP | H08111966 A2 | 4/1996 | |
| JP | 2007-115844 A | 5/2007 | |
| JP | 2007-135372 A | 5/2007 | |
| JP | 2008-235418 A | 10/2008 | |
| WO | 97/15111 A2 | 4/1997 | |
| WO | WO-2009091344 A1 * | 7/2009 | ............ F02M 37/08 |
| WO | 2014138815 A1 | 9/2014 | |
| WO | 16025975 A1 | 2/2016 | |
| WO | 16057582 A1 | 4/2016 | |
| WO | 2016151100 A1 | 9/2016 | |
| WO | 17097513 A1 | 6/2017 | |
| WO | 17144259 A1 | 8/2017 | |
| WO | 18018905 A1 | 2/2018 | |

* cited by examiner

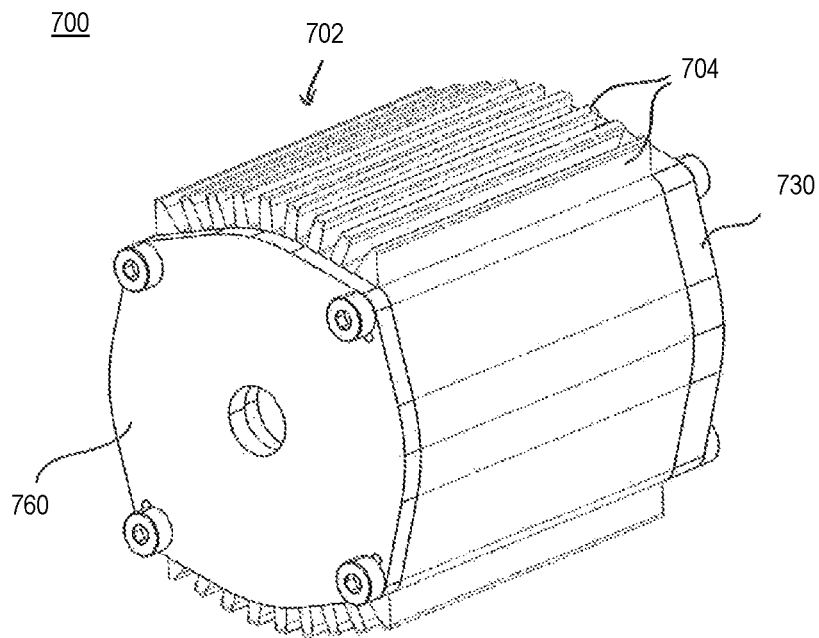
FIG. 45
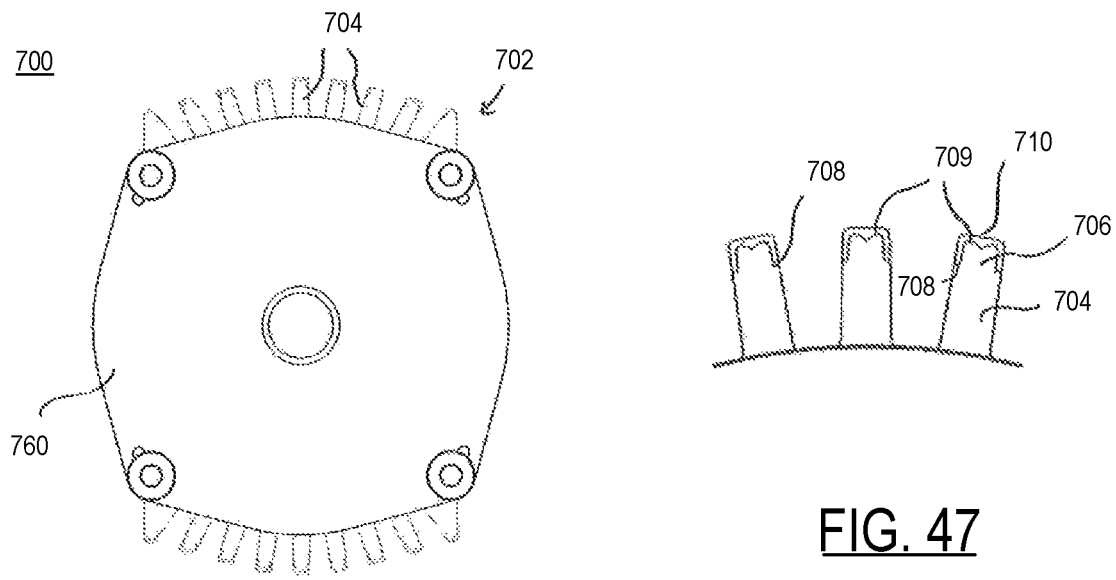
FIG. 46
FIG. 47

US 11,139,722 B2

MOTOR HAVING AN EXTERNAL HEAT SINK FOR A POWER TOOL

RELATED APPLICATION

This application claims the benefit of U.S. Provisional Application No. 62/637,810 filed Mar. 2, 2018; U.S. Provisional Application No. 62/641,008 filed Mar. 9, 2018; and U.S. Provisional Application No. 62/693,564 filed Jul. 3, 2018. The contents of all these applications are incarnated herein by references in their entireties.

FIELD OF THE DISCLOSURE

This disclosure relates to power tools. More particularly, the present invention relates to a power tool having a brushless DC motor with a peripheral heat sink.

BACKGROUND

Use of brushless DC (BLDC) motors in power tools has increased significantly over the past several years. Examples of such power tool applications are U.S. Pat. No. 9,450,472, US Patent Publication No. 2016/0149463, US Patent Publication No. 2017/0106521, and US Patent Publication No. 2017/0120435, contents of all of which are incorporated herein by reference in their entireties.

As BLDC motors have been used in higher power applications such as grinders, miter saws, etc., a challenge has been to optimize power density so as to keep the power tool as compact and portable as possible while obtaining the desired power output. The goal of power tool manufacturers has been to provide the most amount of power from the motor using the least amount of space possible. The ratio of maximum power output of a motor to the volume of the motor is known as the power density. Power density can be maximized by keeping the size of the motor the same and increasing power, or by keeping the power output the same and reducing the motor volume.

One of the barriers that significantly limit the potential for optimal power density is the motor cooling techniques conventionally used in the industry. Motor coils typically generate a significant amount of heat, particularly for higher power applications. As can be seen in the references cited above, conventional BLDC motors in power tools typically include a cooling fan coupled to the rotor that generates an airflow through the stator windings. This requires a large portion of the volume of the motor stator to be dedicated to providing airflow paths between the motor windings. In most conventional tools, stator slots where stator coils are wound are required to have a maximum slot fill of 50% or less to ensure air gaps between the stator coils can sufficiently cool the coils. This results in large areas of the motor to be wasted for non-magnetic usage.

What is needed is a motor design suitable for power tool applications that provides for maximization of the power density of the motor.

SUMMARY

According to an embodiment of the invention, a motor assembly is provided with a stator including a lamination stack forming a stator core, stator teeth inwardly projecting from the stator core, and stator windings wound around the stator teeth in connected in phases. A rotor is rotatably disposed within the stator to magnetically interact with the stator windings, the rotor having a shaft, a rotor lamination stack mounted on the shaft, and at least one bearing mounted on the shaft. An external heat sink is provided including a main body defining a hollow opening form-fittingly receiving the stator therein in thermal communication with the stator. A bearing support structure is provided having a main body radially arranged and secured the main body of the external heat sink, the bearing support structure forming a central bearing pocket arranged to receive and support the bearing of the rotor therein to axially and radially support the rotor with respect to the heat sink.

In an embodiment, the bearing support structure is formed as a radial wall projecting integrally from an inner surface of the external heat sink within the hollow opening.

In an embodiment, an outer periphery of the bearing support structure is form-fittingly received within the hollow opening of the external heat sink.

In an embodiment, a seal is arranged between the outer periphery of the bearing support structure and the main body of the external heat sink.

In an embodiment, the bearing support structure is further secured to the stator via a plurality of axially-arranged fasteners.

In an embodiment, a fan is disposed on the shaft on a side of the bearing support structure opposite the stator. In an embodiment, the fan comprises a radial body disposed within the hollow opening of the external heat sink and fan blades extending from the radial body outside the main body of the external heat sink to generate an airflow on an outer surface of the external heat sink.

In an embodiment, an electronic module is provided including hall sensors arranged to detect a rotary position of the rotor, the electronic module including a radial body received within the hollow opening of the heat sink and supported by the heat sink on the same side of the bearing support structure as the fan.

In an embodiment, a rear end cap is provided including a radial body having a plurality of air intakes and a peripheral wall arranged to secure the radial body to the external heat sink.

In an embodiment, the bearing support structure is disposed at an end of the heat sink and fastened to the stator.

BRIEF DESCRIPTION OF THE DRAWINGS

FIG. 45 depicts a perspective view of an exemplary motor assembly having an external heat sink, according to an embodiment;

FIG. 46 depicts an axial view of the same motor assembly, according to an embodiment;

FIG. 47 depicts a zoomed-in axial view of the heat sink, showing three of the heat sink fins with coating, according to an embodiment;

DETAILED DESCRIPTION

Figure 1:
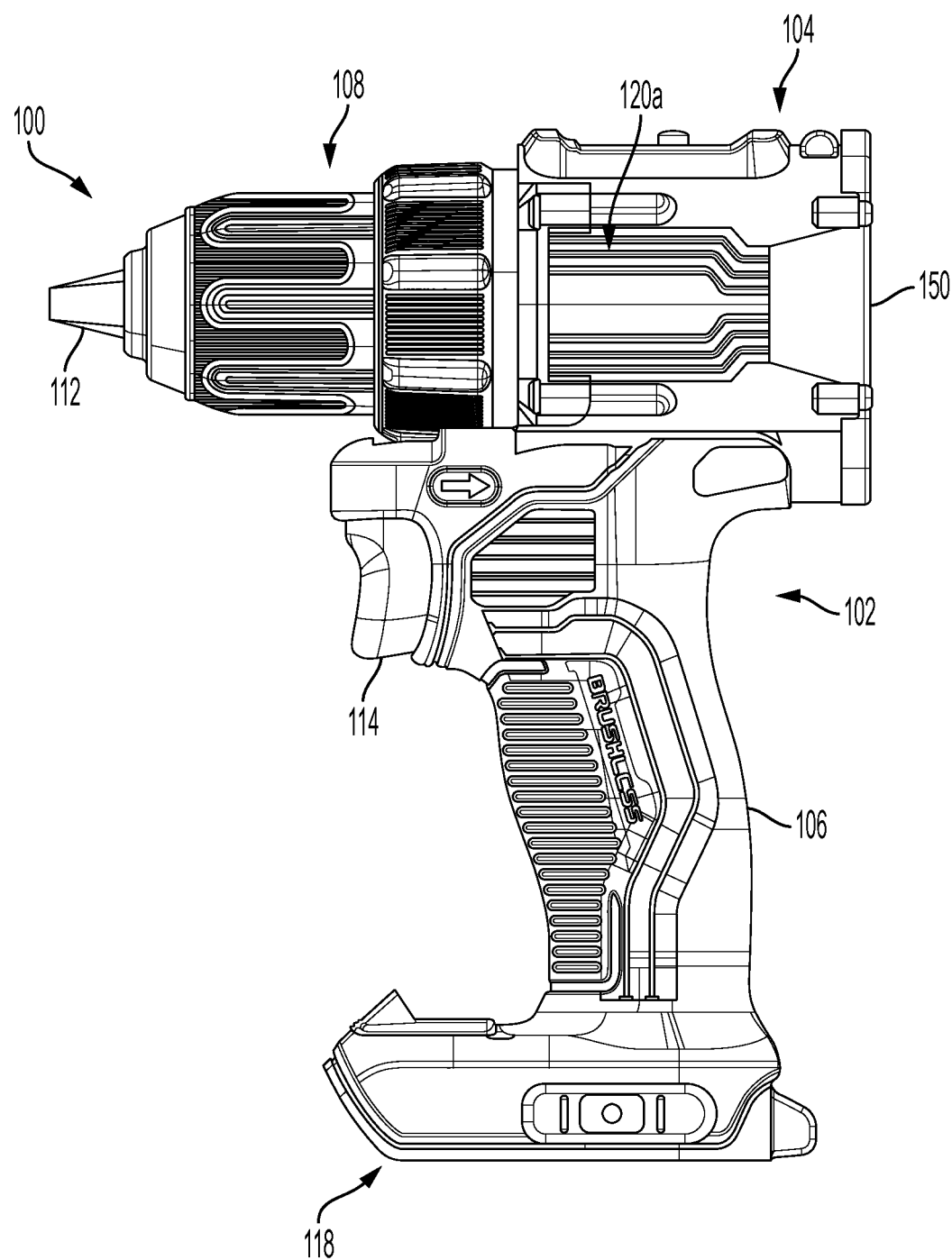
FIG. 1 depicts a side view of a power tool 100 constructed in accordance with the teachings of the present disclosure, according to an embodiment.

According to an embodiment invention, a BLDC motor design is provided that significantly improves power density for power tool applications. As described below in detail with reference to the figures, this motor incorporates an external cooling design, where one or more heat carrying elements (heat sinks) are disposed in direct contact with the outer surface of the stator. The power tool housing is shaped and designed so as to expose an outer surface of the heat sink to the outside environment. The heat generated by the coils is conducted through the stator lamination stack and dissipated through the heat sink to the outside environment.

According to an embodiment, the heat sink extends longitudinally along the power tool to make contact with transmission assembly components in addition to the motor components.

According to an embodiment, the motor may be fully sealed via a variety of techniques disclosed in this disclosure. Sealing the motor ensures that motor air flow does not enter the motor, and thus prevents environmental dust and debris from contaminating the motor components.

According to an embodiment, a fan is disposed on the motor shaft that generates cooling air flow for cooling the heat sink. In an embodiment, the fan directs air through a series of channels provided longitudinally on the outer surface of the heat sink to maximize the cooling effect of the air flow. The transmission assembly may include air inlets that align with the heat sink air channels to collect the air passing through the heat sink. Alternatively, the air through the channels may dissipate into the outside environment.

In an embodiment, the fan may be a radial fan with blades arranged opposite the motor. The fan may generate air flow that axially pushes air into the air channels of the heat sink.

In an embodiment, a rear side of the fan facing the motor may house a sense magnet in magnetic communication with positional sensors. This arrangement eliminates the need for placement of sense magnets directly on the rotor shaft or on the lamination stack, thus reducing the size of the motor.

In an embodiment, depending on the motor size and power requirements, the heat sink may be shaped to fully or partially envelope and capsulate the motor. For example, for higher-power power tool applications, where motor windings carry higher voltage and are therefore likely to generate more heat, a fully-enveloping heat sink encapsulates the circumference of the stator to maximize heat transfer to the heat sink.

This improved cooling technique eliminates the need to provide large airflow paths within the stator slots for cooling the stator windings and makes that area available for additional slot fill in the form of increased magnet wires with higher number of turns, or thicker magnet wires with the same number of turns. The increased slot fill substantially increases the volumetric power density of the motor.

In an embodiment, a layer of thermally conductive dielectric material may be disposed between the stator laminations to improve thermal conductivity of the stator.

These features are described below in more detail with reference to the accompanying figures.

Partially-Enveloped Motor

A first embodiment of the invention is described herein with reference to FIGS. 1-23.

Figure 2:
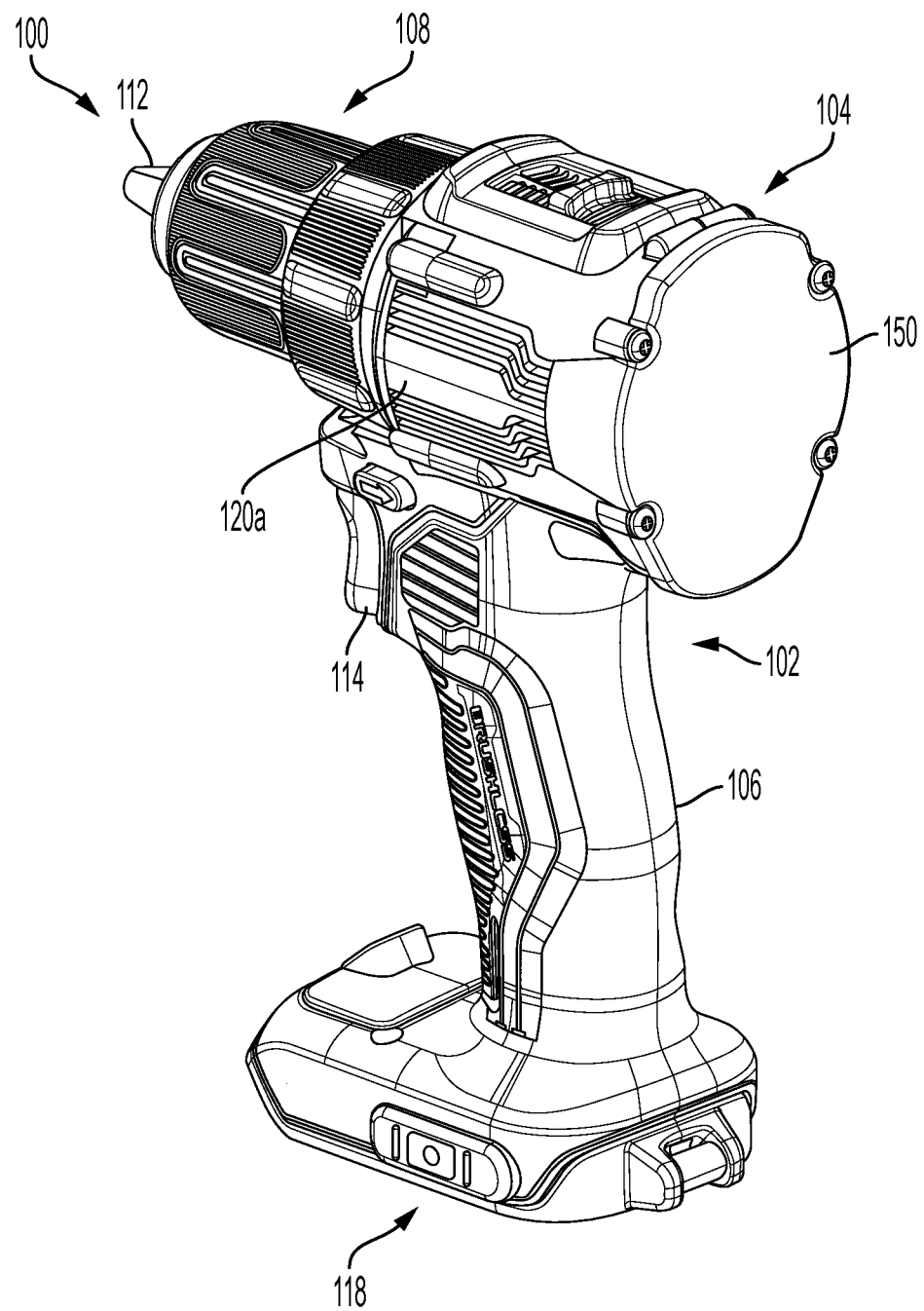
FIG. 2 depicts a perspective view of the same power tool.
Figure 3:
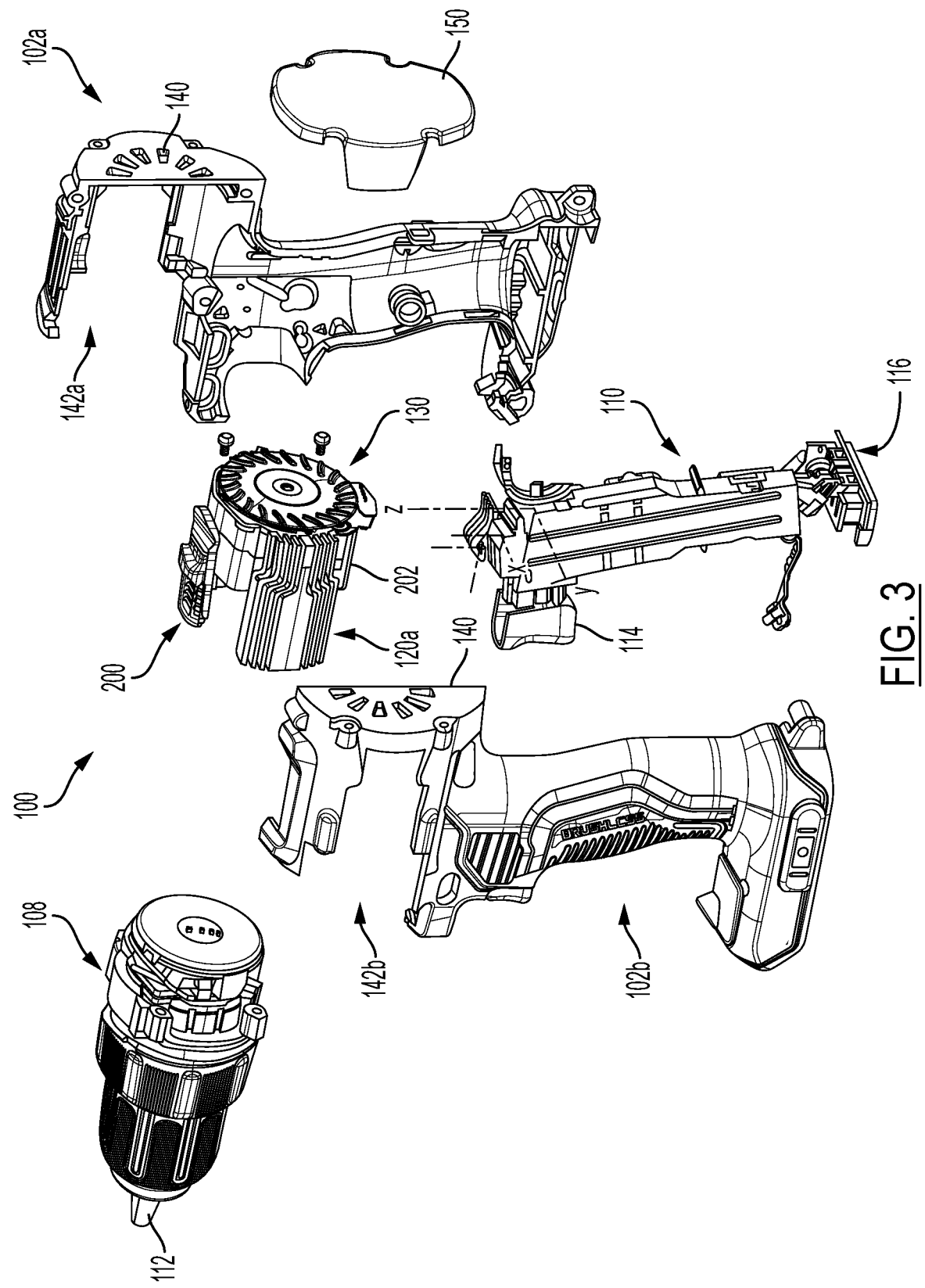
FIGS. 3 and 4 respectively depict exploded perspective views of power tool, showing the internal components therein.
Figure 4:
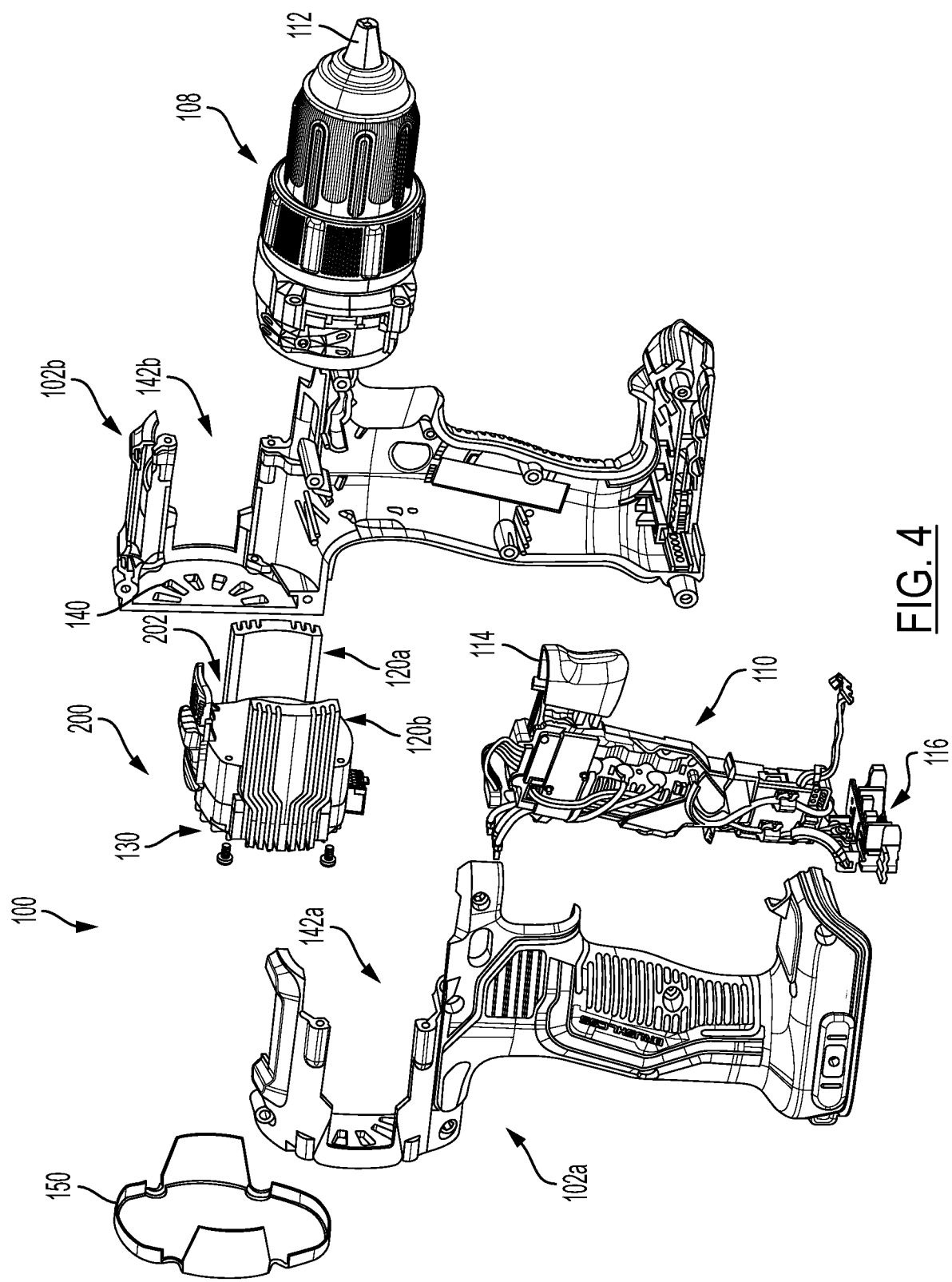

With reference to the FIG. 1, a side view of a power tool 100 constructed in accordance with the teachings of the present disclosure is shown. FIG. 2 depicts a perspective view of the same power tool 100. FIGS. 3 and 4 respectively depict exploded perspective views of power tool 100, showing the internal components therein. The power tool 100 in the particular example provided is an electric cordless drill, but it will be appreciated that the teachings of this disclosure is merely exemplary and the power tool of this invention could be a drill, impact driver, hammer, grinder, circular saw, reciprocating saw, or any similar portable power tool constructed in accordance with the teachings of this disclosure.

Power tool 100, according to an embodiment, includes a tool housing 102 made up of two clam shells 102a and 102b that together form a motor housing 104 for housing a motor assembly 200 and a handle portion 106 for housing an integrated switch module 110.

In an embodiment, the integrated switch module 110 integrally includes a switch circuit (not shown), such as a three-phase inverter bridge circuit having a series of high-side and low-side semiconductor switches, arranged to deliver power from a power supply such as battery pack, through terminals 116, to the motor assembly 200. The integrated switch module 110 further include a controller (not shown), such as a micro-controller, that controls the switching operation of the switch circuit in order to regulate the voltage being supplied to the motor assembly 200. The integrated switch module 110 additionally includes an input unit (not shown) coupled to a trigger switch 114 to activate the controller and provide a variable-speed signal to the controller. For detailed examples of the integrated switch module 100, reference is made to U.S. Pat. No. 9,847,194 filed Mar. 28, 2014, which is incorporated herein by reference in its entirety.

In an embodiment, a transmission assembly 108 having a gear case (not shown) is mounted to the end of the motor housing 104. The motor assembly 200 may be coupled through the gear case to an output spindle (not shown), which is rotatably coupled to chuck 112.

In an embodiment, a battery receptacle 118 is disposed at the end of the handle 106 opposite the motor housing 104. The battery receptacle 118 houses the battery terminals 116 and receives a battery pack couplable to the battery terminals 116 therein. While the motor assembly 200 is powered by a battery pack in this example, it must be understood that power tool 100 may alternatively include a power cord to receive AC power from, for example, a generator or the AC grid, and may include the appropriate circuitry (e.g., a full-wave or half-wave bridge rectifier) to provide positive current to the motor 104.

In an embodiment, the motor assembly 200 includes a brushless DC (BLDC) motor 202, a pair of heat sinks 120a and 120b disposed on two sides of the motor 202 and held by the clam shells 102a and 102b along the outer peripheral surface of the motor 202 to partially envelope an outer periphery of the motor assembly 200, and a fan 130 disposed at an axial end of the motor 202 opposite the transmission assembly 108. In an embodiment, the clam shells 102a and 102b each includes distal air intakes 140 disposed at the end of the motor housing 104, radially around a center axial of the motor housing 104, facing and adjacent the fan 130. The clam shells 102a and 102b also include two longitudinal side openings 142a and 142b formed around the heat sinks 120a and 120b, through which the heat sinks 120a and 120b are exposed to the outside environment. In an embodiment, an end cap 150 is secured to the end of the motor housing 104 in close proximity to the air intakes 140.

Figure 5:
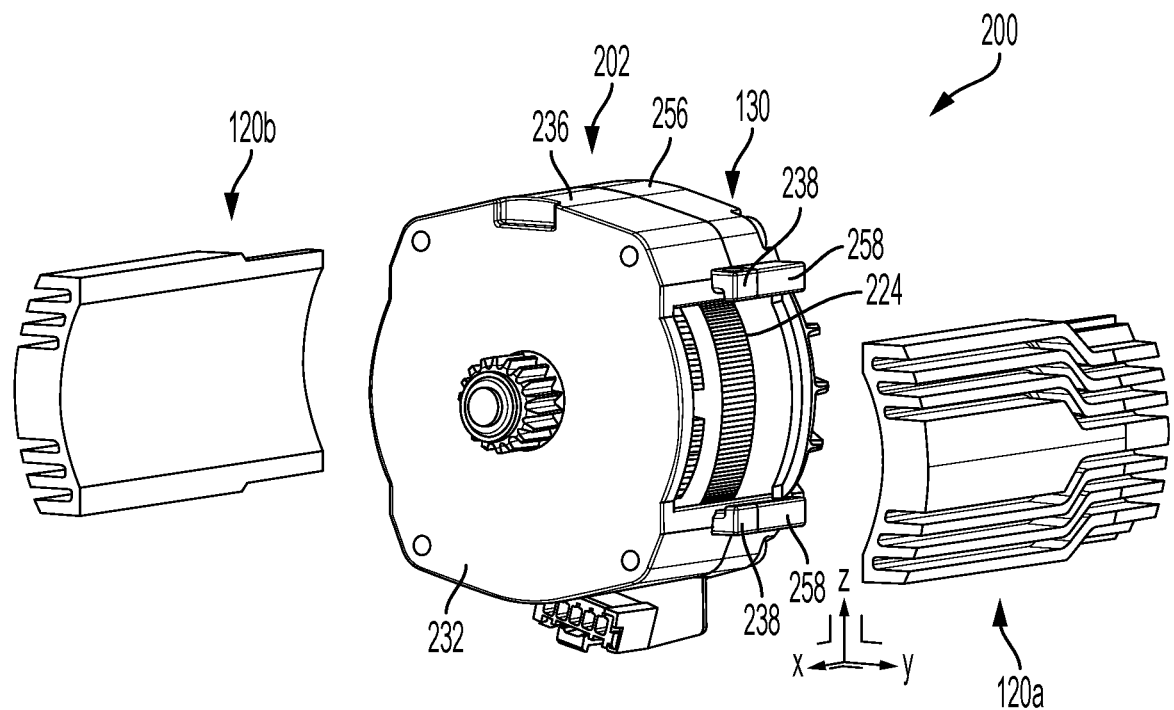
FIGS. 5 and 6 depict perspective partially-exploded front and rear views of the motor assembly, according to an embodiment.
Figure 6:
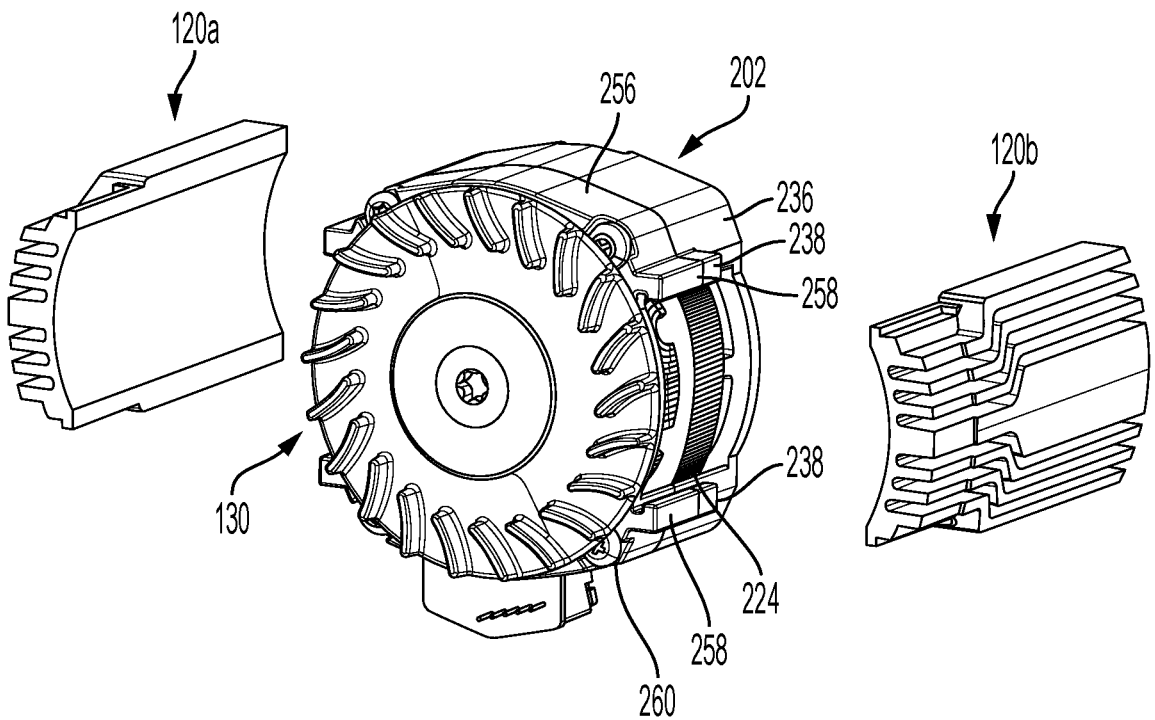
Figure 7:
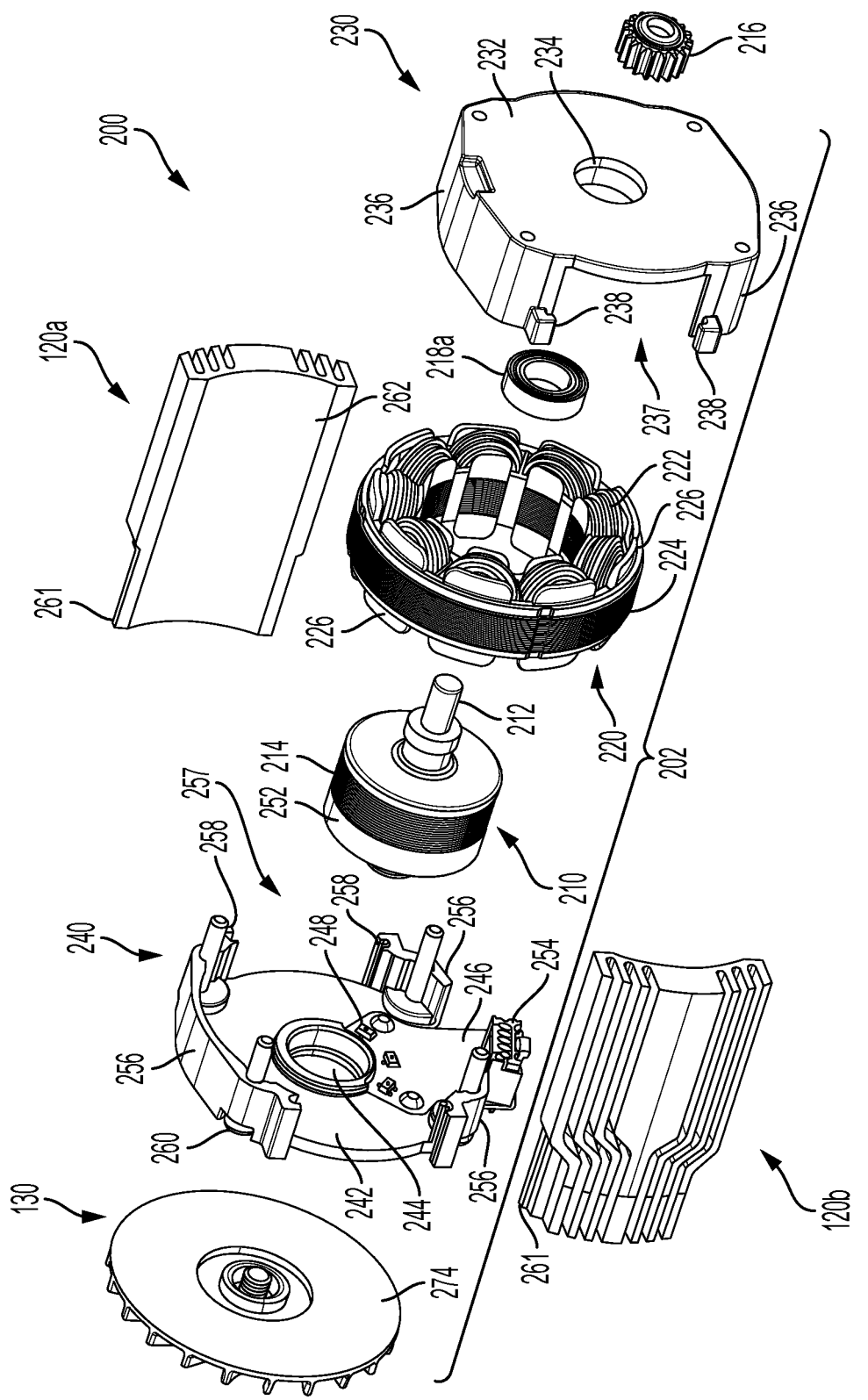
FIGS. 7 and 8 depict exploded views of the motor assembly, including motor components, according to an embodiment.
Figure 8:
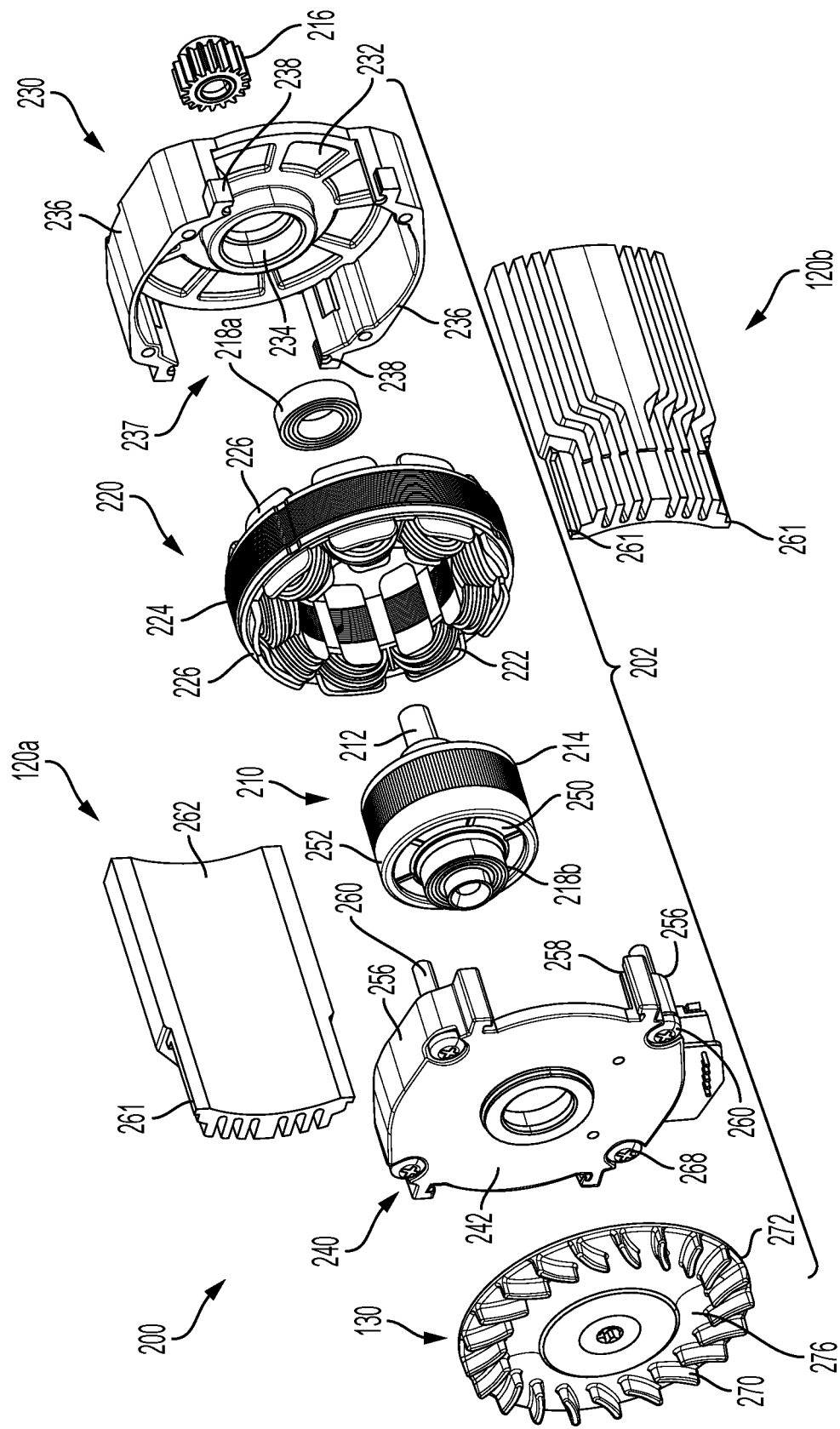
Figure 9:
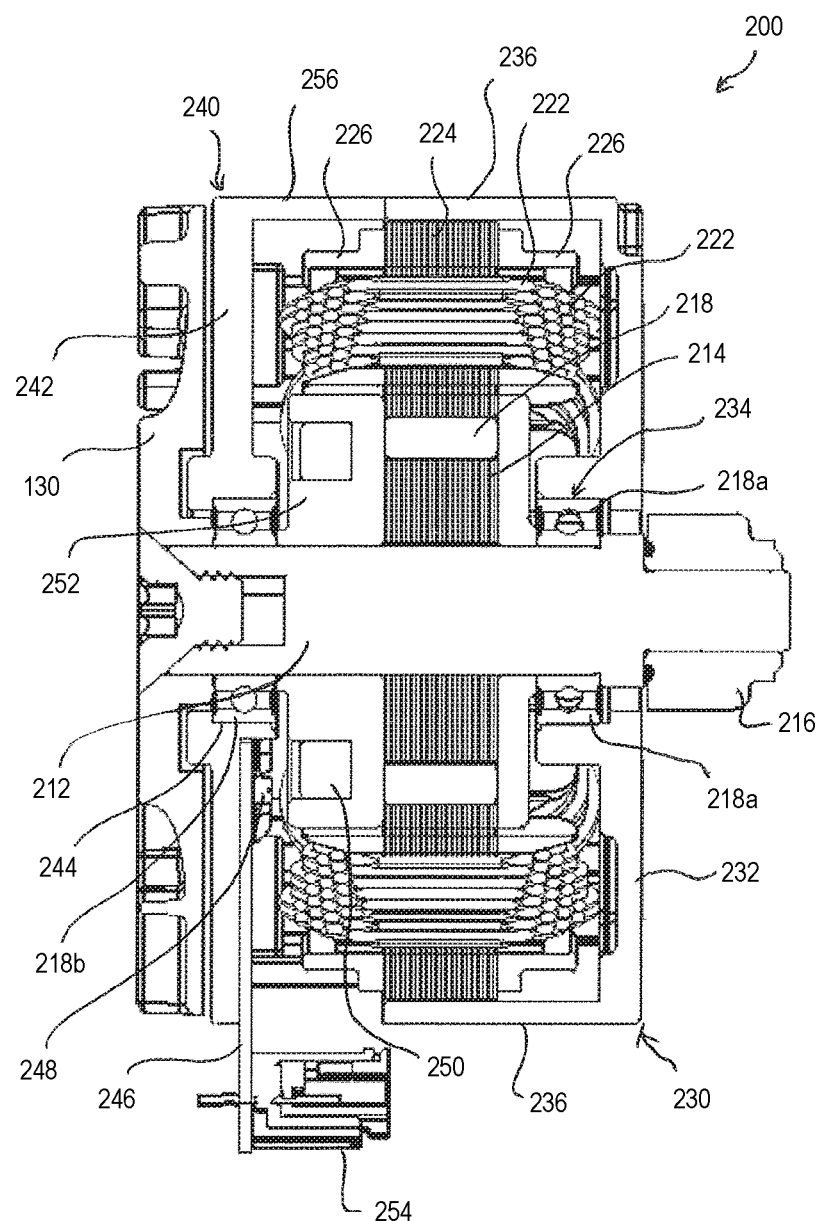
FIG. 9 depicts a cross-sectional side view of the motor, according to an embodiment.

Motor assembly 200 is now described in detail with reference to FIGS. 5-9, according to an embodiment. FIGS. 5 and 6 depict perspective partially-exploded front and rear views of the motor assembly 200, including the motor 202, heat sinks 120a and 120b, and fan 130, according to an embodiment. FIGS. 7 and 8 depict exploded views of the motor assembly 200, including motor 202 components, according to an embodiment. FIG. 9 depicts a cross-sectional side view of the motor 202, according to an embodiment.

In an embodiment, the motor 202 includes a rotor 210, a stator 220, and front and rear bearing support structures 230 and 240.

Rotor 210, in an embodiment, includes a rotor shaft 212 on which a rotor lamination stack 202 housing several permanent magnets 218 is mounted. Fan 130 is mounted on the rotor shaft 212 on one side of the rotor lamination stack 214, and a gear 216 for engagement with the transmission assembly 108 is mounted on the rotor shaft 212 on the other side of the rotor lamination stack 214. Rotation of the rotor lamination stack 214 causes the rotation of the rotor shaft 212, the fan 130, and the gear 216 within the motor assembly 200. Front and rear rotor bearings 218a, 218b are also mounted on the rotor shaft 212, with front bearing 218a disposed between the lamination stack 214 and gear 216, and rear bearing 218b disposed between the lamination stack 214 an the fan 130.

Stator 220, in an embodiment, is disposed around the rotor lamination stack 214 and includes stator windings 222 wound around teeth of a stator lamination stack 224 and two stator end insulators 226. The stator windings 222 are connected around the stator in, for example, a wye or a delta configuration, and are electrically connected to and energized by integrated switch module 110. Windings 222 are thereby electrically commutated to generate a magnetic force on the rotor 210, thereby rotating the rotor 210 within the stator 220 in a desired speed and direction of rotation.

Front bearing support structure 230, according to an embodiment, includes a substantially disc-shaped planar radial plate 232 defining a bearing pocket 234 therein. Rear bearing support structure 240, according to an embodiment, similarly includes a substantially disc-shaped planar radial plate 242 defining a bearing pocket 234 therein. The front and rear bearings 218a and 218b are press-fitted inside the bearing pockets 234 and 244 in a way that the outer races of the bearing 218a and 218b are non-rotatably supported by the bearing support structures 230 and 240, respectively.

In an embodiment, a positional sensor board 246, including a series of positional sensors 248 (e.g., hall sensors), is mounted on the rear bearing support structure 240 facing the rotor 210. The positional sensor board 246 is positioned in close proximity to a sense magnet ring 250 housed by an end cap 252 of the rotor adjacent the rotor lamination stack 214. Positional sensors 248 sense the rotational position of the rotor 210 via the sense magnet ring 250, and the positional sensor board 246 provides the positional information of the to the integrated switch module 110 via connector 254.

In an embodiment, front bearing support structure 230 includes one or more peripheral arcuate walls 236 that extend longitudinally from radial plate 232 around two opposite sides of the stator 220. Arcuate walls 236 are sized to form-fittingly receive the stator 220 therein, with the outer surface of the stator lamination stack 224 in contact with, and securely held in place between, the arcuate walls 236. In an embodiment, rear bearing support structure 240 similarly includes one or more peripheral arcuate walls 256 that extends longitudinally from radial plate 242 along the outer surface of the stator 220 and mates with a corresponding arcuate wall 236 of the front bearing support structure 230. In the illustrated example, the lower one of the arcuate walls 256 includes a gap to accommodate the positional sensor board 246 and the connector 254. In an embodiment, a series of fasteners 260 axially secure the front and rear bearing support structures 230 and 240 together around the stator 220.

In an embodiment, front bearing support structure 230 further includes two side openings 237 peripherally formed between the arcuate walls 236. Similarly, in an embodiment, rear bearing support structure 240 includes two side openings 257 peripherally formed between the arcuate walls 256. These peripheral openings 237 and 257 together allow the heat sinks 120a and 120b to come into contact with two sides of the outer surface of the stator lamination stack 224 for improved heat transfer from the motor 200, as described herein.

Fan 130, in an embodiment, is a high pressure radial fan, which as explained above, is mounted on the rotor shaft 212 to rotate with the rotor 210. Fan 130 includes a series of blades 270 extending longitudinally around a peripheral portion of a planar fan plate 272. The fan plate 272 is press-fitted on the rotor shaft 212. The fan 130 includes a first surface 274 facing the radial plate 242 of the rear bearing support structure 240, and a second surface 276 from which the blades 270 project longitudinally. The fan blades 270 are oriented such that they suck air from a middle portion of the fan 130 and push air radially out around the fan 130.

Figure 10:
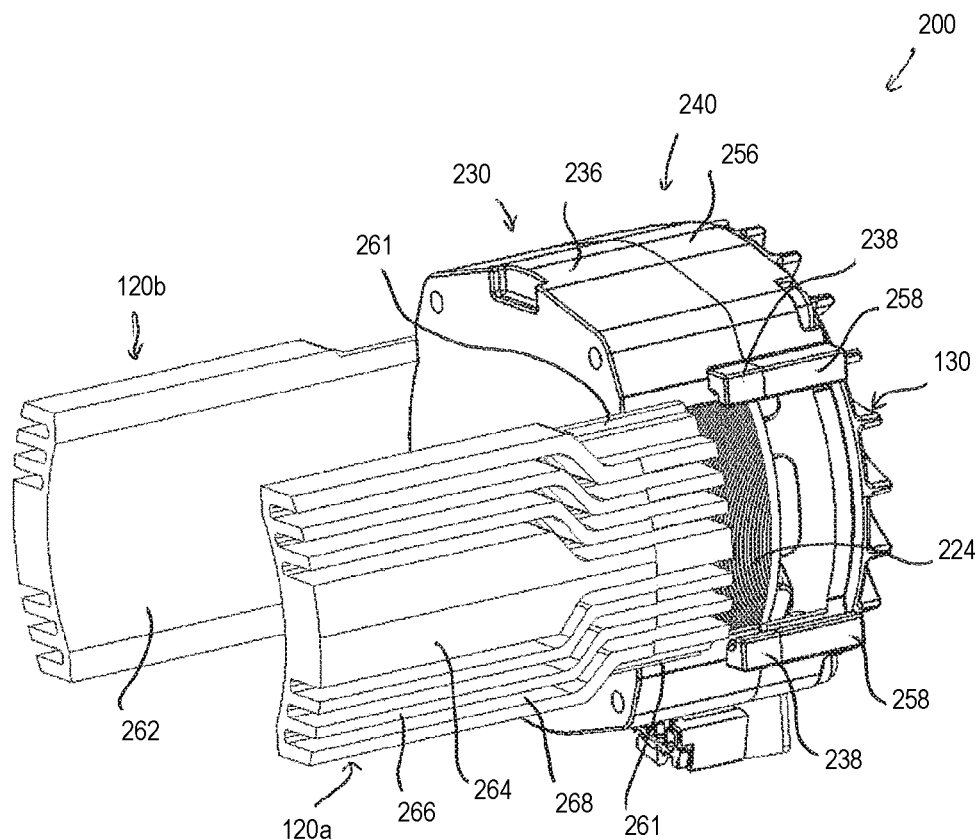
FIGS. 10 and 11 depict perspective views of the motor, prior to and after assembly of the heat sinks, respectively, according to an embodiment.
Figure 11:
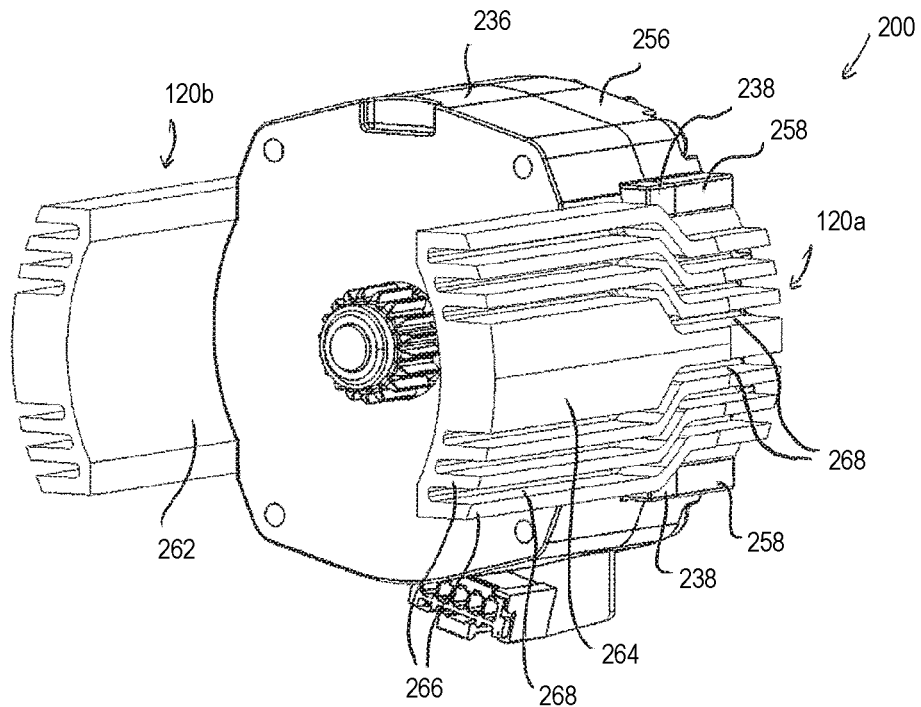

FIGS. 10 and 11 depict perspective views of the motor 200, prior to and after assembly of the heat sinks 120a and 120b, respectively. As shown in these figures, and with continued reference to FIGS. 5-8, arcuate walls 236 and 256 respectively include guide channels 238 and 258 that align along the axial edges of the peripheral openings 237/257. The heat sinks 120a and 120b include rail guides 261 that are slidingly received within the guide channels 238 and 258 in a such a way that an inner surface 162 is in direct contact with the outer surface of the stator 224.

In an embodiment, outer surfaces 264 of heat inks 120a and 120b opposite the stator 220 include a series of longitudinal fins 266 forming a series of longitudinal air channels 268 therebetween. Air channels 268 are arranged to guide air flow generated by the fan 130 along the outer surfaces 264 of the heat sinks 120a and 120b, as discussed below in further detail.

Figure 12:
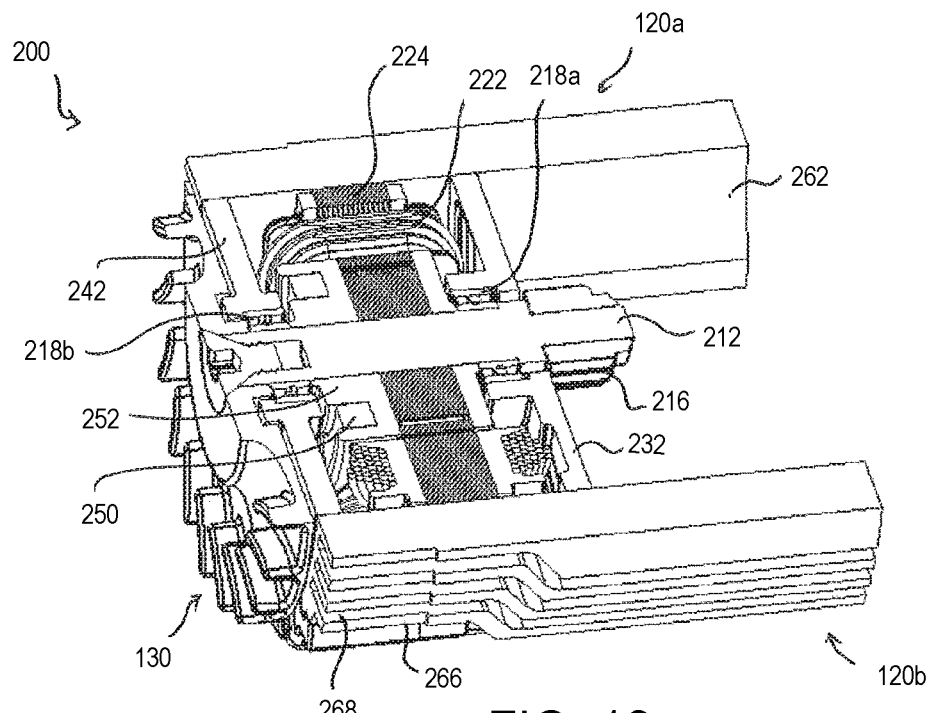
FIG. 12 depicts a perspective cut-off view of the motor, showing the heat sinks in contact with stator lamination stack, according to an embodiment.

FIG. 12 depicts a perspective cut-off view of the motor 200, showing the heat sinks 120a and 120b in contact with the stator lamination stack 224, according to an embodiment.

Figure 13:
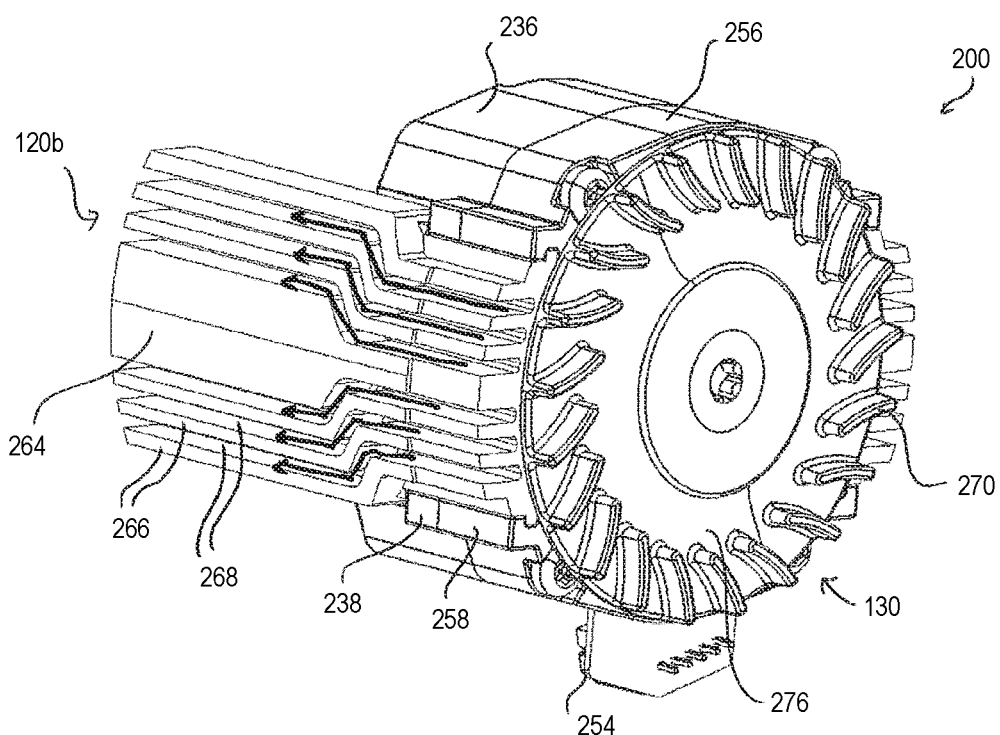
FIG. 13 depicts a perspective view of the motor with heat sinks, showing the path of air flow through air channels, according to an embodiment.

FIG. 13 depicts a perspective view of the motor 200 with heat sinks 120a and 120b fully inserted into the guide channels 238 and 258, showing the path of air flow generated by the fan 130 through the air channels 268.

Figure 14:
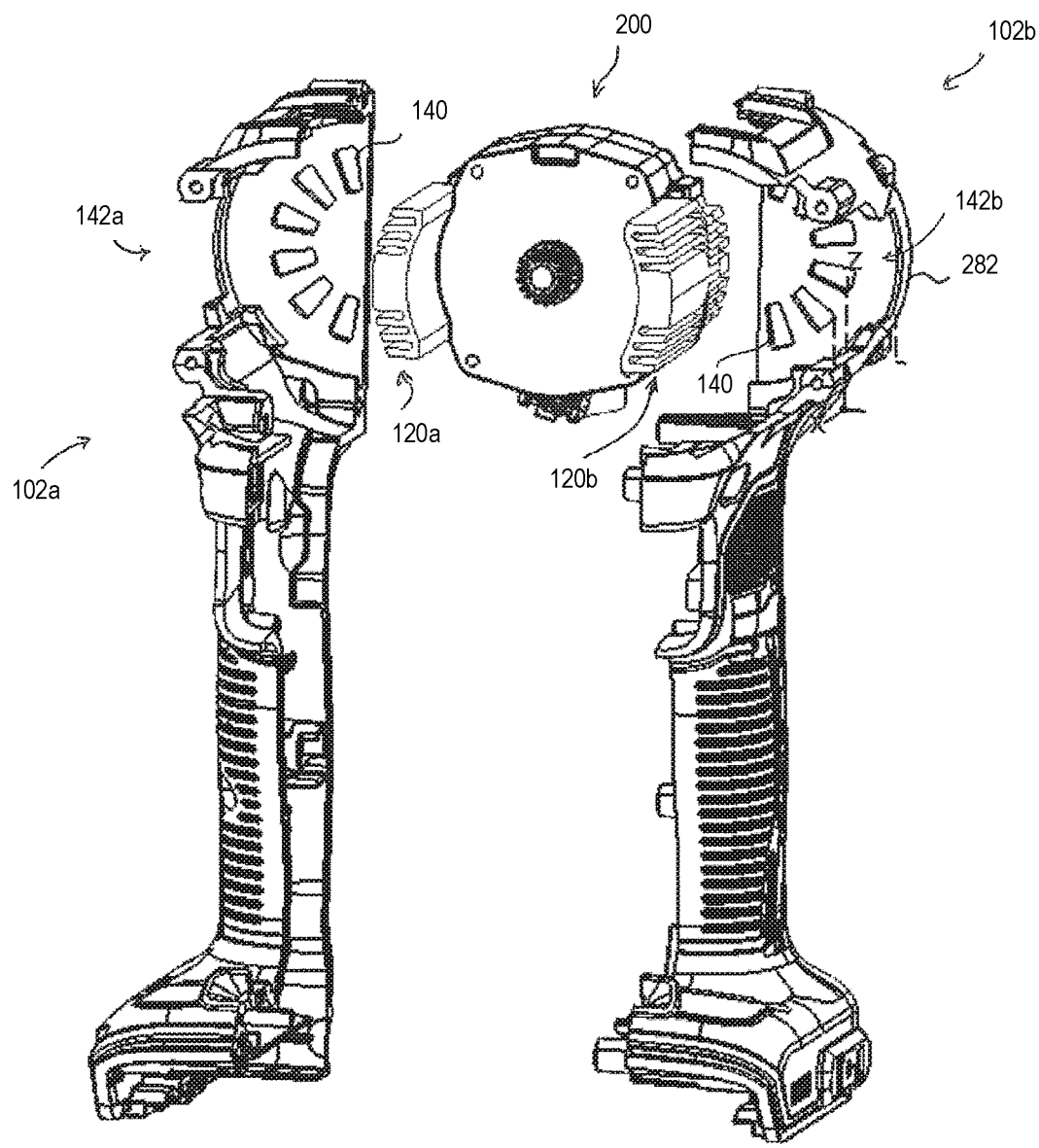
FIGS. 14 and 15 respectively depict front and rear perspective exploded views of tool housing clam shells around the motor, according to an embodiment.
Figure 15:
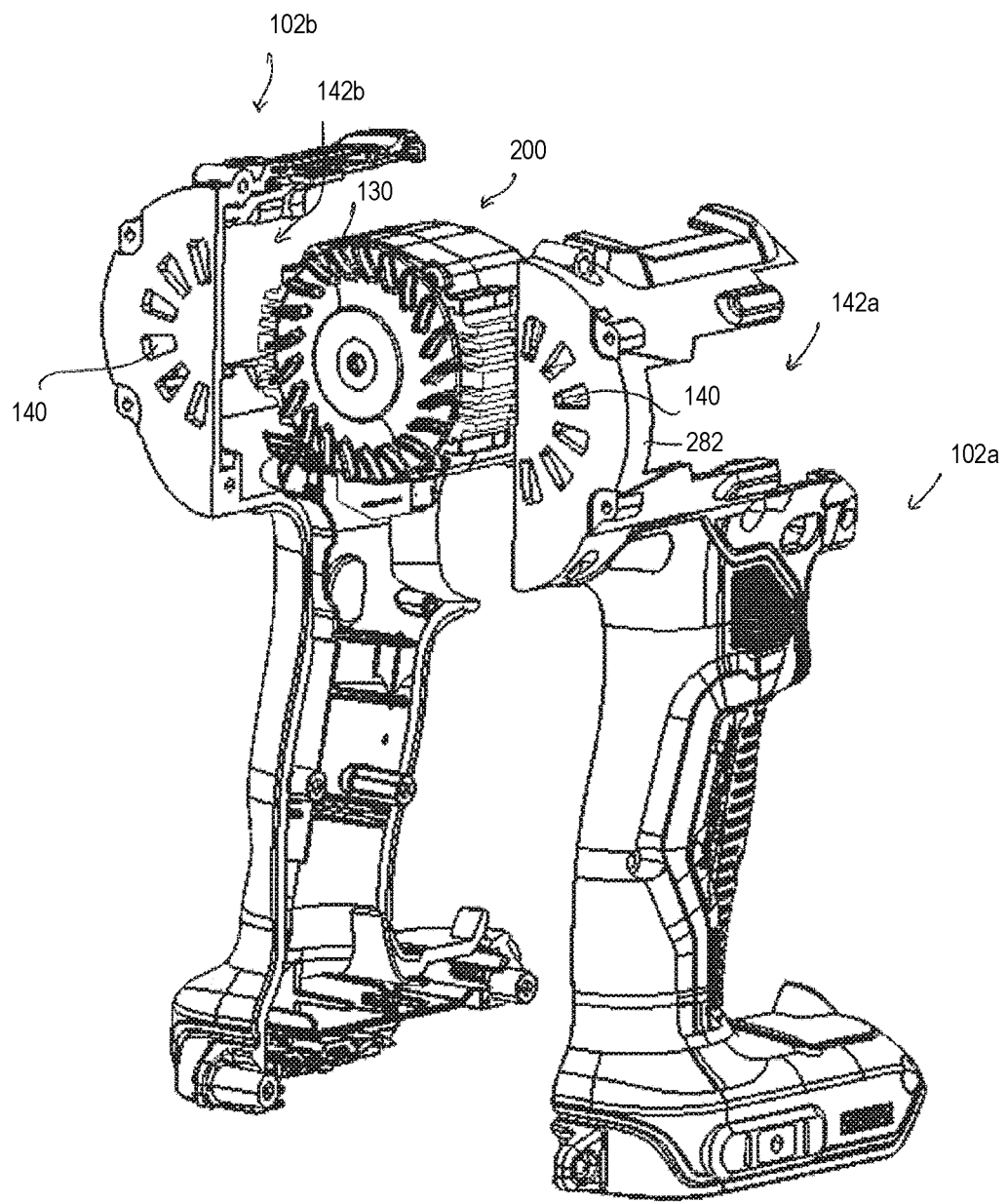

FIGS. 14 and 15 respectively depict front and rear perspective exploded views of tool housing clam shells 102a and 102b around the motor 202, according to an embodiment.

Figure 16:
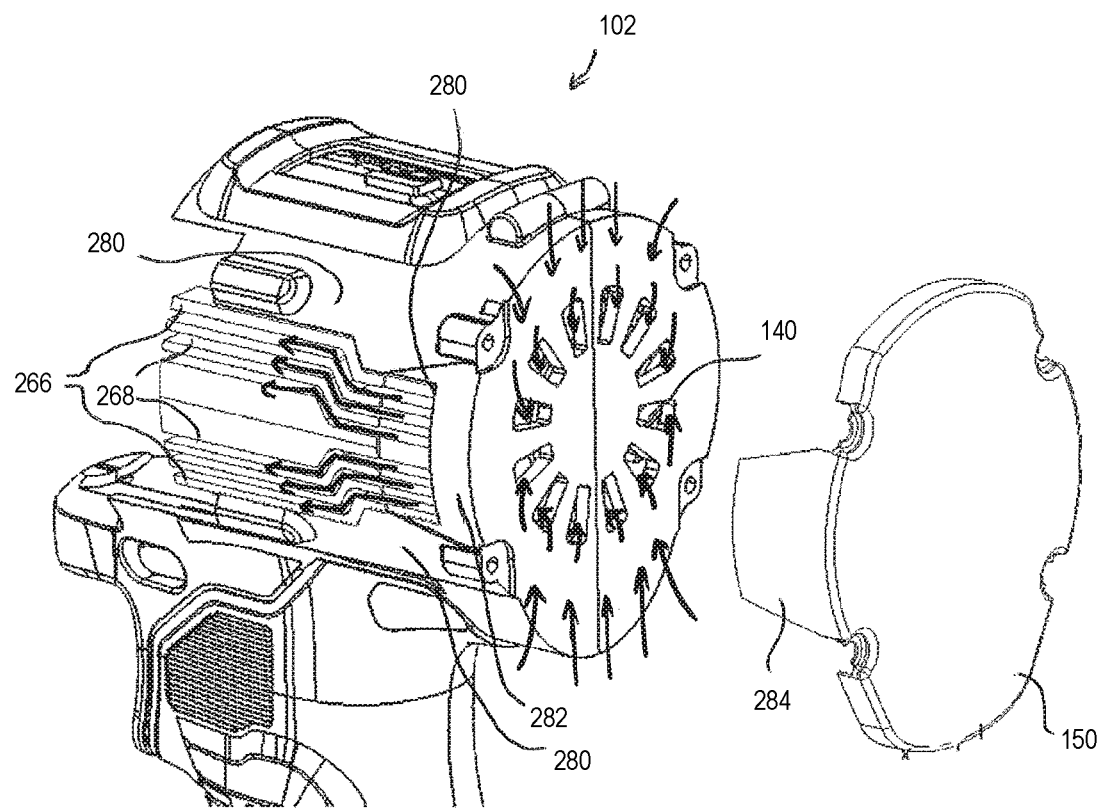
FIG. 16 depicts a perspective view of the clam shells assembled around the motor, with end cap shown at a distance, according to an embodiment.

FIG. 16 depicts a perspective view of the clam shells 102a and 102b assembled around the motor 202, with end cap 150 shown at a distance.

Figure 17:
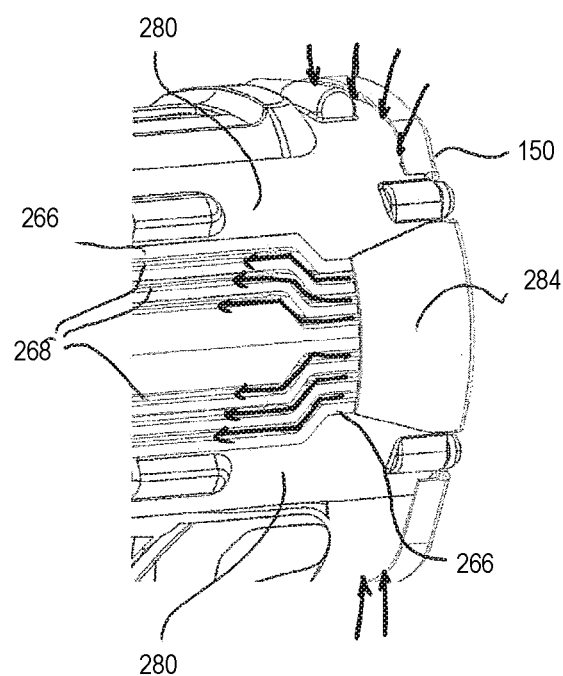
FIG. 17 depicts a zoomed-in view of the end cap assembled at the end of the tool housing, according to an embodiment.

FIG. 17 depicts a zoomed-in view of the end cap 150 assembled at the end of the tool housing 102.

As shown in these figures, clam shells 102a and 102b each includes distal air intakes 140 disposed at the end of the motor housing 104, radially around a center axial of the motor housing 104, facing and adjacent the fan 130. The air intakes 140 are oriented to let air towards a middle portion of the fan 130. In other words, the air intakes 140 are positioned at a closer radially orientation with respect to the center axis of the motor housing 104 than the fan blades 270. This allows the fan blades 270 to radially repel the incoming air to the outer periphery of the fan 130, where air is then pushed into and guided through air channels 268 of the heat sinks 120a and 120b.

In an embodiment, clam shells 102a and 102b also include two longitudinal side openings 142a and 142b formed around the heat sinks 120a and 120b, through which the heat sinks 120a and 120b are exposed to the outside environment. In an embodiment, side openings 142a and 142b are shaped to receive the outermost fins 266 therethrough such that the ends of the fins 266 radially align with, or substantially close to, the outer surfaces 280 of the clam shells 102a and 102b. In an embodiment, air inlets 280 are formed between the tool housing 102 and the air channels 268 that guide the air into the air channels 268. In an embodiment, a radial wall 282 of each of the clam shells 102a and 10b that surrounds the fan 130 aligns with the ends of the fins 266 of heat sinks 120a and 120b to form the air inlets 280 at the ends of the air channels 268.

In an embodiment, end cap 150 is attached to the back end of the tool housing 102 in such a way that it maintains a small radial air gap (e.g., approximately 1 mm) between the end cap 150 and the end of the too housing 102, as shown in FIG. 17. This allows air to radially enter through the air gap from outside the tool into the air intakes 140. In an embodiment, two side caps 284 project axially from the end cap 150 to partially cover the ends of the heat sinks 120a and 120b, thus ensuring that the air pushed through the air inlets 280 is properly channeled through air channels 268 of the heat sinks 120a and 120b.

It is noted herein that while the cooling mechanism described above includes a radial fan 130 pushing air through the air channels 268 of the heat sinks 120a and 120b, the cooling mechanism of this disclosure may employ other types of fan (e.g., a low pressure in-line fan) or other air flow arrangements (e.g., one where the fan pulls air through the air channels of the heat sinks).

Furthermore, while the fan 130 described above is mounted on the rotor shaft 212, it is envisioned that use of a separately-powered fan, alone or in combination with fan 130, for cooling the heat sinks 120a and 120b is within the scope of this disclosure. In an embodiment, the separately-powered fan may be operated even when the tool is not in use or when the rotor operates at very low speed to continue thermal dissipation and avoid high temperatures that may result from a stalled rotor stall or a low speed operation.

Furthermore, while air is used as the fluid exchange medium in the above-described embodiment, the principle elements of the invention extend to systems cooled with other gases or liquids. For example, in a liquid cooled power tool system, a cooling system include pump, a coolant reservoir, and other elements well known in the art may be incorporated to cool the heat sinks 120a and 120b.

It is also noted that while the heat sinks 120a and 120b are provided as discrete components in the above-described embodiment, heart sinks 120a and 120b may be alternatively provided as parts of other power tool components, for example, the transmission assembly 108 or the integrated switch module 110. In an exemplary embodiment, the heat sinks 120a and 120b may be integrated into the transmission assembly 108 and later assembled into the motor assembly 200 together with the transmission assembly 108.

In an embodiment, the heat sinks 120a and 120b may be integrally formed with the stator 220. For example, the heat sinks, including the fins 226 and air channels 268, may be integrally stamped in the outer geometry of the stator lamination stack 224.

Furthermore, depending on the motor size and power output requirement, it is envisioned that the motor can be sufficiently cooled without a heat sink and by external cooling of the outer surface of the stator using the methods disclosed herein. Conduction of the heat generated by the stator windings through the stator lamination stack and cooling of the outer surface of the stator outside the motor envelope is thus within the scope of this disclosure.

In an embodiment, in order to enhance the cooling of the motor 200, particularly the rotor 210 and its components, the fan 130, including the fan plate 272 and/or the fan blades 270 may be made of thermally conductive material such as metal.

The external end surfaces of the heat sink fins 266 are accessible for contact by the user. Given that the heatsinks may get hot and may exceed permissible limits for user interaction, in an embodiment, additional measures and construction may be employed. Examples of this may include application of a surface coating (such as a polymer)

on the end surfaces of the fins 266. In an embodiment, the surface coating increases the thermal resistance of the end surfaces of the fins 262, limits direct contact by the user to the end surfaces of the fins 262, and/or contains airflow directly within the heat sink air channels 268.

It is also noted that while the heat sinks 120a and 120b described above are held in place by motor housing 104 and the motor assembly 200, the heat sinks may be fully supported by only the enclosure and structural components of the motor assembly 200 alone, or by retention features provided in the motor housing 104 alone.

Additionally, in an embodiment, the boundary thermal resistance between the stator 200 and the heatsinks 120a and 120b may be improved by known construction methods, for example, using a thermal bonding compound, via interference and/or compression fits, or using fasteners that securely draw the heatsink against the stator.

In an embodiment, the motor assembly 200 may be fully sealed using a variety of techniques. In an exemplary embodiment, a gasket, adhesive, or other sealant material may be disposed within the mating surfaces of arcuate walls 236 and 256, and the mating surfaces of guide channels 238 and 258. In an embodiment, a similar sealant may also be disposed between the edges of the heat sinks 120a, 120b, and the guide channels 238, 258, and/or the arcuate walls 236, 256. In an embodiment, the opening of the rear bearing support structure 240, through which connector 254 is disposed, is further sealed via a resin or adhesive material, or a plug sized to be fitted within the opening.

Figure 18:
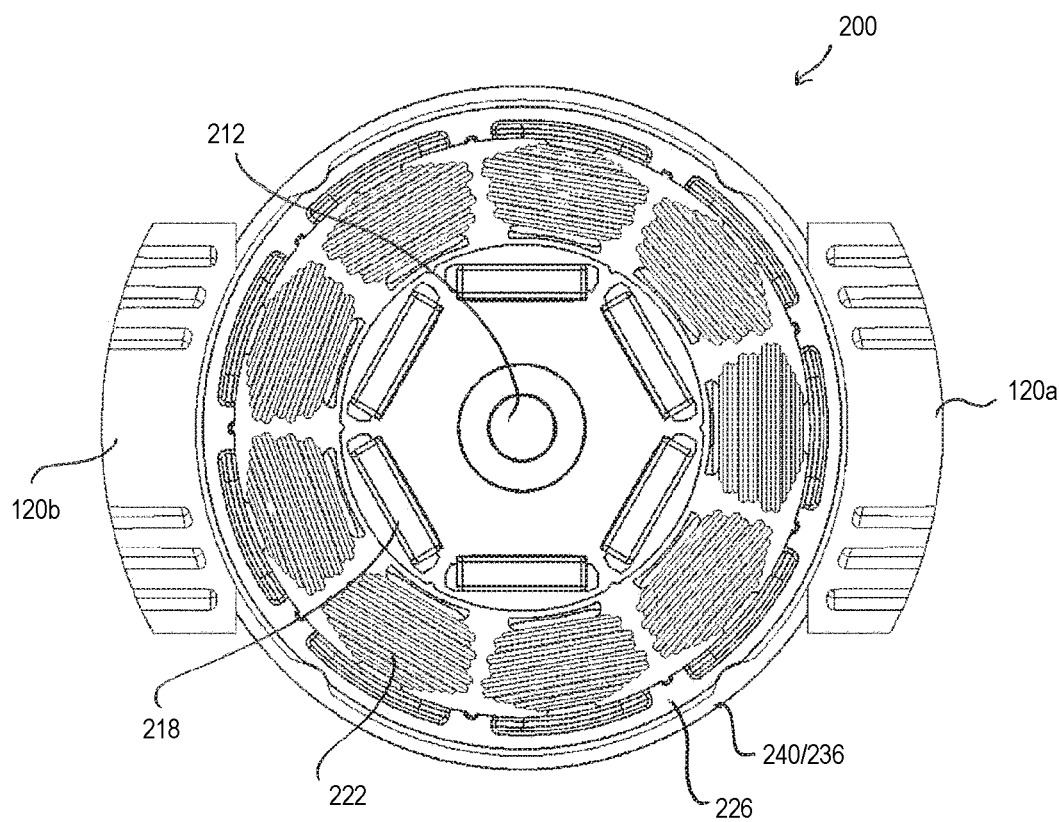
FIG. 18 depicts a perspective side view of the motor assembly with heat sinks, according to an embodiment.
Figure 19:
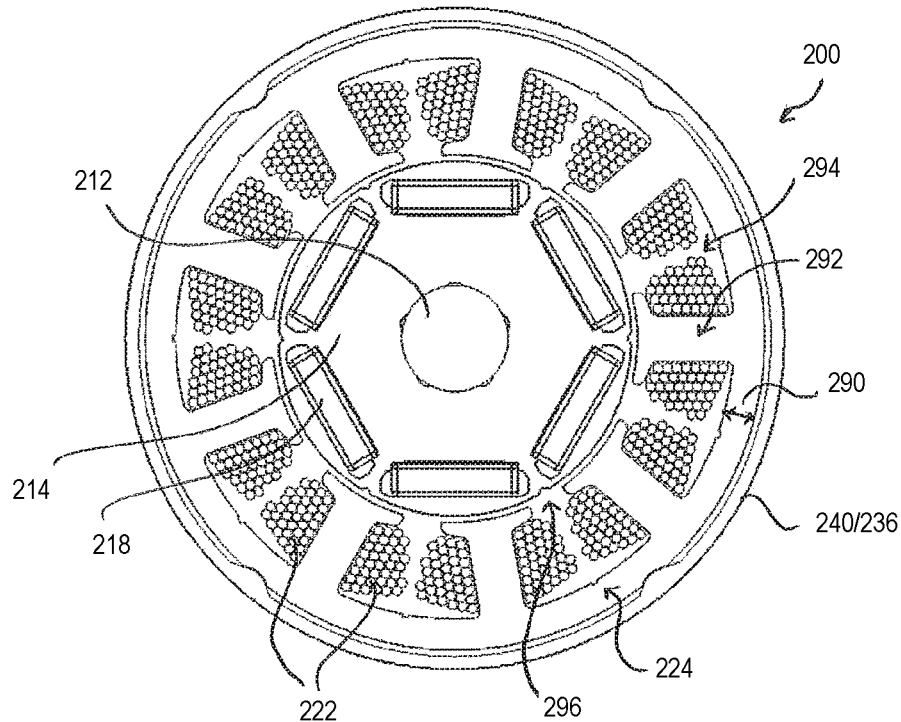
FIG. 19 depicts a cross-sectional side view of the motor assembly without heat sinks, according to an embodiment.
Figure 20:
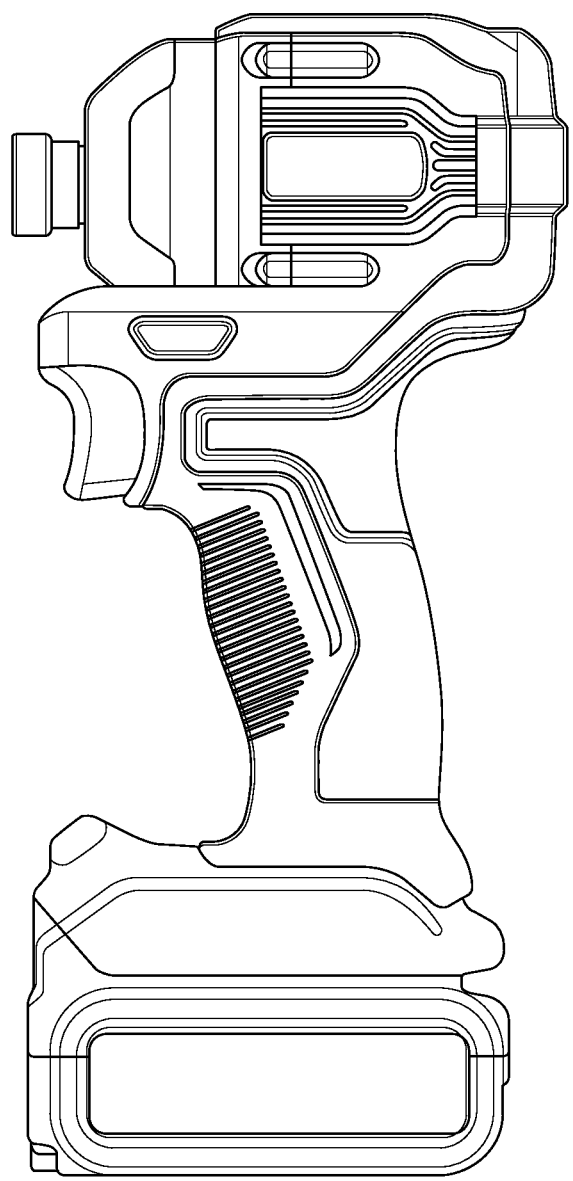
FIGS. 20-23 depicts various exemplary power tools, including an impact driver, a hammer drill, a cutter, and a reciprocating saw, incorporating the partially-enveloped motor of this disclosure, according to various embodiments.
Figure 21:
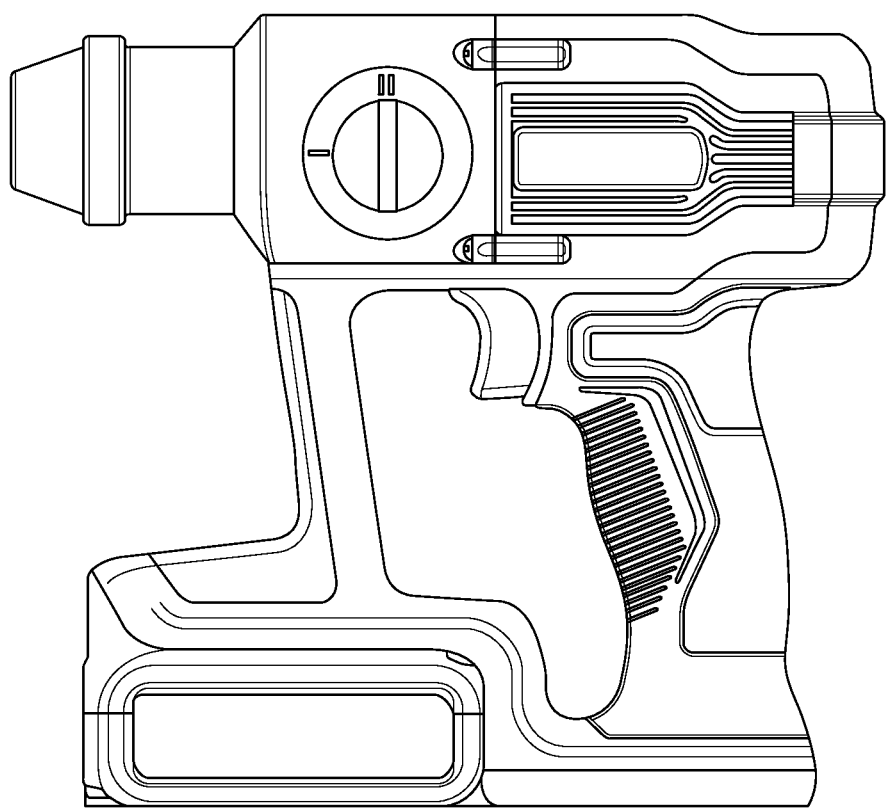
Figure 22:
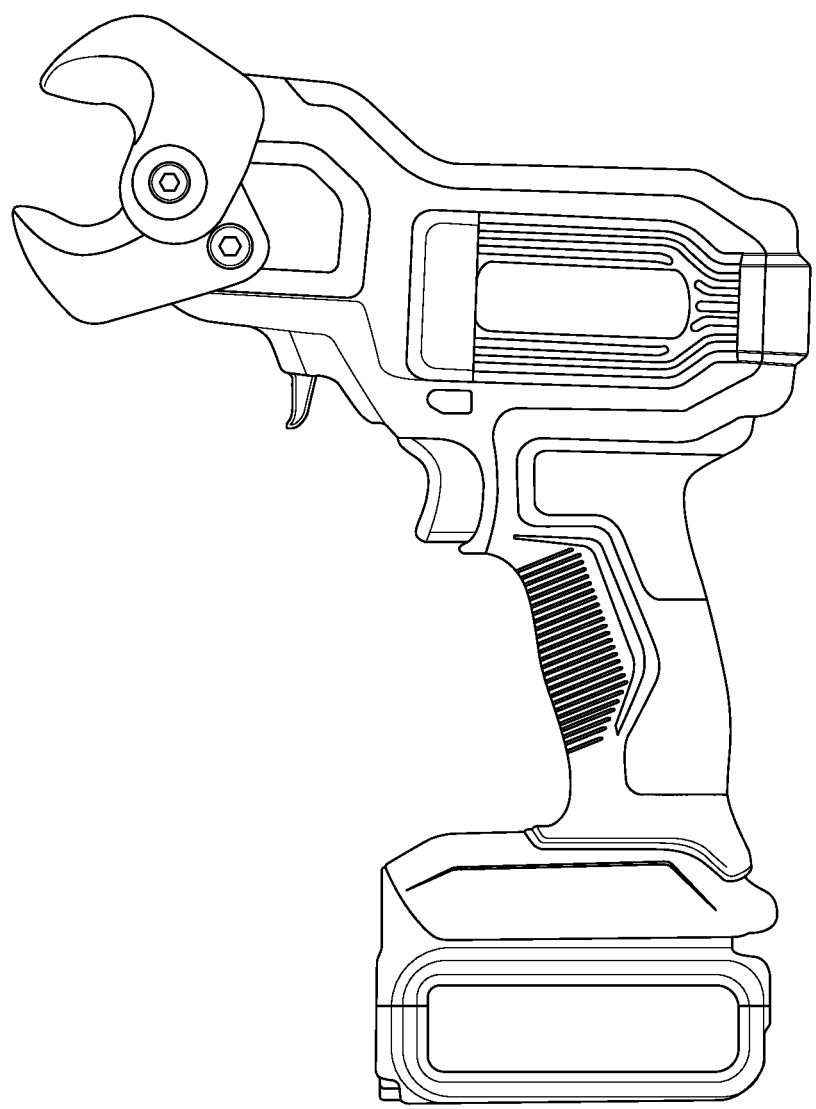
Figure 23:
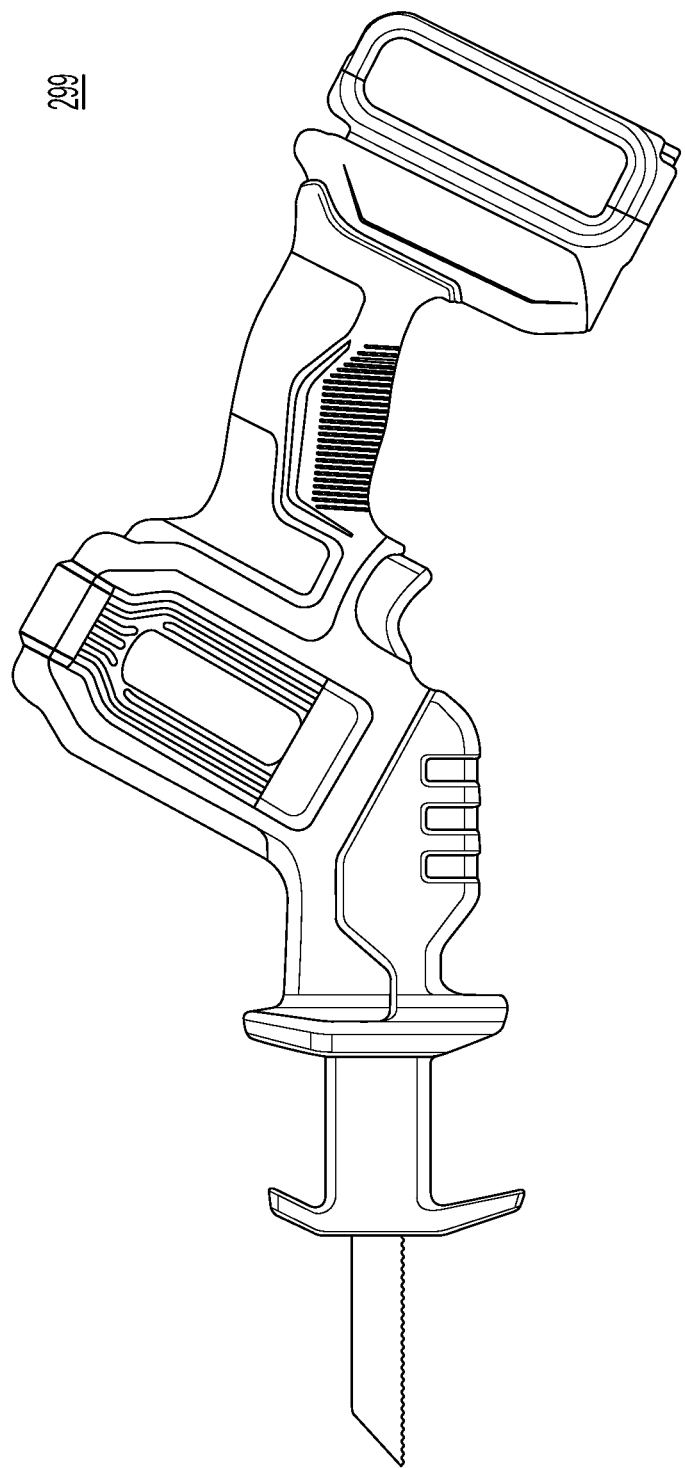

Referring now to FIG. 18 a perspective side view of the motor assembly 200 and heat sinks 120a and 120b is depicted. FIG. 19 depicts a cross-sectional side view of the motor assembly 200. As shown in these figures, due to the external cooling of the motor assembly 200, the number of turns for each winding 222 around stator teeth 292 and through the slots 294 may be significantly increased to a slot fill over 50% or more, preferably to a slot fill of 60% or more, more preferably to a slot fill of 70% or more, more preferably to a slot fill of 80% or more, and even more preferably to a slot fill of 90% or more. This increased slot fill has the effect of increasing the volumetric power density of the motor to levels unachievable with conventional internally-cooled BLDC motors.

According to an embodiment, to improve the thermal bond between the stator winding wires and the stator lamination stack, a variety of techniques may be utilized. These include, but are not limited to, impregnation of the coils with varnish or epoxy, winding the coils in corporation with thermal adhesives and/or filters, use of bondable wire, or overmolding the stator windings.

According to an embodiment, in order to maximize the slot fill, a variety of winding techniques or stator designs may be utilized. For example, instead of conventional needle winders that require insertion of a winding needle into the stator slots to guide the magnet wires, a precision guide winding machine may be used. A precision guide winding machine guides the wires through the stator slots without the need to insert a winding needle into the slot. This allows more magnet wire to be packed around the stator teeth with the slots.

In an embodiment, the gap 296 between adjacent stator teeth 292 may be significantly reduced for better retention of the stator windings within the slots 294.

In an embodiment, the thickness of the stator core 290 may be reduced in comparison to conventional BLDC motors to enhance heat transfer between the heat sinks 120a and 120b and the stator windings 222.

According to an embodiment, as shown in FIGS. 18 and 19, with use of high slot fill as described above, the motor power density can be further improved by increasing the number of stator slots and correspondingly the number of rotor poles. In the illustrated example, nine (9) stator poles are arranged, three of which are commonly coupled to a single phase of the motor 200, and the rotor is provided with six (6) permanent magnet 218.

FIGS. 20-23 depicts various exemplary power tools, including an impact driver 295, a hammer drill 297, a cutter 298, and a reciprocating saw 299, incorporating the partially-enveloped motor 200 of this disclosure. In an embodiment, each of these tools, as well as tool 100 of FIGS. 1-4, is powered by a battery pack having a maximum voltage of approximately 10V to 30V, preferably approximately 20V.

It should be understood that the partially-enveloped motor design described here is not limited to power tools having aforementioned power tools with the aforementioned voltage ratings, and can be used in various power tool having different power requirements. The size and thickness of the heat sinks 120a and 120b, including its fins and air channels, may be varied depending on the motor power requirements and heat dissipation.

Fully-Enveloped Motor

A second embodiment of the invention is described herein with reference to FIGS. 24-37.

Figure 24:
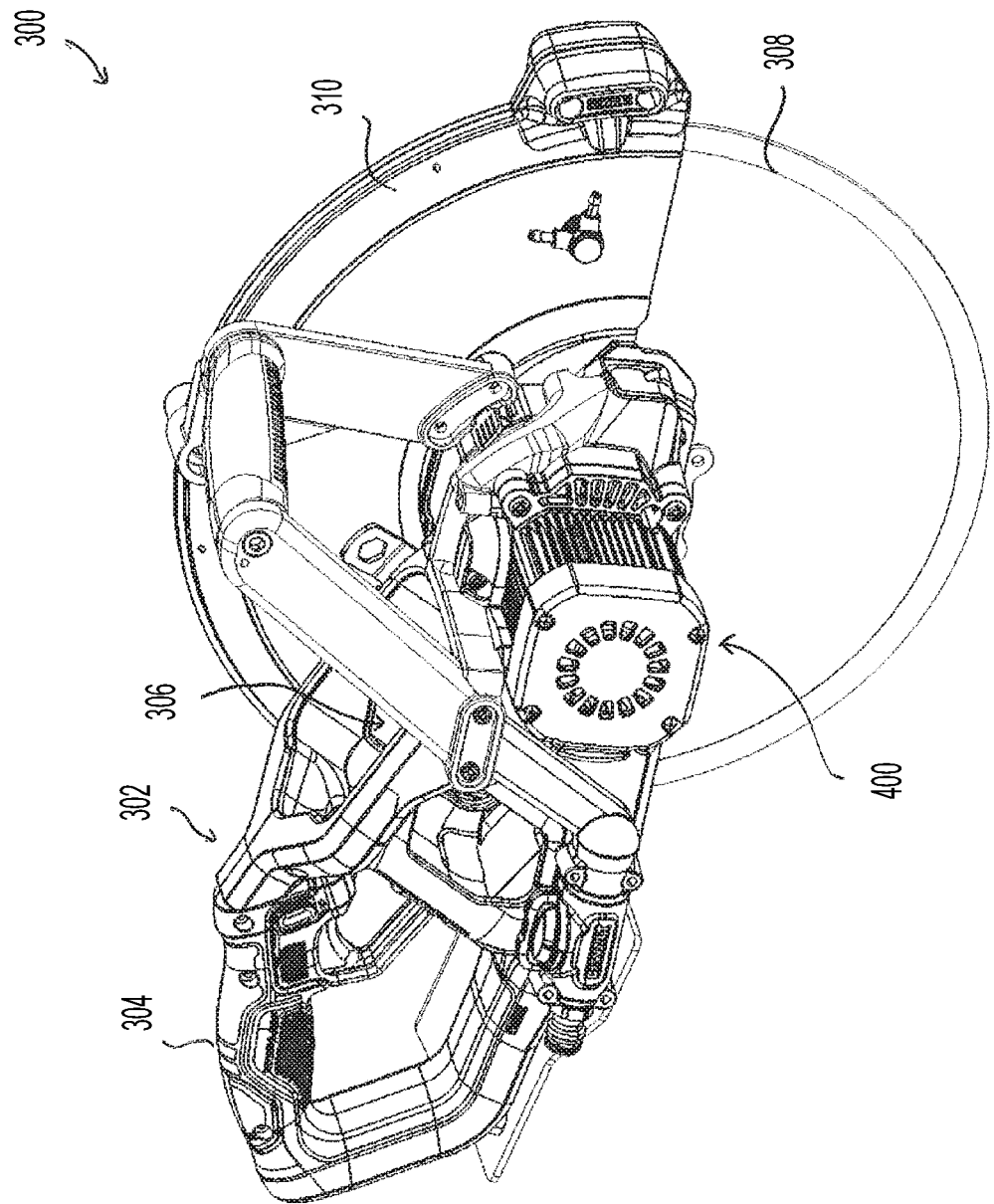
FIG. 24 depicts a perspective view of a power tool having a fully-enveloped motor, according to an embodiment.

FIG. 24 depicts a perspective view of a power tool 300, according to an embodiment of the invention. The power tool 300 in the particular example provided is an electric cordless circular saw. Power tool 300, according to an embodiment, includes a tool housing 302 including a handle portion 304 and a battery receptacle 306 for receiving a battery pack therein. A motor assembly 400, described below in detail, is provided to drive a saw blade 308. A saw guard 310 partially enclosing the blade 308 is mounted around a collar (not shown) to protect the blade 308. For more details of this particular power tool, reference is made to US Patent Publication No. 2014/0366383, which is incorporated herein by reference in its entirety.

In an embodiment, power tool 300 has a higher power output requirement than power tool 100 of the previous embodiment, and thus requires a generally-larger motor assembly that generates more heat as compared to the previous embodiment. It will be appreciated that the power tool 300 of FIG. 24 is merely exemplary and the power tool of this embodiment could be any other type of power tool, particularly medium to high rated voltage power tools receiving 40V to 120V max voltage battery packs, preferably a single 60V max voltage battery pack or two 60V max voltage battery packs arranged in series. Alternatively, the power tool of this embodiment may be one powered by an alternating current (AC) power supply, or a combination of AC and DC power supplies, and include a rectifier circuit to cover AC voltage to DC voltage suitable to energizing the motor 400. These power tools include, but are not limited to, high power drills and impact drivers, hammer drills, reciprocating saws, table saws, grinders, miter saw, mixers, chain saws, etc., or any similar portable power tool constructed in accordance with the teachings of this disclosure.

Figure 25:
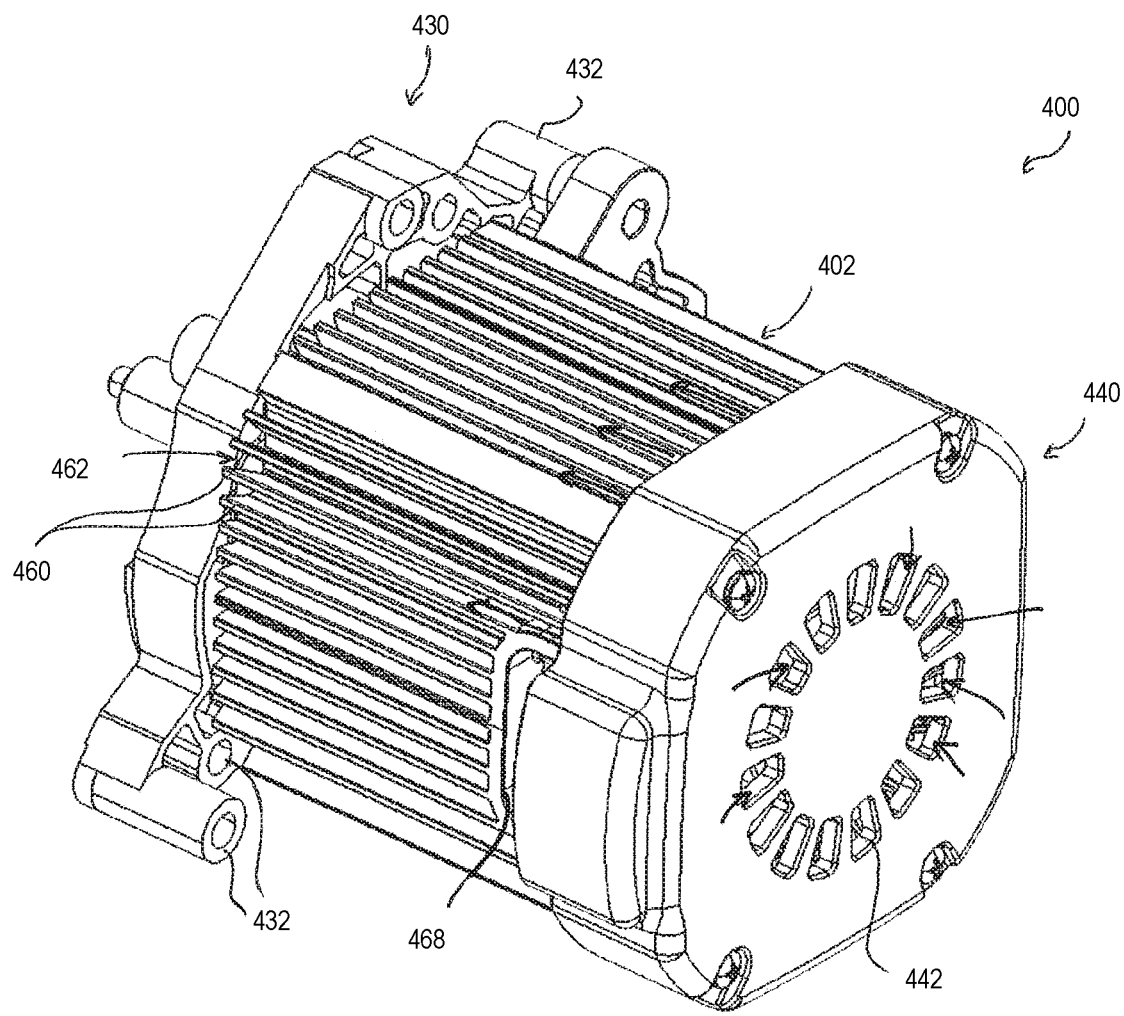
FIG. 25 depicts a perspective view of motor assembly of power tool of FIG. 24, according to an embodiment.
Figure 26:
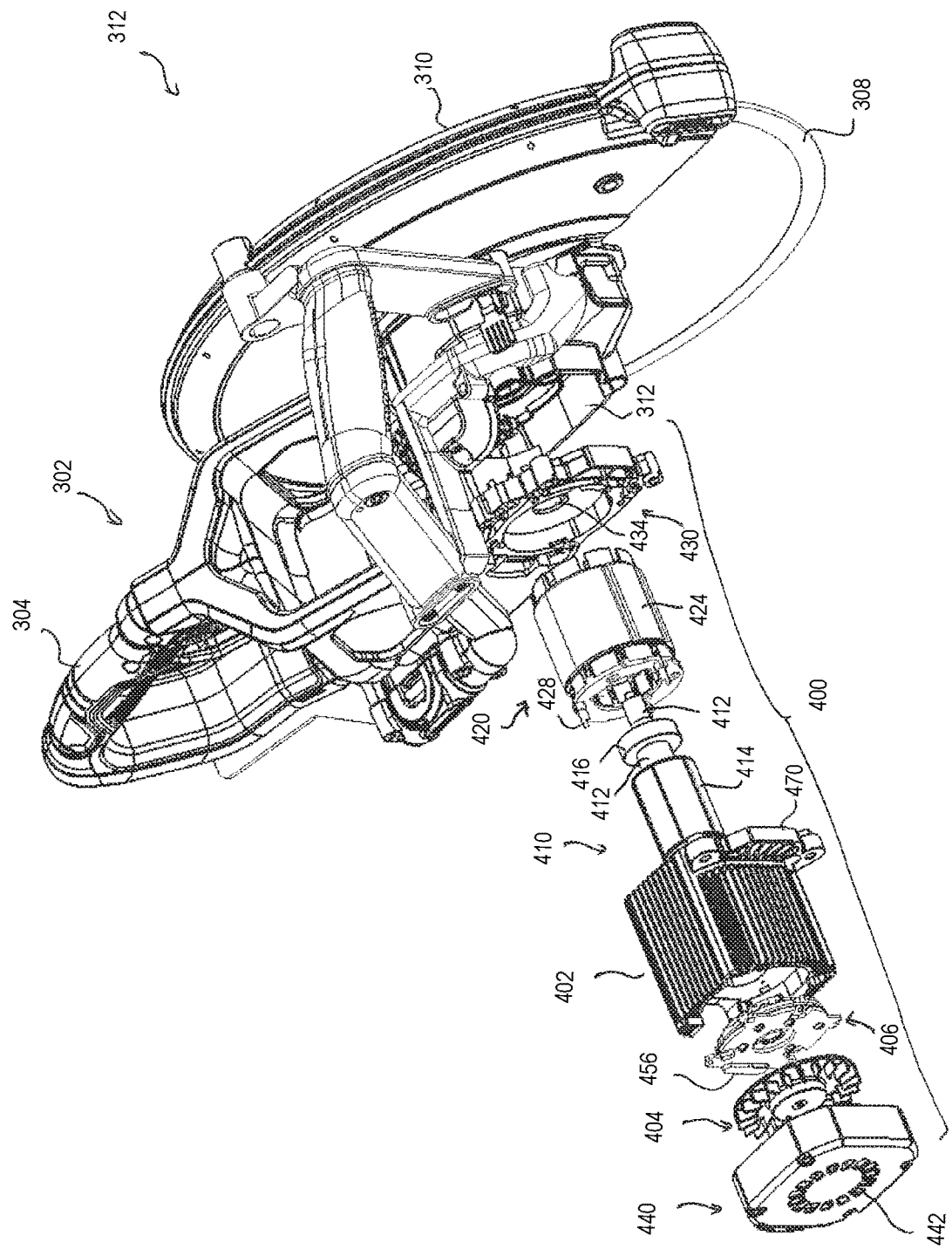
FIG. 26 depicts a top perspective view of power tool, showing an exploded perspective of the motor assembly, according to an embodiment.
Figure 27:
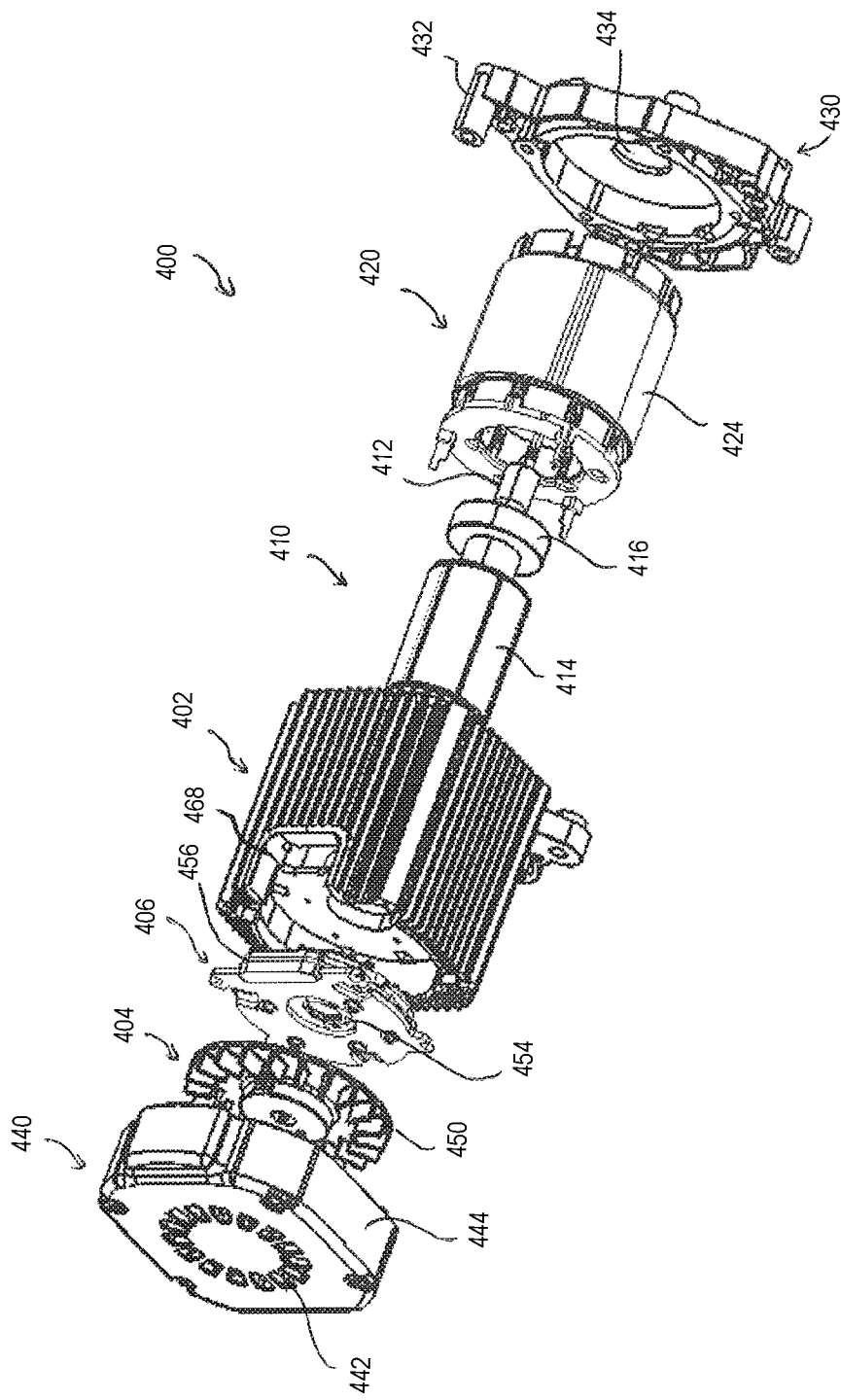
FIG. 27 depicts a bottom exploded view of motor assembly, according to an embodiment.
Figure 28:
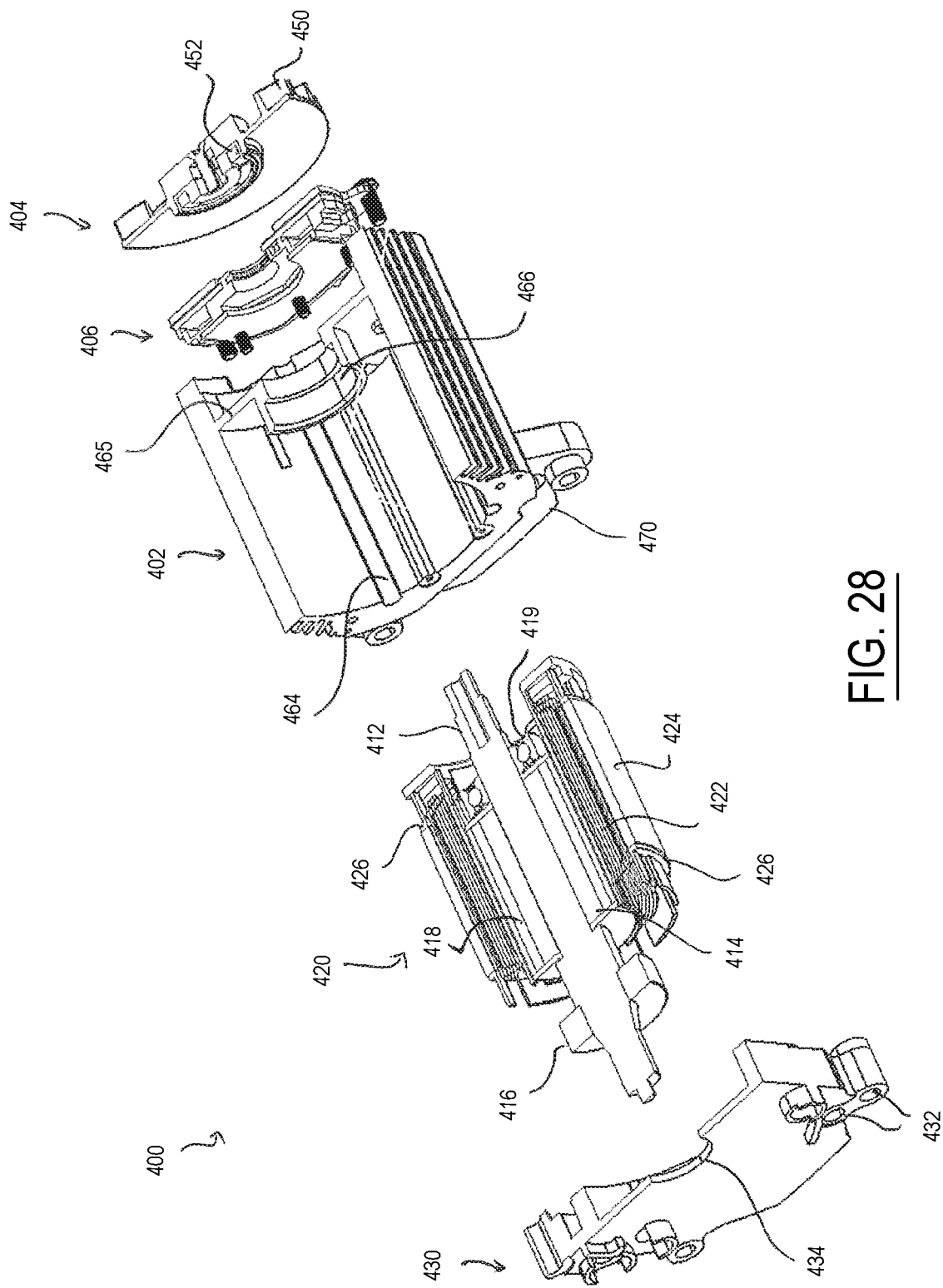
FIG. 28 depicts a top cut-off exploded view of the motor assembly from a different angle than that shown in FIG. 26, according to an embodiment.
Figure 29:
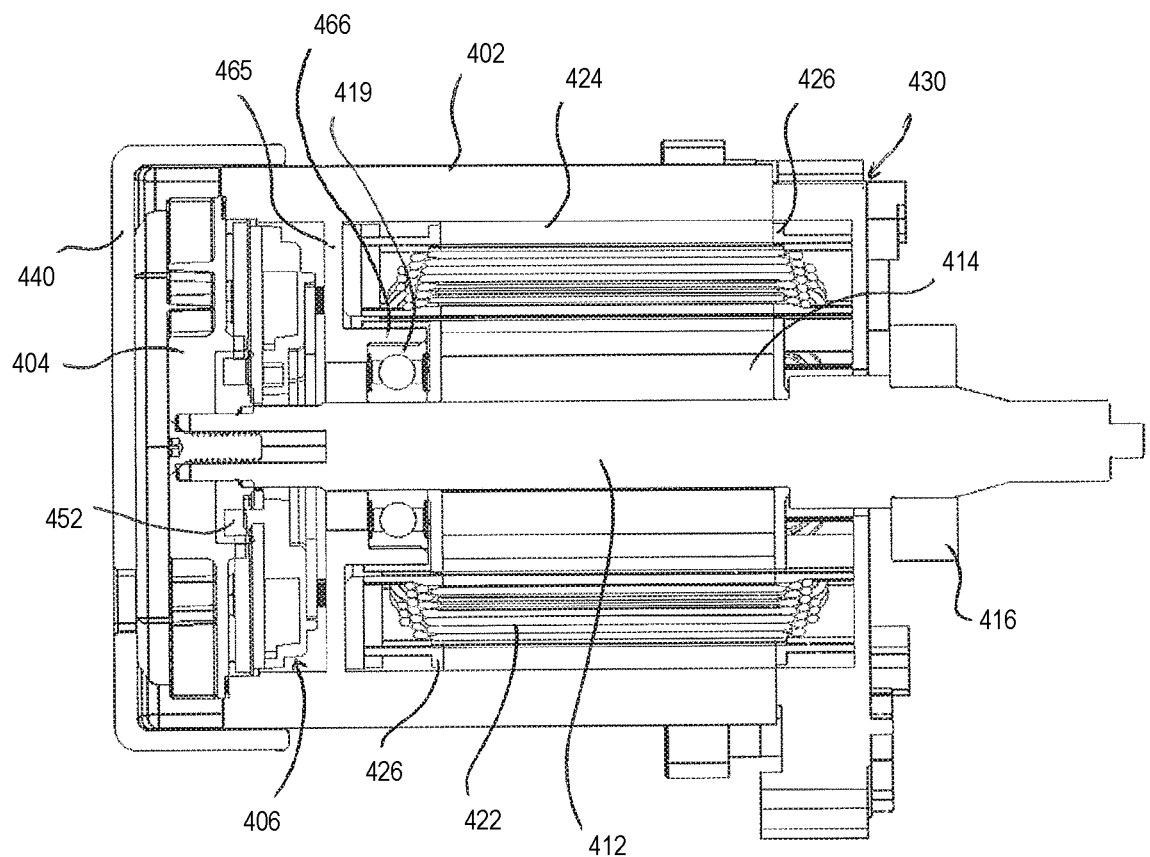
FIG. 29 depicts a side cross-sectional view of the motor assembly, according to an embodiment.

FIG. 25 depicts a perspective view of motor assembly 400 of power tool 300, according to an embodiment. FIG. 26 depicts a top perspective view of power tool 300, showing an exploded perspective of the motor assembly 400. FIG. 27 depicts a bottom exploded view of motor assembly 400. FIG. 28 depicts a top cut-off exploded view of the motor assembly 400 from a different angle than that shown in FIG. 26, according to an embodiment. FIG. 29 depicts a side cross-sectional view of the motor assembly 400, according to an embodiment. Motor assembly 400 is herein described with reference to these figures.

According to an embodiment, similarly to the previously embodiment, motor assembly 400 includes a rotor 410 having a rotor shaft 412 and a rotor lamination stack 414 housing a series of permanent magnets 418, and a stator 420 having a series of stator windings 422 wound on slots of a lamination stack 424 and two end insulators 426. In an embodiment, a rotary fan 404 is mounted on one end of the rotor shaft 412 to rotate with the rotor shaft 412. It should be noted that motor assembly 400 includes many of the same or similar features as motor assembly 200 previously disclosed, and many of the details and alternative and/or additional embodiments disclosed above with reference to motor assembly 200 are applicable in this embodiment.

In an embodiment, a front end cap 430 is provided on one end of the motor assembly 400 for mounting the motor to a mounting bracket 312 of the power tool 300. Front end cap 430 is sized to be fittingly received within mounting bracket 312, and includes peripheral receptacles 432 for fastening the motor assembly 400 to the mounting bracket 312 via a series of fasteners (not shown). Front end cap 430 also includes a center through-hole 434 through which the rotor shaft 412 extends out.

In an embodiment, a driver 416 is mounted near an end of the rotor shaft 412 extending out of the front end cap 430 through-hole 434. Driver 416, in an embodiment, is press-fitted into a corresponding opening (not shown) of an output spindle (not shown) of the power tool 300 to rotatably drive the saw blade 308. The driver 416 thus radially and axially supports the rotor shaft 412 relative to the front end cap 430, and thus relative to the stator 420. Accordingly, a front side bearing is not provided in this particular example. It should be understood, however, that in an alternative embodiment, through-hole 434 of the front end cap 430 may be as a bearing support pocket and the rotor shaft 412 may be correspondingly provided with a front bearing received within the bearing support pocket.

In an embodiment, a rear end cap 440 is provided on an end of the motor assembly 400 opposite the front end cap 430. Rear end cap 440 is provided with air intakes 442 oriented to let air in towards a middle portion of the fan 404. Fan 404 includes blades 450 facing the rear end cap 440 that generate a radial air flow, as discussed below in detail. Fan 404 also houses a sense magnet ring 452 facing the stator 420 and rotor 410. The sense magnet ring 425 includes one or more magnets corresponding to rotor 410 permanent magnets 418 and rotates with the rotor shaft 412.

In an embodiment, an electronic switch and control module 406 is provided between fan 404 and stator 420. In an embodiment, module 406 may include a disc-shaped printed circuit board on which a controller and power switches for controlling the supply of power to the motor assembly 400 are disposed. Module 406 energizes the stator windings 422 via a series of motor terminals 428 received from the stator 420. Module 406 may also include a series of positional sensors 454 mounted on the printed circuit board facing the fan 404. Positional sensor 454 sense the magnetic position of sense magnet ring 425, and thus the rotor 410, and provide that information to the controller. In an embodiment, module 406 further includes a power terminal 456 that receives battery current from the tool battery receptacle 306. For detailed examples of electronic switch and control module 406, reference is made to US Patent Publication No. 2017/0106522 filed on Oct. 13, 2016, and U.S. patent application Ser. No. 15/708,484 filed on Sep. 19, 2017, contents of both of which are incorporated herein by reference in their entireties.

In an embodiment, motor assembly 400 includes an outer heat sink 402 having a generally cylindrical body surrounding the stator 420. Heat sink 402 includes a cylindrical opening that is sized to fittingly receive the stator 420 therein, the inner surface of the heat sink 402 being in thermal and physical contact with the outer surface of the stator lamination stack 424. Since heat sink 402 covers substantially the entire periphery of the stator lamination stack 424, it provides for optimal heat transfer from the stator 420.

The outer surface of heat sink 402, in an embodiment, includes a series of longitudinal fins 460 forming a series of longitudinal air channels 462 therebetween. Air channels 462 are arranged to guide air flow generated by fan 404 along the outer surface of heat sink 402 parallel to the longitudinal axis of the motor 400. Specifically, as fan 404 rotates, it generates air flow from the air intakes 442 in a radially outwardly direction. Peripheral walls 444 of the rear end cap 440 baffle and guide the air into air channels 462 of the heat sink 402. In an embodiment, when fully assembled, rear end cap 440 covers the end of the heat sink 402 in contact with the outer edges of find 460 to guide the air longitudinally into the air channels 462. Fins 460 increase the outer surface area of the heat sink 402, while passage of cooling air through the air channels 462 provides for improved heat dissipation from the heat sink 402.

In an embodiment, air traveling through air channels 462 dissipates into the outside environment at or near the front end cap 430. In an embodiment, part of the air may be guided through the front end cap 430 and mounting bracket 312 to enter into the spindle assembly (not shown) of the power tool 300 for cooling of the power tool 300 components.

In an embodiment, heat sink 402 may be provided integrally with the stator 420 as a single piece. For example, the heat sink 402, including the fins 460 and air channels 462, may be integrally stamped in the outer geometry of the stator lamination stack 424.

In an embodiment, the inner surface of heat sink 402 is provided with piloting and positioning features 464 for proper of the stator 420 within the heat sink 402. In an embodiment, stator 420 is provided with corresponding axial ribs or grooves that align with the piloting and positioning features 464 of the heat sink 402.

In an embodiment, fully envelopment of the stator 420 and rotor 410 within the heat sink 402 in the manner described herein provides an arrangement in which the heat sink 402 is the principal enclosure and support structure for the motor 400 while maximizing interfacial contact with the stator 420 and the heat sink 402 for optimal thermal conduction. In an embodiment, the boundary thermal resistance between the stator 420 and the heat sink 402 may be improved by, for example, application of a thermal bonding compound and interference, and/or placement of compression fits, etc., between the outer surface of the stator 420 and the inner surface of the heat sink 402.

In an embodiment, the inner surface of heat sink 402 is provided with a radial wall 465. In an embodiment, radial wall 465 is provided to axially fix the relative positions of various motor components. In this example, radial wall 465 spatially separates the rotor 410 and stator 420 from the module 406 and the fan 404, receiving the stator 420 form-fittingly from one end heat sink 402 and receiving the module 406 form-fittingly from the other end. Additionally, in an embodiment, radial wall 465 may include a bearing pocket 466 for housing a bearing 419 of the rotor 410. In that manner, heat sink 402, in cooperation with driver 416, provides radial and axial support for the rotor 410 with respect to the stator 420.

In an embodiment, provided peripherally on one end of the heat sink 402 facing the rear end cap 440, an opening 468 is provided. When module 406 is received within the heat sink 402, power terminals 456 of module 406 are accessible through the opening 468.

In an embodiment, one end of the heat sink 402 facing the front end cap 430 is provided with one or more mounting structures 470. Mounting structure 470 includes throughholes 472 through which fasteners (not shown) secure the heat sink 402 to receptacles 432 of the front end cap 430 and/or the mounting bracket 312.

Figure 30:
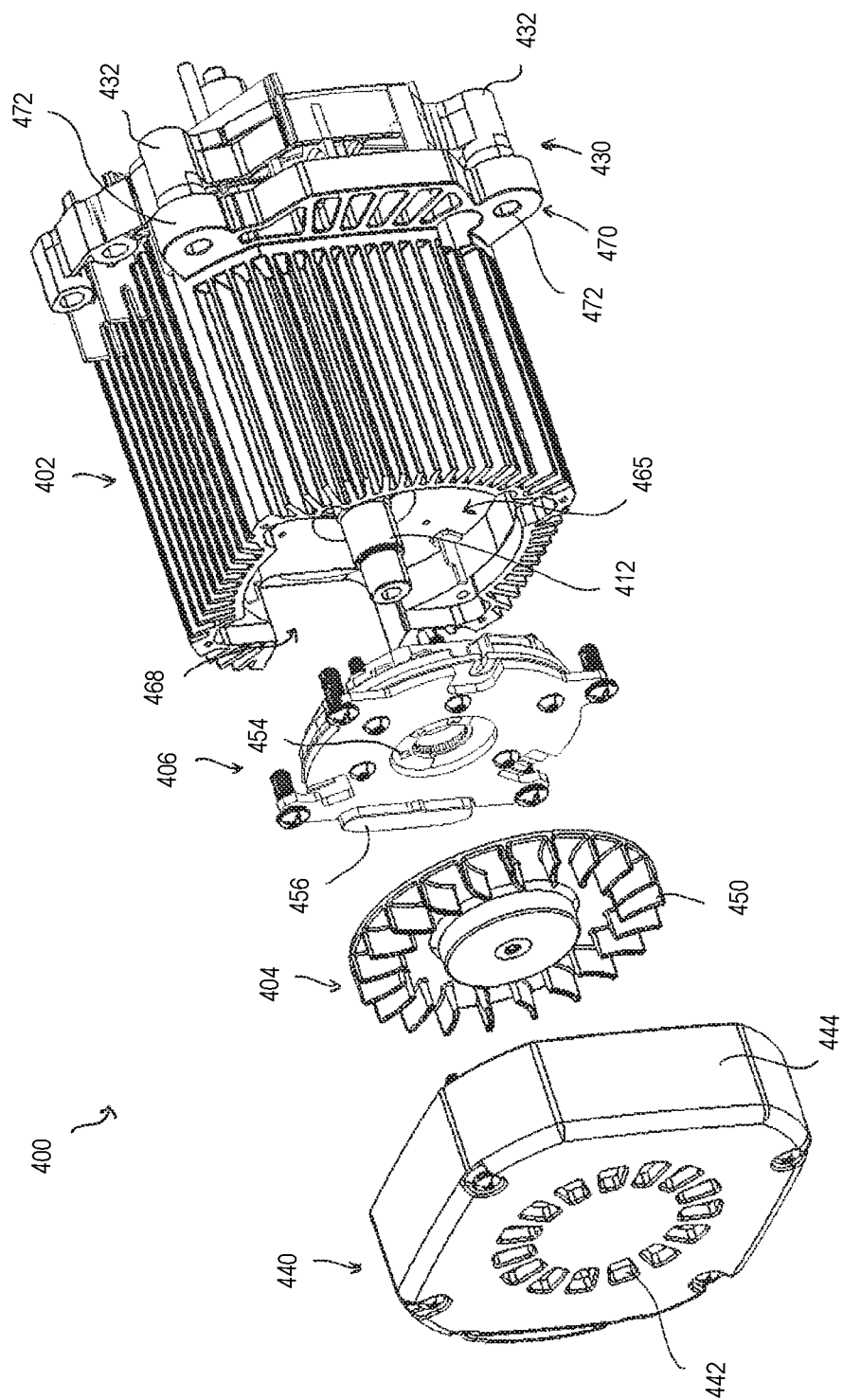
FIGS. 30 and 31 depict partially exploded views of motor assembly following the assembly of rotor and stator within the heat sink, but prior to assembly of module and fan, according to an embodiment.
Figure 31:
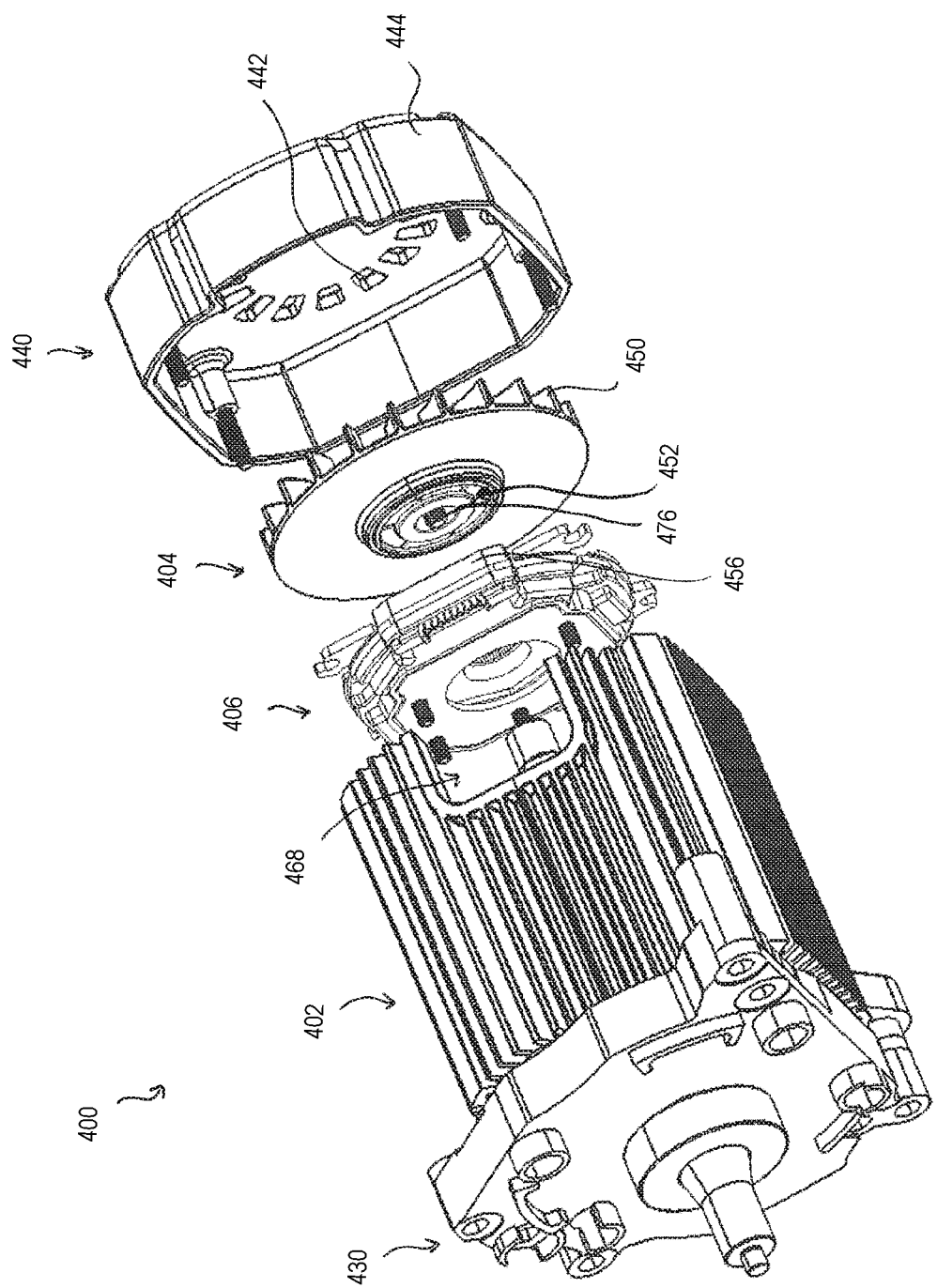
Figure 32:
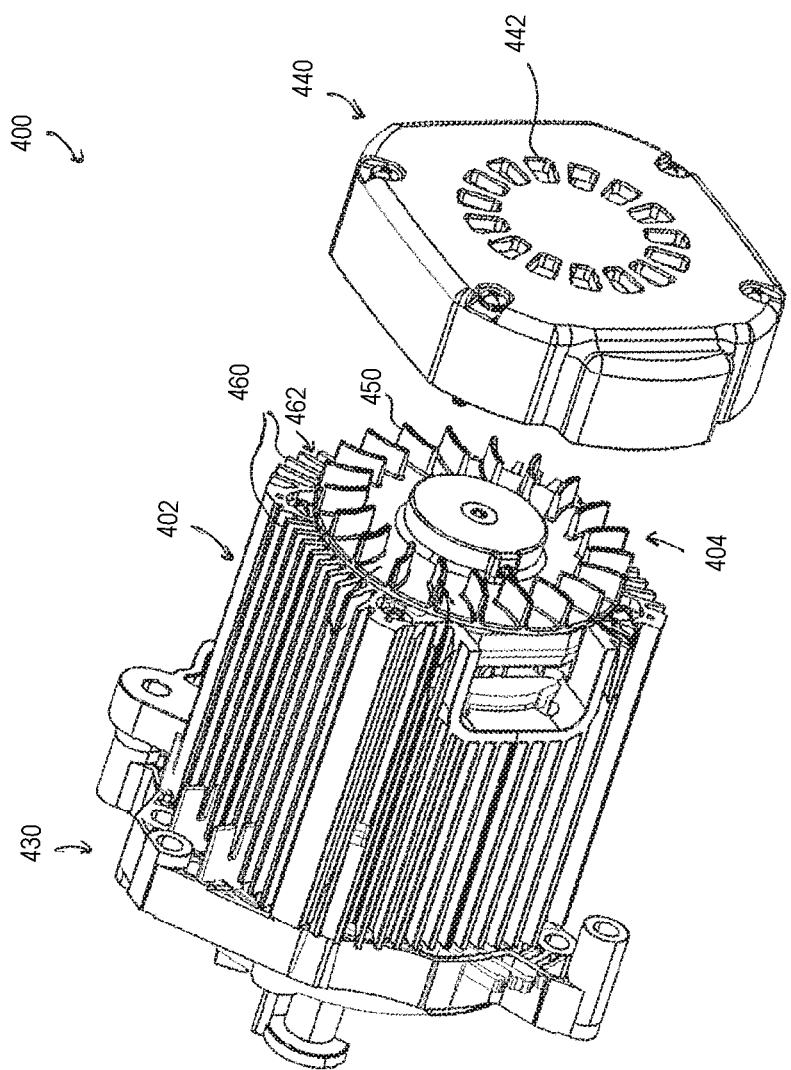
FIG. 32 depicts a perspective view of motor assembly, prior to assembly of rear end cap, according to an embodiment.

Referring to FIGS. 30 and 31, partially exploded views of motor assembly 400 is depicted following the assembly of rotor 410 and stator 420 within the heat sink 402, but prior to assembly of module 406 and fan 404, according to an embodiment. FIG. 32 depicts a perspective view of motor assembly 400, prior to assembly of rear end cap 440, according to an embodiment.

As shown in these figures, module 406 may be form-fittingly received within the inner surface of the heat sink 402. Alternatively and/or additionally, module 406 may include a series of fasteners 474 that securely fasten the module 406 to radial wall 465 of the heat sink 402.

In an embodiment, fan 404 includes a center receptacle 476 into which the end of the rotor shaft 412 is secured. Once mounted on the end of the rotor shaft 412, fan 404 substantially aligns with the end of the heat sink 402 with fan blades 450 being disposed outside the envelope of the heat sink 402. This arrangement allows the fan blades 450 to generate airflow that is directed to air channels 462 on the outer surface of the heat sink 402, and not into the inner envelope of the heat sink 402.

In an embodiment, the rotor shaft 412, the radial wall 465, and the heat sink 402 are sized to ensure that fan 404 is positioned in close proximity and parallel to the module 406 to facilitate proper magnetic sensing of the sense magnet ring 452 of the fan 404 by positional sensors 454 of module 406.

In an embodiment, power terminals 456 of module 406 (which in an embodiment is provided as a part of a connector which may include communication signals for other functions in addition to power transfer) are slidingly received within opening 468 and covered by peripheral wall 444 of the rear end cap 440. In an embodiment, the area around the terminals may then be covered by resin or other sealant material.

Figure 33:
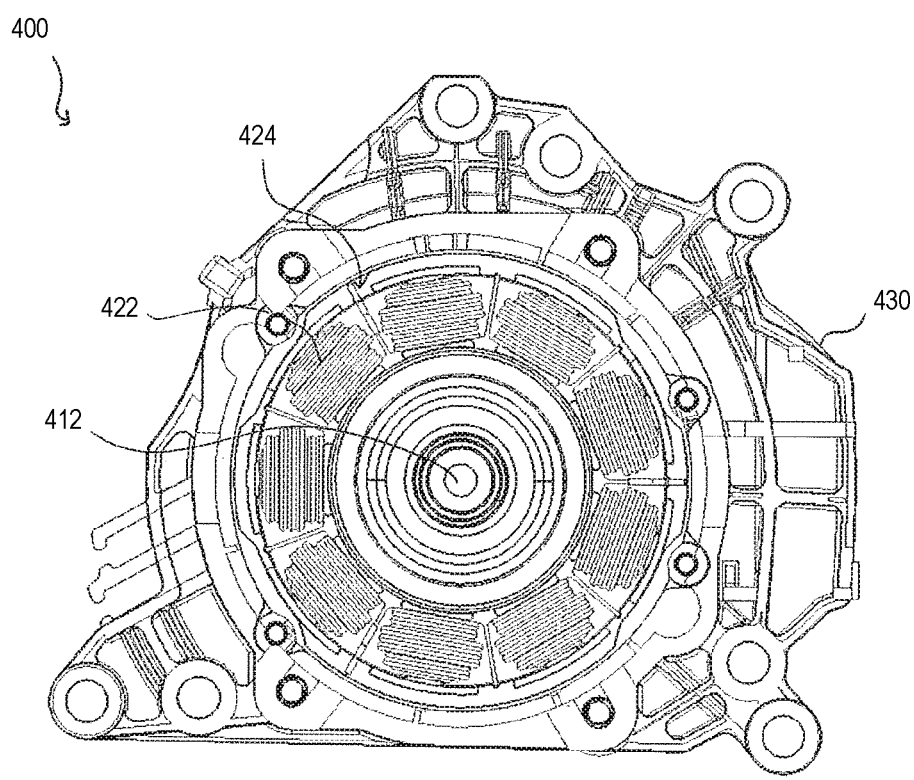
FIG. 33 depicts a perspective side view of the motor assembly from a front side of the radial wall of the heat sink, according to an embodiment.
Figure 34:
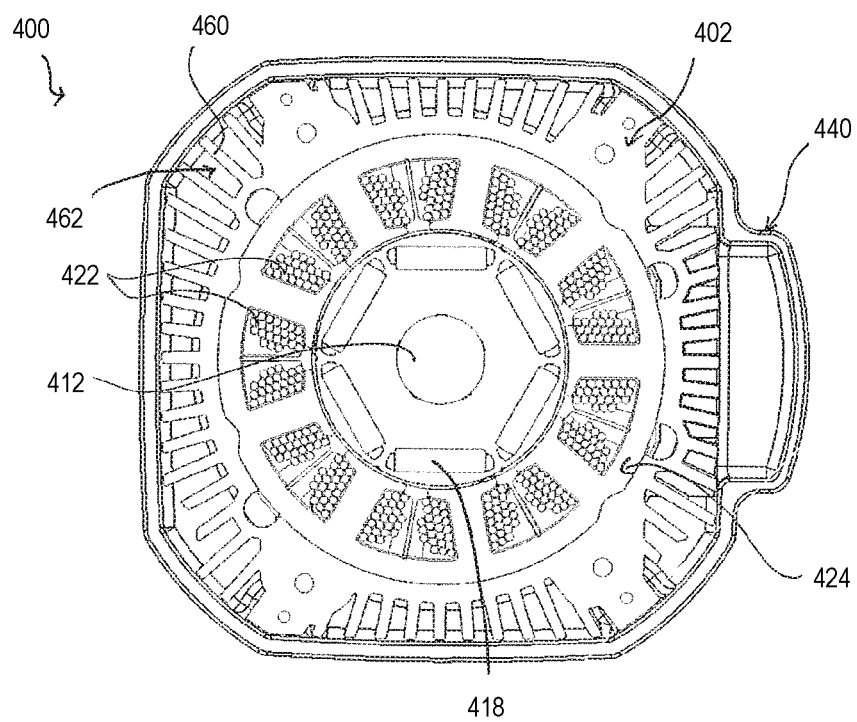
FIG. 34 depicts a cross-sectional view of the motor assembly from a rear side of the front end cap, according to an embodiment.

Referring now to FIG. 33, a perspective side view of the motor assembly 400 from a front side of the radial wall 465 of the heat sink 402 is depicted. FIG. 34 depicts a cross-sectional view of the motor assembly 400 from a rear side of the front end cap 430. As shown in these figures, due to the external cooling of the motor assembly 400, the number of turns for each winding 422 around stator teeth may be significantly increased to a slot fill over 50% or more, preferably to a slot fill of 60% or more, more preferably to a slot fill of 70% or more, more preferably to a slot fill of 80% or more, and even more preferably to a slot fill of 90% or more. This increased slot fill has the effect of increasing the volumetric power density of the motor to levels unachievable with conventional internally-cooled BLDC motors.

According to an embodiment, to improve the thermal bond between the stator winding wires and the stator lamination stack, a variety of techniques may be utilized. These include, but are not limited to, impregnation of the coils with varnish or epoxy, winding the coils in corporation with thermal adhesives and/or filters, use of bondable wire, or overmolding the stator windings.

According to an embodiment, in order to maximize the slot fill, a variety of winding techniques or stator designs may be utilized. For example, instead of conventional needle winders that require insertion of a winding needle into the stator slots to guide the magnet wires, a precision guide winding machine may be used. A precision guide winding machine guides the wires through the stator slots without the need to insert a winding needle into the slot. This allows more magnet wire to be packed around the stator teeth with the slots.

In an embodiment, the gap between adjacent stator teeth may be significantly reduced for better retention of the stator windings within the slots.

In an embodiment, the thickness of the stator core may be reduced in comparison to conventional BLDC motors to enhance heat transfer between the heat sink 402 and the stator windings 422.

According to an embodiment, with use of high slot fill as described above, the motor power density can be further improved by increasing the number of stator slots and correspondingly the number of rotor poles. In the illustrated example, nine (9) stator poles are arranged, three of which are commonly coupled to a single phase of the motor 400, and the rotor is provided with six (6) permanent magnet 418.

Figure 35:
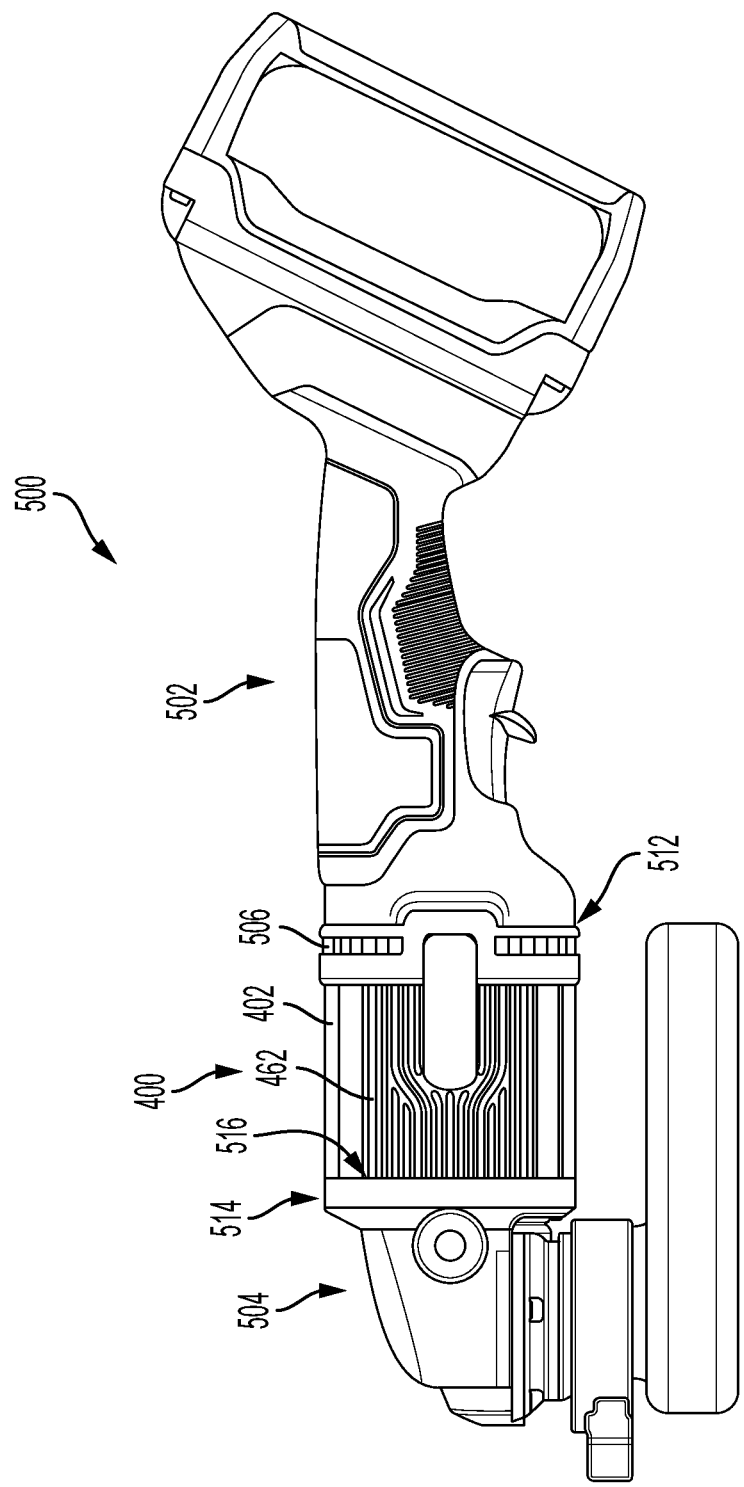
FIG. 35 depicts a side view of an exemplary angle grinder including the fully-enveloped motor of this disclosure, according to an embodiment.
Figure 36:
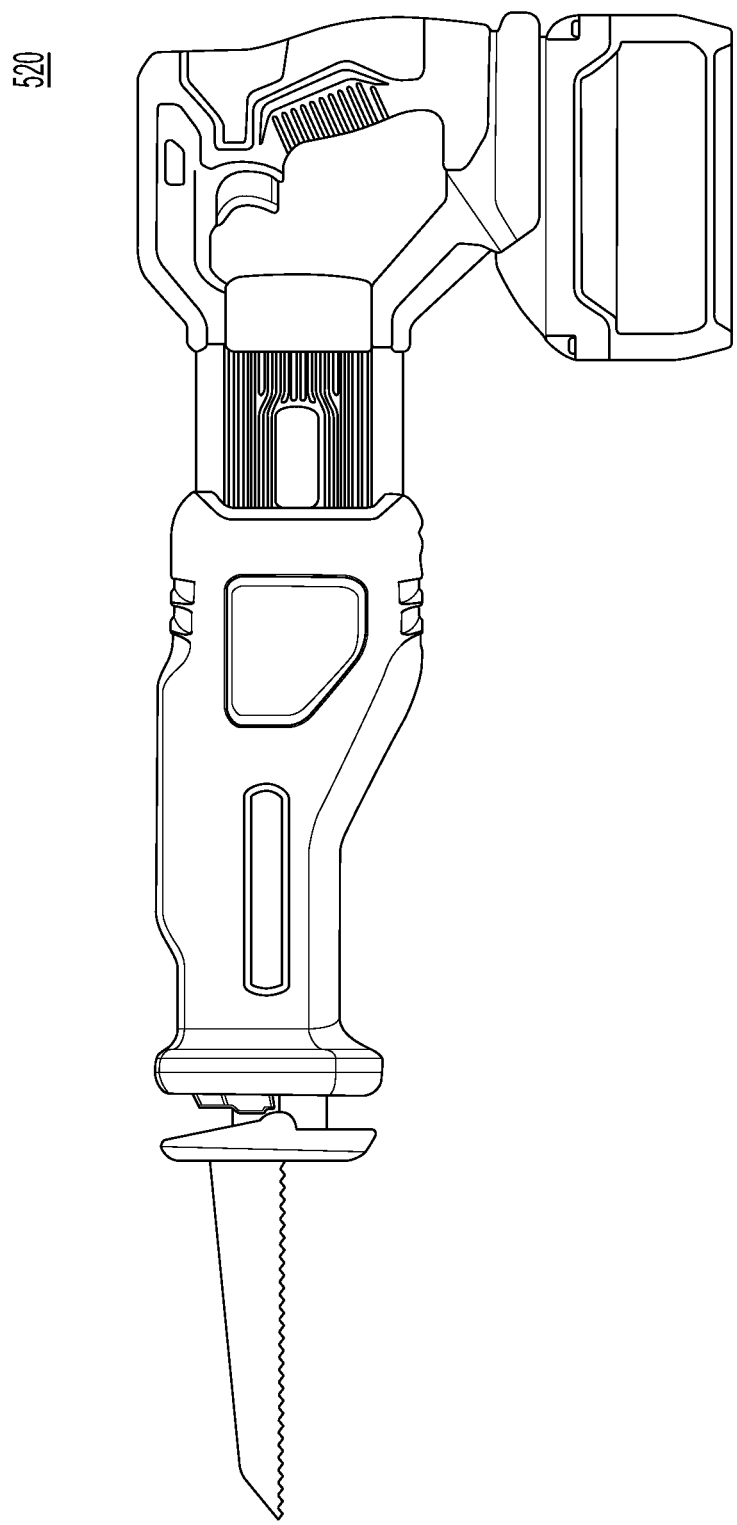
FIGS. 36 and 37 depict side views of an exemplary reciprocating saw and an exemplary hammer including the fully-enveloped motor of this disclosure, according to an embodiment.
Figure 37:
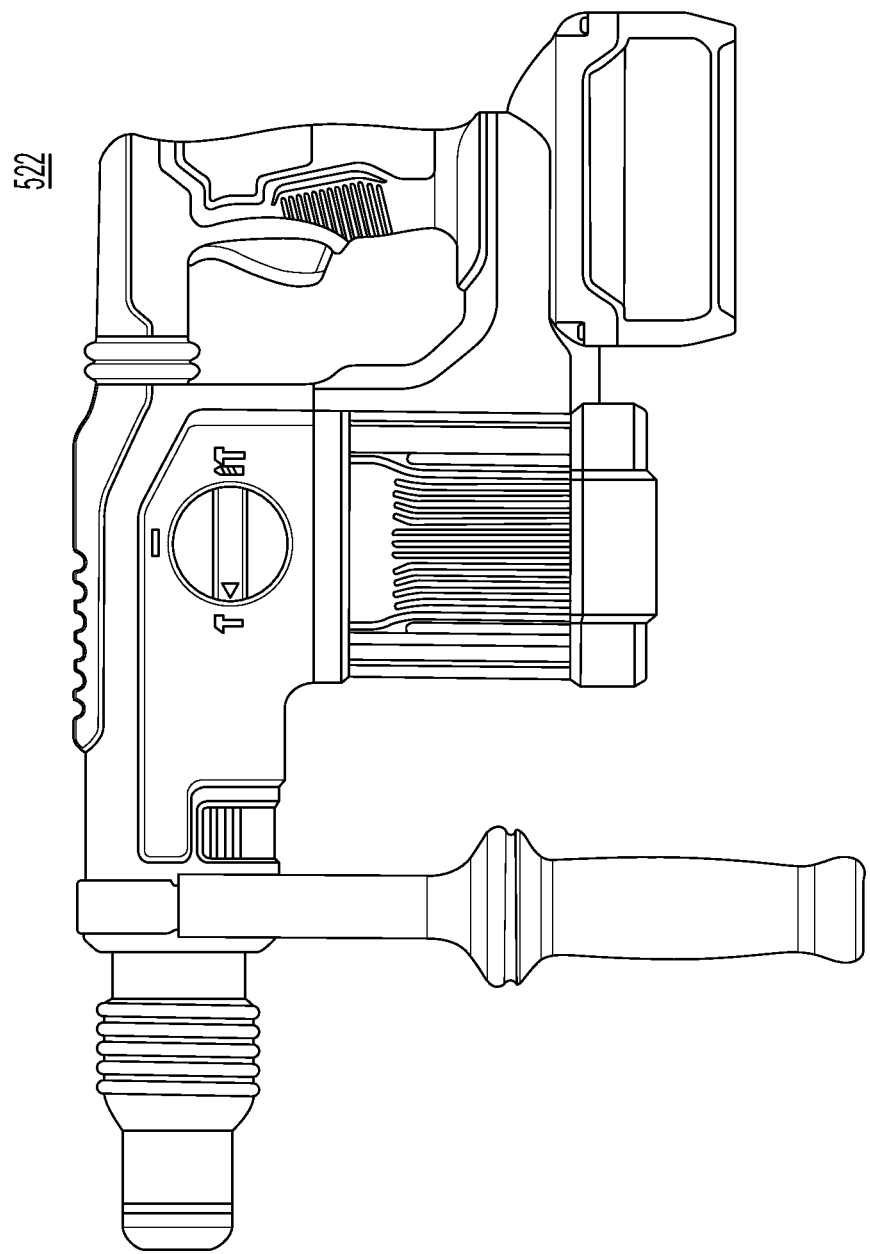

FIGS. 35-37 depict various exemplary power tools, including a grinder 500, a reciprocating saw 520, and a hammer 522, incorporating the fully enveloped motor 400 of this disclosure. In an embodiment, each of these tools, as well as tool 300 of FIG. 24, is powered by a battery pack having a maximum voltage of approximately 40V to 80V, preferably approximately 60V.

It should be understood that the fully-enveloped motor design described here is not limited to power tools having higher power output requirements, and can be used in various power tool having different power requirements. The size and thickness of the heat sink 402, including its fins and air channels, may be varied depending on the motor power requirements and heat dissipation.

In an embodiment, as shown in FIG. 35, motor assembly 400 may be provided along a main axis of the power tool 500 where heat sink 402 is gripped by the user. In this exemplary power tool, a handle portion 502 of the tool is disposed on one side of the motor assembly 400, and gear case 504 is disposed on the other side of the motor assembly 400 opposite the handle portion 502. A front end 512 of the handle portion 502, the heat sink 402, and a rear end 514 of the gear case 504 are provided with approximately the same girth for a substantially uniform tool body. Instead of a rear end cap 440 with axial air intakes 442, in this embodiment, a series of radial air intakes 506 are disposed between the front end 512 of handle portion 502 and the heat sink 402. One of more baffles (not shown) guide the incoming air from the air intakes 506 towards a center portion of the fan, where the air is radially redirected and pushed into the air channels of the heat sink 400 along the tool body. In an embodiment, the front end 514 of the transmission housing may be provided with additional air vents 516 arranged in fluid communication with air channels 462 of the heat sink 402, through which the air traveling through the air channels 462 enters the gear case 504 for cooling the gear case 504 components.

In an embodiment, a surface coating may be applied to the outer surfaces of the fins 460 to increase the thermal resistance of the outer surface of the heat sink 402. This prevents the gripping area of the heat sink 402 from getting too much and burning a user's hand. The coating may also assist in containing airflow within the heat channels 462.

In the embodiments described above, external cooling via the partially-enveloping heat sinks (first embodiment) or fully enveloping heat sink (second embodiment) eliminates the need for air from entering the enclosure of the motor. As a result, in the embodiments of the invention, the motor enclosure may be designed so as to provide total enclosure, i.e., closure or sealing of openings to prevent fluid communication between the inside components of the motor and the outside environment. This is of particular interest with power tool motors as contamination from the environment, e.g., rain, mud, oil, concrete aggregate, metal ingestion, etc., are all common causes of motor failure.

This may be accomplished by providing sealing materials applied or disposed between mating surfaces of various motor components. For example, in the partially-enveloped design of the first embodiment, the mating surfaces of the front and real bearing support structures and the heat sinks may be provided with sealing material. Similarly, in the fully-enveloped design of the second embodiment, the mating surfaces of the front end cap and the heat sink, and the mating surfaces of the electronic switch and control module and the inner surface of the heat sink, may be provided with sealing material. Such material may include, but are not limited to, adhesives, grease, gaskets, O-rings, compressive fits, etc., provided for increased levels of sealing.

In addition, in an embodiment, various openings such as those provided for disposition of connectors and terminals may be sealed with application of material such as grommets, adhesives, potting, and other gap filling and/or coating measures with the ultimate goal of total motor enclosure.

Fully Enveloped and Sealed Motor

Referring now to FIGS. 38-44, a third embodiment of the invention is describe herein. In this embodiment, front and rear support structures for the rotor bearings are provided within a sealing material (e.g., O-rings) within a fully-enveloping heat sink. The front and rear bearing support structures, in addition to providing positional support for the rotor relative to the stator, fully seal the axial ends of the rotor and stator assemblies from fluid communication with the outside environment.

Figure 38:
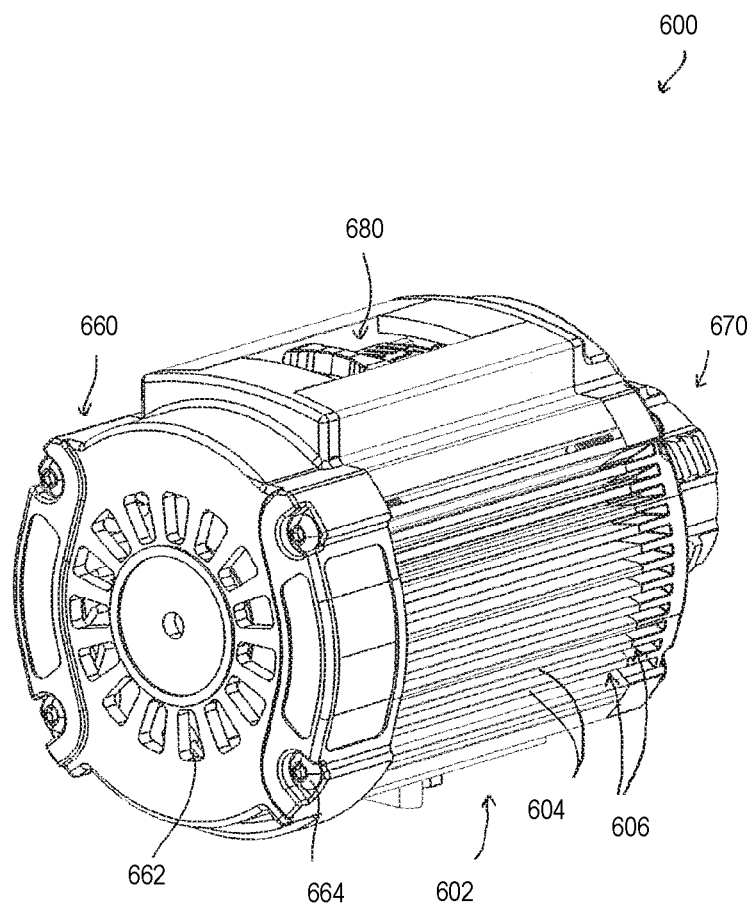
FIG. 38 depicts a perspective view of a fully-sealed motor assembly, according to an embodiment.
Figure 39:
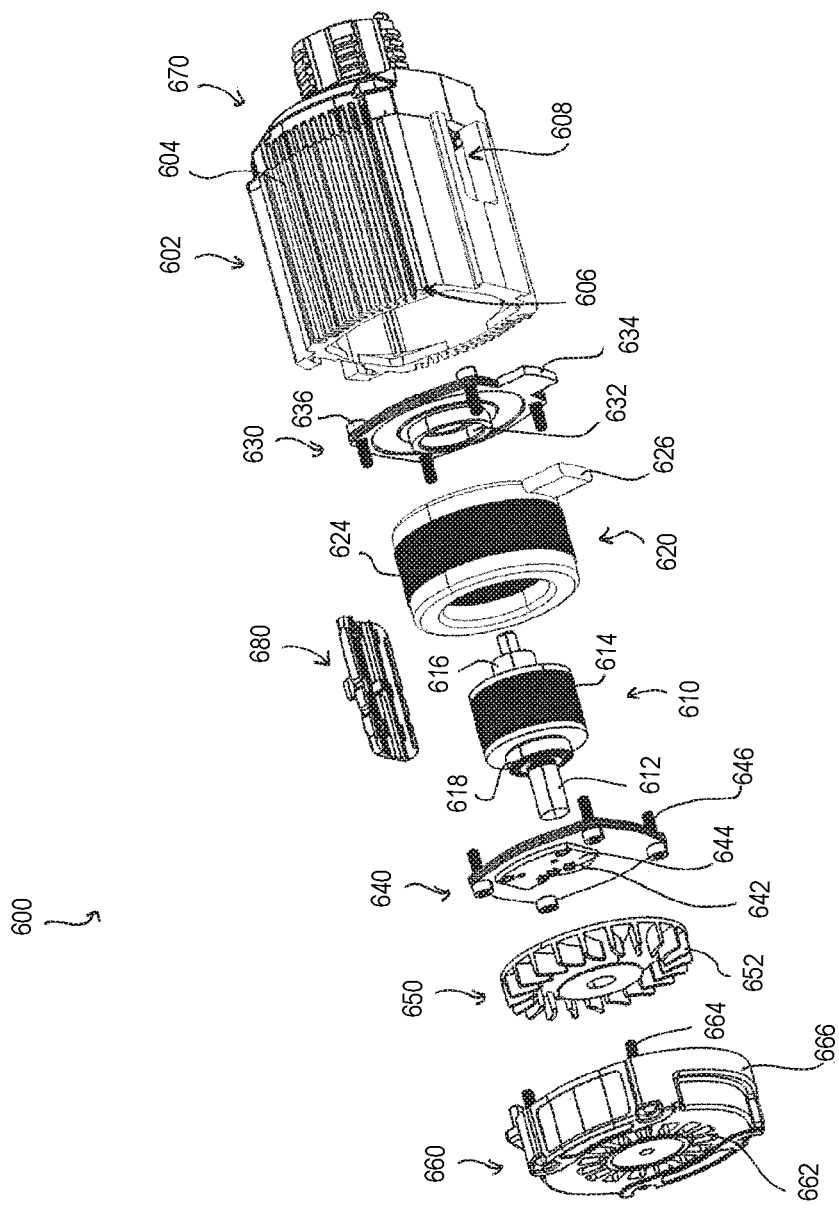
FIG. 39 depicts a bottom exploded view of motor assembly of FIG. 38, according to an embodiment.
Figure 40:
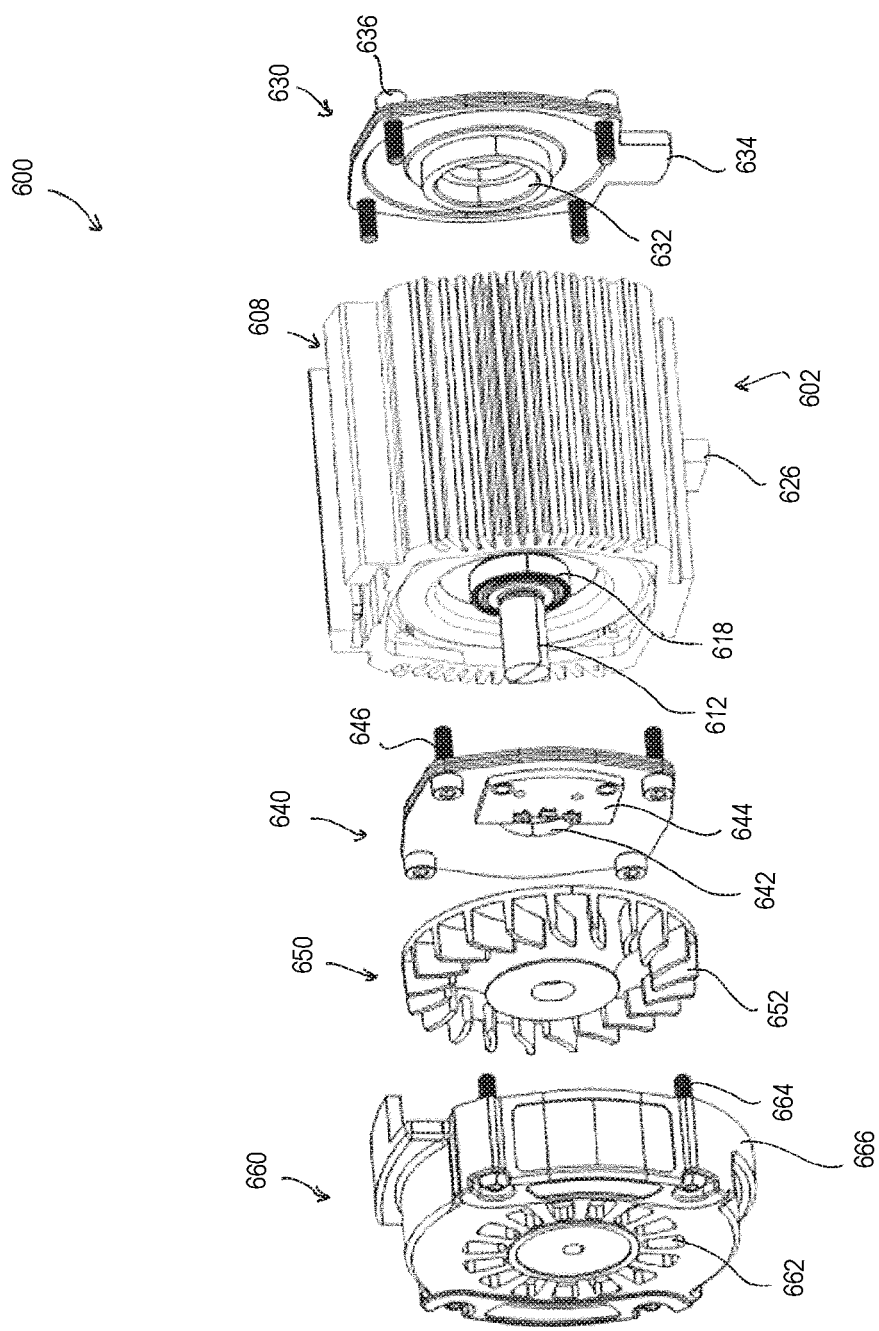
FIG. 40 depicts a top exploded view of the motor assembly without the transmission assembly, according to an embodiment.
Figure 41:
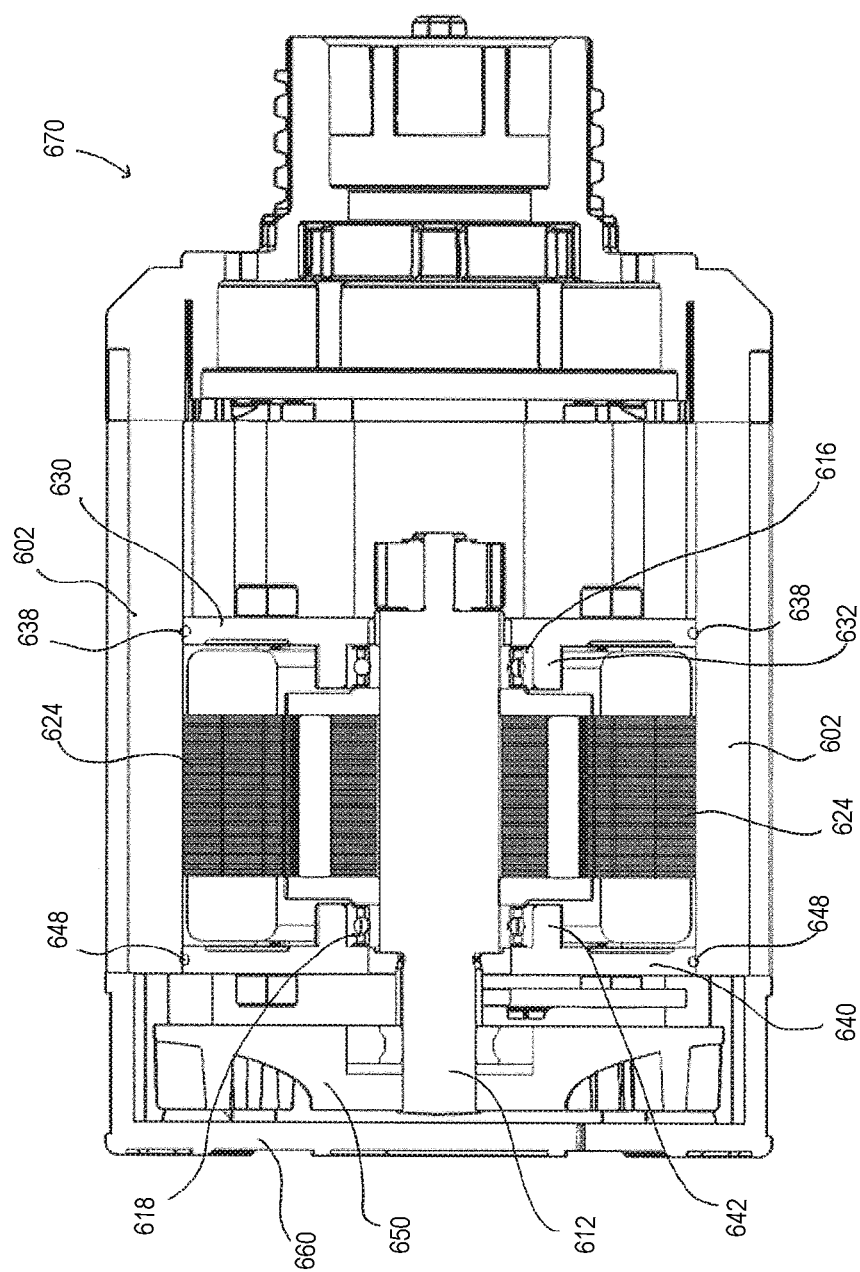
FIG. 41 depicts a side cross-sectional view of the motor assembly, according to an embodiment.

FIG. 38 depicts a perspective view of a motor assembly 600, according to an embodiment. FIG. 39 depicts a bottom exploded view of motor assembly 600, according to an embodiment. FIG. 40 depicts a top exploded view of the motor assembly 600 without the transmission assembly, according to an embodiment. FIG. 41 depicts a side cross-sectional view of the motor assembly 600, according to an embodiment. Motor assembly 400 is herein described with reference to these figures.

Similarly to above-described embodiments, motor assembly 600 a rotor 610 having a rotor shaft 612 and a rotor lamination stack 614 housing a series of permanent magnets, and a stator 620 having a series of stator windings wound on slots of a lamination stack 624. In an embodiment, a rotary fan 650 is mounted on one end of the rotor shaft 612 to rotate with the rotor shaft 612.

It should be noted that motor assembly 600 includes many of the same or similar features as motor assemblies 200 and 400 previously disclosed, and many of the details and alternative and/or additional embodiments disclosed above with reference to motor assemblies 200 and 400 are applicable in this embodiment.

In an embodiment, similarly to above-described embodiments, motor assembly 600 includes a heat sink 602, similarly to embodiments described above, is substantially-cylindrical with outer find 604 defining longitudinal air channels 604 in between formed on the outer surface of the heat sink 602. Heat sink 602 includes a peripheral opening 608 for disposition of motor connector and/or terminal, as described below.

In an embodiment, heat sink 602 additionally includes a switch receptacle 608 that slidingly receives a mode/speed selector switch 680 therein. Switch 680 may be used in some power tool applications such as, for example drills.

In an embodiment, a transmission housing 670 is disposed on a front end of the heat sink 602, and a rear end cap 660 is disposed on a rear end of heat sink 602.

In an embodiment, a rear end cap 660 is provided with air intakes 662 oriented to let air in towards a middle portion of the fan 650. Fan 650 includes blades 652 facing the rear end cap 660 that generate a radial air flow towards away from a center of the fan 650. Peripheral walls 666 of the rear end cap 660 redirect the air generated by the fan 650 axially into the air channels 606 of the heat sink, similarly to embodiments disclosed above. Fan 650 also houses a sense magnet ring (not shown) facing the stator 620 and rotor 610, similarly to embodiments disclosed above.

In an embodiment, front and rear bearings 616 and 618 are mounted on the rotor shaft 612 on two sides of the rotor lamination stack 620. Front and rear bearing support structures 630 and 640 are provided adjacent the ends of the stator 620 and rotor 610 to spatially receive and support the front and rear bearings 616 and 618, respectively. Front bearing support structure 630 includes a bearing pocket 632 that form-fittingly receives an outer race of the front bearing 616. Similarly, rear bearing support structure 640 includes a bearing pocket 642 that form-fittingly receives an outer race of the rear bearing 618. Front and rear bearing support structures 630 and 640 are respectively provided with fasteners 636 and 646 that securely fasten them to the ends of the stator 620.

In an embodiment, rear bearing support structure 640 includes a positional sensor board 644, which as described in the embodiments disclosed above, faces the sense magnet ring of the fan 650.

The stator 626 includes a connector 620 projecting radially from an end of the stator 620. Connector 626 may accommodate motor terminals or other communication signals to and/or from motor switches and/or the controller (not shown). In an embodiment, front bearing support structure 630 includes a connector tab 634 corresponding to the shape of the connector 626.

During assembly of motor assembly 600, stator 610 and rotor 620 are together received from a front end of the heat sink 602 into an inner envelope of the heat sink 602, with connector 626 received within the opening 608 of the heat sink 602. Front bearing support structure 630 is also received from the front end of the heat sink 602, with connector tab 634 received through the opening 608 adjacent or in contact with the connector 626. Rear bearing support 640 is received through a rear end of the heat sink 604.

Figure 42:
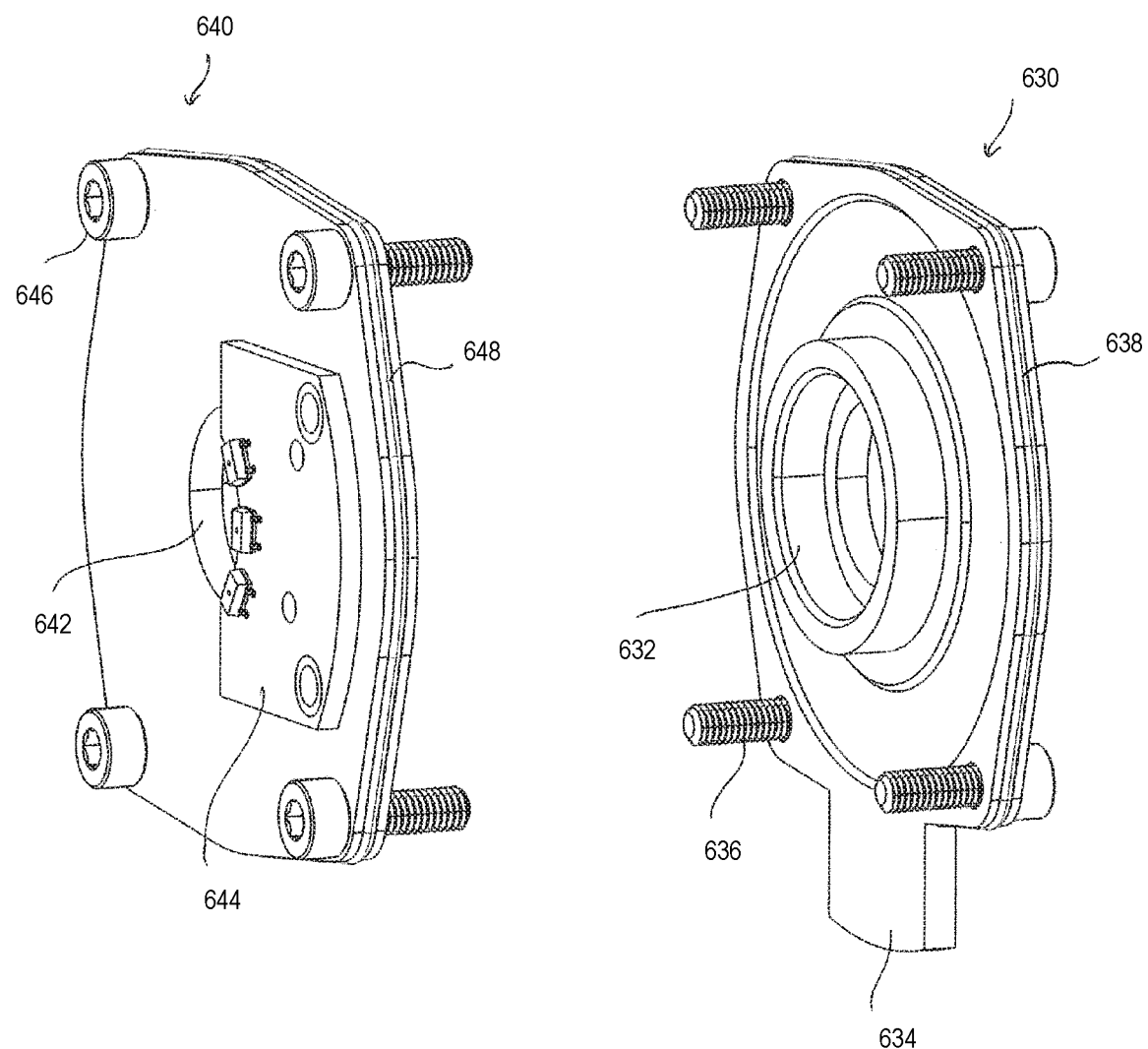
FIG. 42 depicts a perspective view of front and rear bearing support structures, according to an embodiment.
Figure 43:
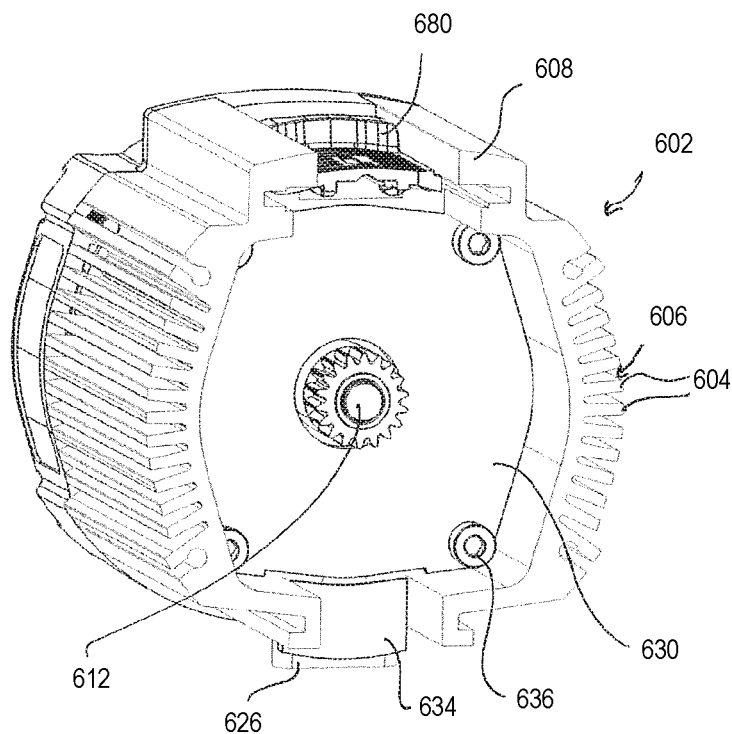
FIGS. 43 and 44 depict perspective view of the front and rear bearing support structures received with the heat sink, respectively, according to an embodiment.
Figure 44:
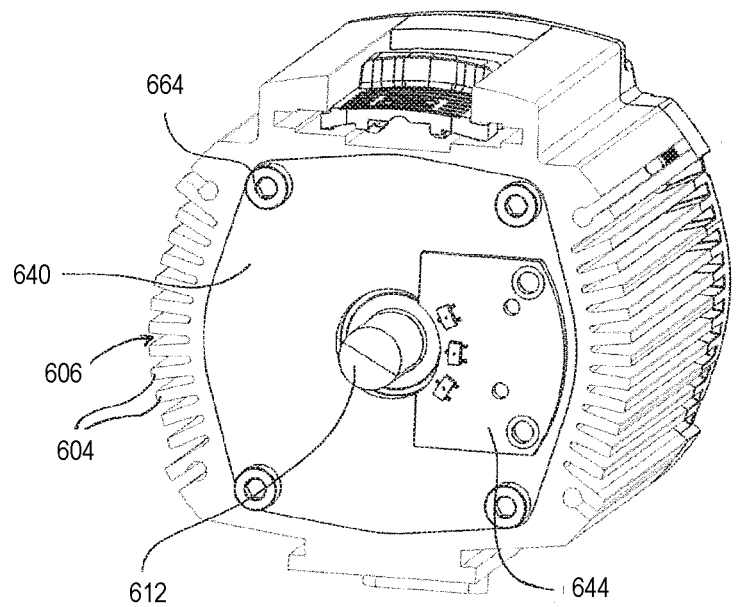

FIG. 42 depicts a perspective view of front and rear bearing support structures 630 and 640, according to an embodiment. FIGS. 43 and 44 depict perspective view of the front and rear bearing support structures 630 and 640 received with the heat sink 602, respectively, according to an embodiment. In an embodiment, as shown in this figure, and with continued reference to FIGS. 38-41, front and rear bearing support structures 630 and 640 are sized to be form-fittingly received within the inner envelope of the heat sink 602 on the two sides of the rotor 610 and stator 620. Thus, front and rear bearing support structures 630 and 640, together with the heat sink 602, substantially seal the rotor 610 and stator 620. Additionally, in an embodiment, front and rear bearing support structures 630 and 640 are each provided with a seals 638, 648 disposed around the outer periphery thereof. Seals 638, 648 may be adhesives, grease, gaskets, O-rings, compressive fits, or other sealants, that substantially seal any gaps between the support structures 630, 640 and the heat sink 602, thus providing an air-tight enclosure around the rotor 610 and stator 620 components.

In an embodiment, a seal may also be applied around the connector 626 and/or connector tab 634. In an embodiment, the remaining open area of opening 608 may be covered with a plug or other sealant material.

In an embodiment, after assembly of the front and rear bearing support structures 630 and 640, fan 650 is mounted on an end of the rotor shaft 612, and rear end cap 660 is secured to the rear end of the heat sink 601. In an embodiment, peripheral walls 666 of the rear end cap 660 partially covers the end of the heat sink 602 for more efficient baffling of the air flow into the air channels 606 of the heat sink 602. Rear end cap 660 may be secured to the heat sink 602 via a series of fasteners 664 received into the ends of some of the air channels 606.

In an embodiment, transmission assembly 670 may be mounted to the front end of the heat sink 602. Transmission assembly 670 may include air inlets (not shown) that collect and intake air traveling through air channels 606 for cooling of transmission components. In addition, in an embodiment, at least some of the transmission components may be positioned within the inner envelope of the heat sink 602 forward from the front bearing support structure 630 to utilize the heat sink 602 for cooling of these components.

Stator Having Improved Heat Conduction

Conventionally, the steel used in construction of stator lamination has a thermal conductivity of 20 to 25 Watts per meter-Kelvin (W/m-k). This thermal conductivity defines the ability of the motor stator to conduct heat from the interior of the motor to the surface where excess heat may be transferred to the surrounding environment through radiation, conduction or convection. A temperature gradient will form between the inner core of the motor and the outside area of the case of the motor. The magnitude of the temperature gradient is dependent on the thermal conductivity of the stator laminations. It is desirable to reduce the temperature gradient as much as possible in order to increase the efficiency and reliability of the motor. Other materials such as aluminum, copper and carbon have higher thermal conductivities than steel, however they lack the necessary magnetic properties of the steel used in the stator laminations.

Stator laminations are sheets of steel on the order of 100-1000 microns. A protective coating of resin and/or cellulose ester (i.e., lacker material) or other high dielectric material is typically disposed between adjacent layers of the steel lamination to reduce electrical Eddy currents in the steel laminations that contribute motor inefficiency.

According to an embodiment, in order to increase the thermal conductivity of the stator while substantially maintaining its magnetic properties and efficiency, steel laminations of the stator lamination stack are interleaved with materials having high thermal conductivity. Specifically, in an embodiment, the thermal conductivity of the stator is improved by replacing the conventional dielectric materials between adjacent stator laminations with dielectric materials that have high thermal conductivity properties. Various forms of carbon, including graphite, graphene, carbon Nano tubes, diamonds, and carbon fiber have thermal conductivities as high as 2000 W/m-k. With thermal conductivities nearly 100 times greater than the stator steel, only a relatively thin layer of the carbon-based material between adjacent laminations is sufficient to significantly increase thermal conductivity of the stator.

In an embodiment, since carbon alone does not possess desirable dielectric properties, the layer of carbon-based material is applied to a thin film having dielectric properties.

In an embodiment, carbon material may be dispersed into a resin system and applied through a coating process. Alternatively, in an embodiment, carbon material may be deposited directed as a dry powder. In yet another embodiment, premade sheets of carbon material, such as pyrolytic Graphite, may be provided between adjacent laminations.

It was found by the inventors of this application that with application of thin layers of pyrolytic Graphite between adjacent laminations, thermal conductivity of the stator lamination stack can be significantly improved depending on the thickness of the pyrolytic Graphite sheet (PGS) being applied. In an embodiment, as shown in Table A below, the thickness of a single PGS may be between 2.8% to 28% the thickness of a single steel lamination. Thus, an increase of merely 2.8% to 28% in the lamination stack length results in improved thermal conductivity of between 1.7 times to 4.7 times.

TABLE A

| Stator Steel Lamination Thickness (m) | 360.0E−6 | 360.0E−6 | 360.0E−6 | 360.0E−6 | 360.0E−6 | 360.0E−6 | 360.0E−6 |
|---|---|---|---|---|---|---|---|
| Stator Steel Lamination Thermal conductivity (W/m-k) | 23.0E+0 | 23.0E+0 | 23.0E+0 | 23.0E+0 | 23.0E+0 | 23.0E+0 | 23.0E+0 |
| PSG Sheet Thickness (m) | 100.0E−6 | 70.0E−6 | 50.0E−6 | 40.0E−6 | 25.0E−6 | 17.0E−6 | 10.0E−6 |
| PGS Graphite Sheets (W/m-k) | 700.0E+0 | 1.0E+3 | 1.3E+3 | 1.4E+3 | 1.6E+3 | 1.9E+3 | 2.0E+3 |
| Thermal conductivity Improvement | 4.7 | 4.7 | 4.4 | 3.8 | 2.9 | 2.4 | 1.7 |
| % increase in thickness | 27.8% | 19.4% | 13.9% | 11.1% | 6.9% | 4.7% | 2.8% |

It will be appreciated that while PGS is used herein by way of example, other carbon-based material and depositing method described above are likely to yield similar results in improved thermal conductivity.

In an embodiment, where materials such as the PGS are used between laminations, the sheets can be oversized so as to provide increased contact area between motor windings on the inside the stator, and heat sinks on the outside of the motor.

The slots for the motor windings are often lined with a material such as paper to help protect the windings during assembly. In an embodiment, constructing the motors using PGS in place of, or in addition to, the paper liners also improves the thermal performance of the motor, as it provides improved thermal conductivity between the motor windings and the stator structure.

Selectively Coated Heat Sink

Another aspect of the invention is described herein with reference to FIGS. 45-47, according to an embodiment.

A motor assembly with an external heat sink, as described in various embodiments of this disclosure, forms the external face of a power tool that is accessible by users. While cooling methods previously described sufficiently cool the heat sink for many applications, in some high-power application, or in applications where power tool is continually used for extended periods of time, the heat sink temperature may reach levels unsafe or uncomfortable for users to touch and operate.

According to an embodiment, in order to reduce thermal transfer to a user's hand, extremities of the external heat sink are selectively coated and/or covered by a layer of thermally-resistive material. In an embodiment, the extremities of the heat sink are coated selectively, for example at the tips of the heat sink fins, such that most of the surface area of the heat sink is left uncoated convectively transfer heat to the outside environment.

In an embodiment, examples of thermally-resistive material may include, but are not limited to, plastic, ceramic, rubber, paint, powder coating, etc. Alternatively, in an embodiment, thermally-resistive material may be tape, molding, extruded plastic, etc., manufactured separately and attached to the extremities of the heat sink. In yet another embodiment, the coating may be in the form of a process, e.g., anodization, applies to the surface of the heat sink, changing the physical characteristics of the surface properties of the heat sink.

FIG. 45 depicts a perspective view of an exemplary motor assembly 700 having an external heat sink 702 having fins 704, and front and rear bearing support structures 730 and 760. FIG. 46 depicts an axial view of the same motor assembly 700. This motor assembly 700 is depicted here by way of an example, and the principles provided in this section can apply to any of other embodiments of the invention. Motor assembly 700 is not described in great detail herein, and it should be understood that the teachings of the previous embodiments are applicable to motor assembly 700.

In an embodiment, FIG. 47 depicts a zoomed-in axial view of the heat sink 700, showing three of the heat sink fins 704. In an embodiment, the end portion 706 of each fin 704 is provided with recessed side surfaces 708 and a double-humped end surface 709. The coating 710 is applied at the end portion 706 around the recessed side surfaces 708 and the doubled-humped end surface 709. This fin 704 geometry increases the bonding of the coating 710 at the end portion 706, and provides a uniform and consistent perimeter profile between the coating 710 and the rest of the fin 704. In an embodiment, the fin 704 geometry may alternatively and/or additionally include undercuts, scores, texturing/knurling, and/or reliefs to enhance the bonding of the coating 710 to the end portion 706.

In an embodiment, the recessed side surfaces 708 occupy approximately 20-30% of the height, and 10-40% of the width of the fins.

In an embodiment, the coating may be applied by selective masking of the heat sink 702 via, for example, tape or wax, before application of the coating material. Alternatively, the coating may be applied to the entire surface area around the fins and then selectively removed by secondary scraping. In yet another embodiment, coating may be selectively deposited by a known process or material such as ultra-violet curing and/or laser.

Fully-Enveloped Segmented Motor

Another aspect of the invention is described herein with reference to FIGS. 48-76. In an embodiment, as described in detail here, stator assembly of the motor may be provided with a segmented construction. An external heat sink is provided for thermal management of the motor as well as mechanical retention and constraint of the segments.

Figure 48:
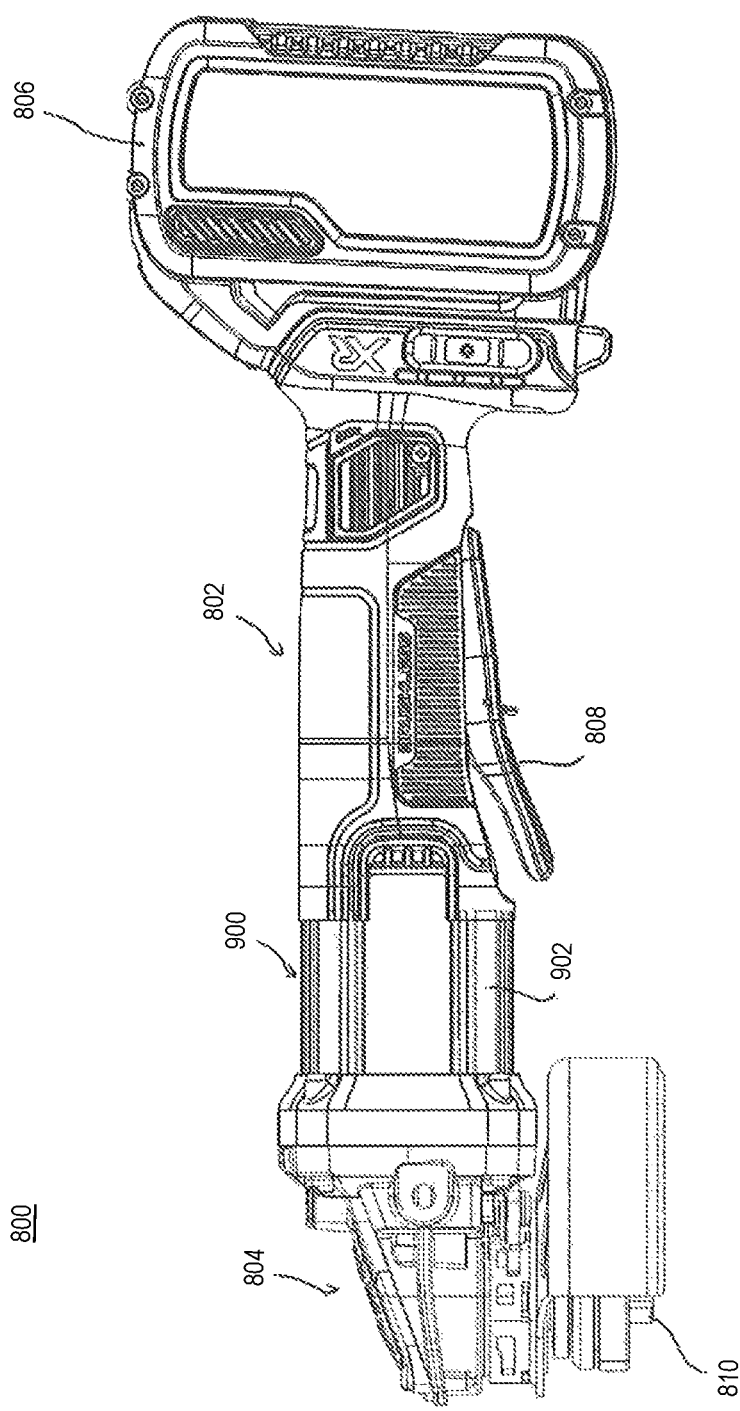
FIG. 48 depicts a side view of an exemplary power tool having a fully-enveloped segmented motor assembly, according to an embodiment.

FIG. 48 depicts a side view of an exemplary power tool 800 having a fully-enveloped segmented motor assembly 900. While power tool 800 in a grinder by way of example, it will be appreciated that the teachings of this disclosure with respect to this embodiment are merely exemplary, and the power tool of this invention could be any type of corded or cordless power tool, such as a drill, impact driver, hammer, hammer drill, circular saw, reciprocating saw, multi-tool, or any similar power tool constructed in accordance with the teachings of this disclosure. In an embodiment, power tool 800 may include a handle 802 disposed on one side of the motor assembly 900, and a gear case 804 disposed on another side of the motor assembly 900 opposite the handle 802. In an embodiment, a battery pack 806 is removably mounted to the end of the handle 802. A trigger mechanism 808 is also mounted on the handle 802. In an embodiment, the handle 802 houses a controller and other electronics (not shown) for driving the motor assembly 900. In an embodiment, the motor assembly 900 rotatably drives a motor spindle (not shown) within the gear case 804, which in turns causes rotation of output spindle 810.

Figure 49:
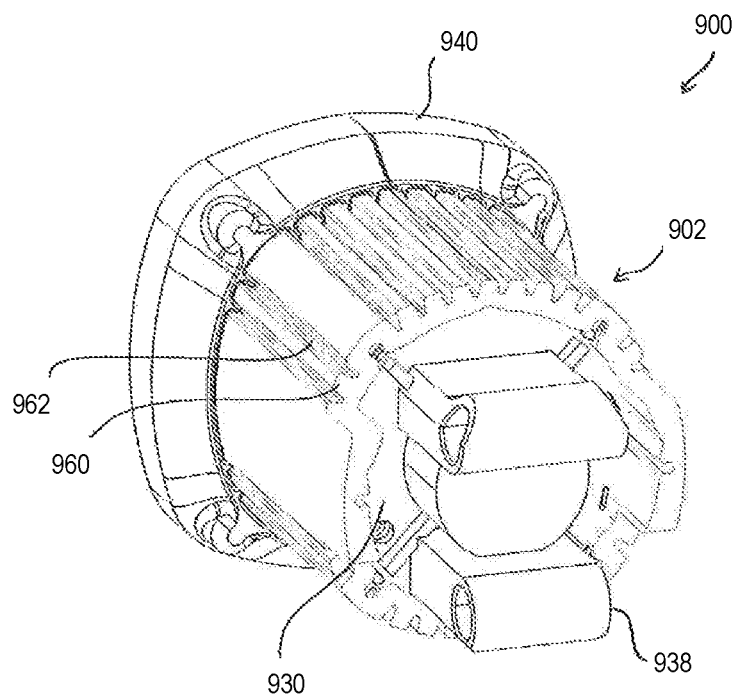
FIGS. 49 and 50 depict front and rear perspective views of an exemplary motor assembly of FIG. 48, according to an embodiment.
Figure 50:
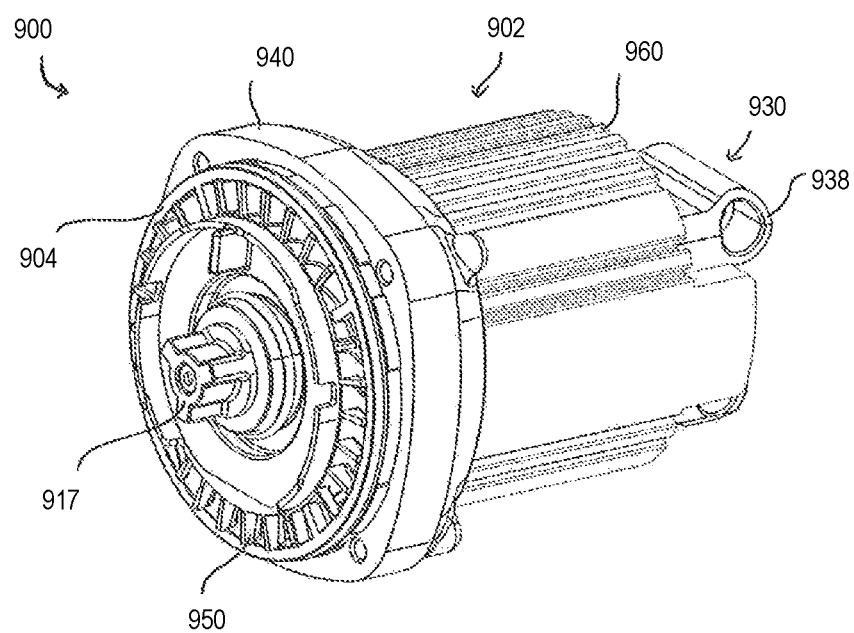
Figure 51:
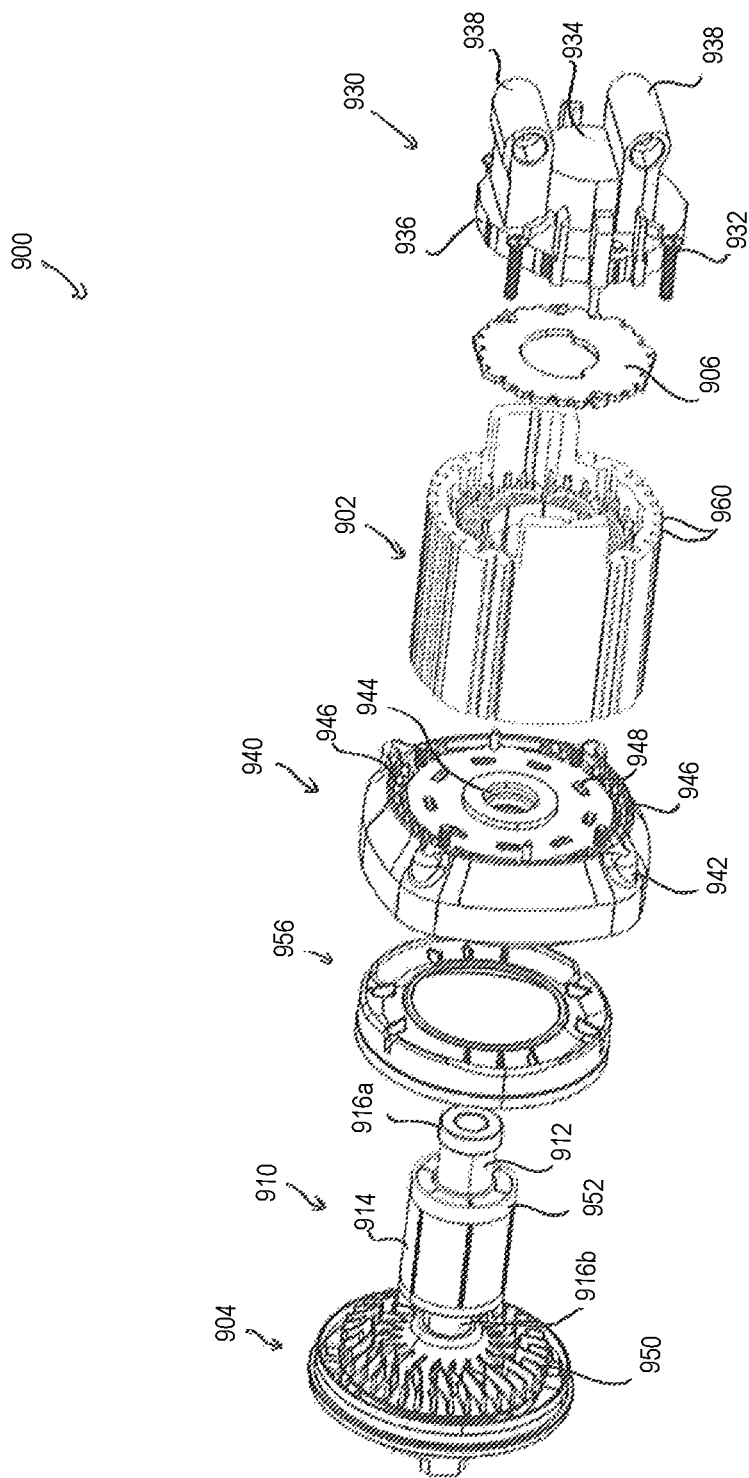
FIGS. 51 and 52 depict front and rear perspective exploded views of the motor assembly, including a stator, a rotor, a heat sink, etc., according to an embodiment.
Figure 52:
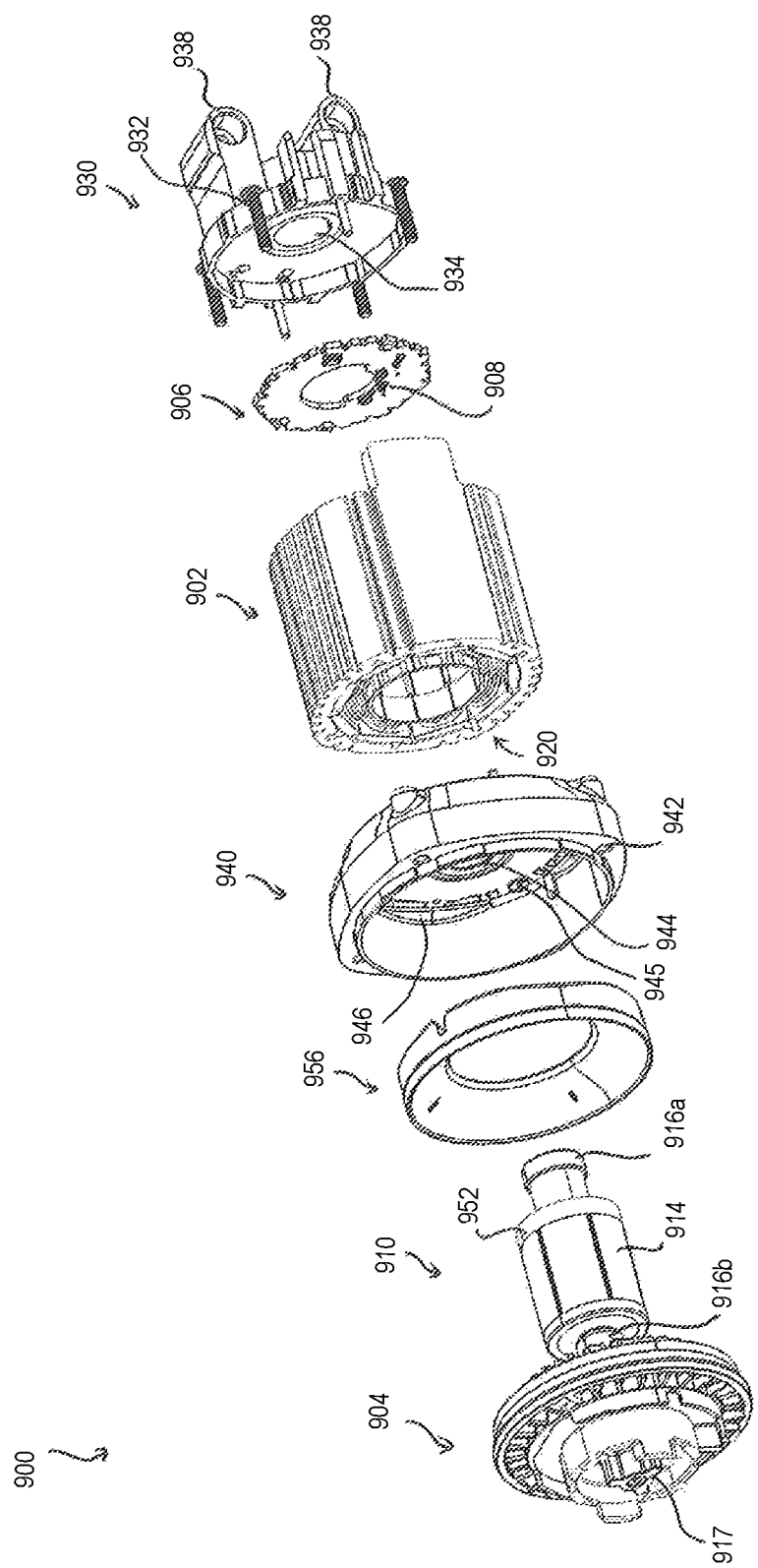

FIGS. 49 and 50 depict front and rear perspective views of an exemplary motor assembly 900, according to an embodiment. FIGS. 51 and 52 depict front and rear perspective exploded views of the motor assembly 900, according to an embodiment.

According to an embodiment, similarly to the previously-described embodiments, motor assembly 900 includes a rotor 910 having a rotor shaft 912 and a rotor lamination stack 914 housing a series of permanent magnets 918, front and rear beings 916a and 916b, and a sense magnet ring 952. In an embodiment, the motor assembly 900 also includes a stator 920 having segmented windings within an outer heat sink 902 for external cooling and mechanical constraints of the stator 920, as described later in detail. In an embodiment, a rotary fan 904 having blades 950 is mounted on one end of the rotor shaft 912 to rotate with the rotor shaft 912.

It should be noted that motor assembly 900 includes many of the same or similar features as motor assemblies 200 and/or 400 previously disclosed, and many of the details and alternative and/or additional embodiments disclosed above with reference to motor assemblies 200 and/or 400 are applicable in this embodiment.

In an embodiment, the outer heat sink 902 may be constructed according to the embodiments described above, particularly a fully-enveloping heat sink include a series of outer longitudinal fins 960 forming longitudinal air channels 962 therebetween on its outer surface. In an embodiment, outer heat sink 902 includes a generally cylindrical body surrounding the stator 920. Heat sink 902 includes a cylindrical opening that is sized to fittingly receive the stator 920, with the inner surface of the heat sink 902 being in thermal and physical contact with the outer surface of the stator 920. Since heat sink 902 covers substantially the entire periphery of the stator 920, it provides for optimal heat transfer from the stator 920 to the outside environment.

In an embodiment, the outer geometry of the heat sink 902 is sized to provide a substantially uniform profile on the power tool 800 between the handle 802 and the gear case 804.

In an embodiment, air channels 962 are arranged to guide air flow generated by fan 904 along the outer surface of heat sink 902 parallel to the longitudinal axis of the motor 900. Fins 960 increase the outer surface area of the heat sink 902, while passage of cooling air through the air channels 962 provides for improved heat dissipation from the heat sink 902. In an embodiment, air channels 962 form air inlets with the handle 802 to receive incoming air from inside the handle 802. In an embodiment, air traveling through air channels 662 dissipates into the outside environment at or near the front end cap 940. In an embodiment, part of the air may be guided through the front end cap 440 into the gear case 804 for cooling the gear case components.

In an embodiment, heat sink 902 may be constructed of non-ferrous material in order to minimize the impact of eddy current losses and heating from the magnetic operation of the motor assembly 900. In an embodiment, the heat sink 902 may be constructed of high-thermal conductivity material, such as aluminum, to facilitate the transfer of heat from the stator 920 to the outside environment. In an embodiment, the heat sink 902 may be of an extruded, machined, or die cast construction.

In an embodiment, a rear end cap 930 is provided on one end of the motor assembly 400 for mounting the motor 900 to the power tool handle 802. An outer periphery 936 of the rear end cap 930 is sized to be fittingly received within an end of the heat sink 902, i.e., via press-fitting. Alternatively, in an embodiment, rear end cap 930 includes peripheral receptacles 932 for fastening the rear end cap 930 to the end of the heat sink 902 via a series of fasteners. The fasteners may be fastened into corresponding threaded receptacles in the heat sink 902, or within the air channels 962. In an embodiment, front end cap 930 further includes a center bearing pocket 934 that receives the rear bearing 916a of the rotor shaft 912.

In an embodiment, a rear portion of the rear end cap 930 is provided with a pair of passthrough bosses 938. The handle 802 of power tool 800, which is ordinarily made up on two clam shells, form around the passthrough bosses 938 and includes features that secure the passthrough bosses 938 with respect to the handle 802.

In an embodiment, a front end cap 940 is provided on an end of the motor assembly 900 opposite the rear end cap 930. Front end cap 940 is provided with outer receptacles 942 for fastening the front end cap 940 to the gear case 804 of the power tool 800 via fasteners. Front end cap 940 is also provided with inner receptacles 945 for fastening the front end cap 940 to the heat sink 902 via fasteners. The latter fasteners may be fastened into corresponding threaded receptacles in the heat sink 902, or within the air channels 962. Front end cap 940 further includes a through-hole 944 provided as a bearing support for front bearing 916b of the rotor shaft 912. Alternatively, through-hole 944 may be a pass-through opening through which the rotor shaft 912 freely extends and is piloted in the gear case 804 via a driver 917.

In an embodiment, front end cap 940 may also be provided with a series of peripheral openings forming air inlets 946. Air inlets 946 are aligned with the air channels 962 of the heat sink 902 to receive air traversing through the air channels 962. A baffle 956 direct air from the air inlets 946 towards a middle portion of the fan 904. Fan 904 includes blades 955 that generate air flow though the air channels 962, through the air inlets 946, in the direction of the fan 904. In an embodiment, the air flow generated by the fan 904 may be expelled out of air exhaust ports (not shown) in the gear case 804.

In an embodiment, front end cap 940 may be provided with a series of recesses 948 around the through-hole 944. Recesses 948 are positioned where the ends of the stator windings 922 facing the front end cap 940 to account with tolerances associated with the stator windings 922.

In an embodiment, the heat sink 902 and rear and front end caps 930 and 940 together substantially encapsulate and seal the stator 920 and rotor 910 from the outside environment, preventing or at the very least minimizing air flow, and in particular contaminated air flow, from entering the magnetic areas of the motor assembly 900. In an embodiment, additional sealants, such as for example, gaskets, adhesive, etc. may be applied as needed to the rear and front end caps 930 and 940 to form a water-sealed containment around the magnetic areas of the motor assembly 900.

In an embodiment, circuit board 906 is received within the heat sink 902. In an embodiment, circuit 906 may include disc-shaped and include positional sensors for sensing the rotary position of the sense magnet ring 952 are disposed. It should be noted, however, that power switches for powering the phase of the motor 900, and/or controller for controlling the switching operation of the power switches, may also be disposed on the circuit board 906. In an embodiment, circuit board 906 may also include metal tracks for connecting the stator windings, as described below in detail. Circuit board 906 electronically communicates with other electronic components disposed in the power tool handle 802 via pins or wires passing through the rear end cap 930.

Figure 53:
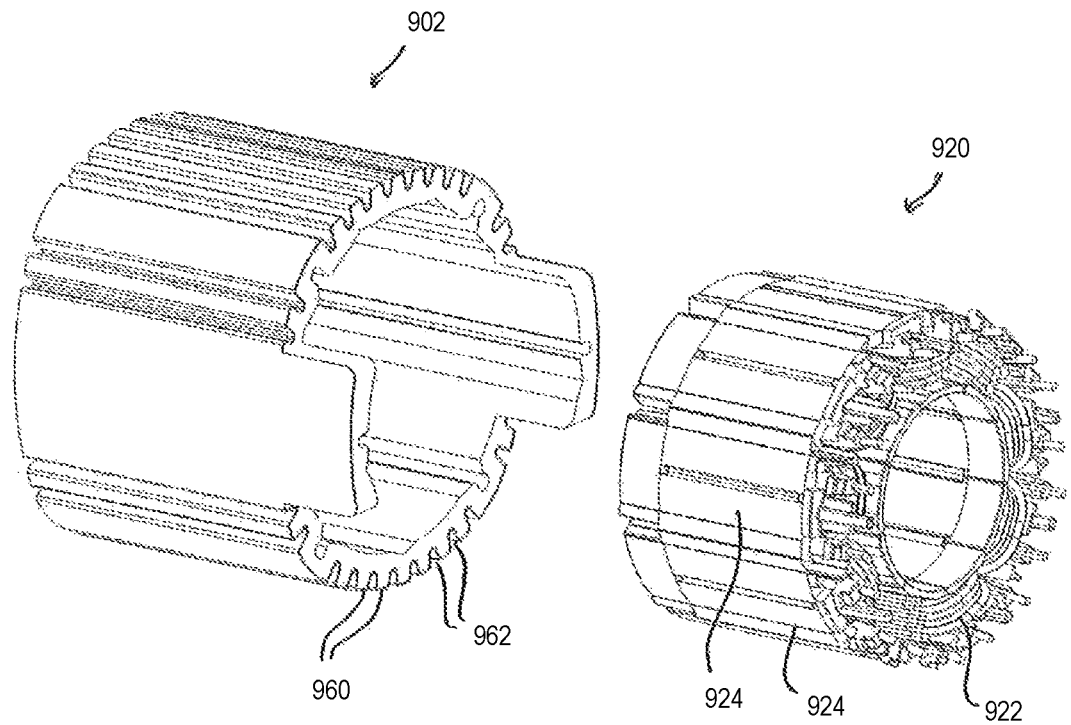
FIGS. 53 and 54 respectively depict perspective views of the stator of the motor assembly distanced from and within the heat sink, respectively, according to an embodiment.
Figure 54:
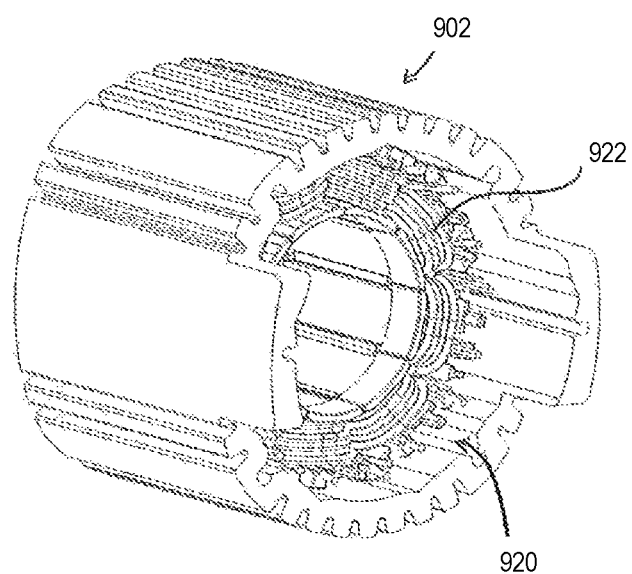
Figure 55:
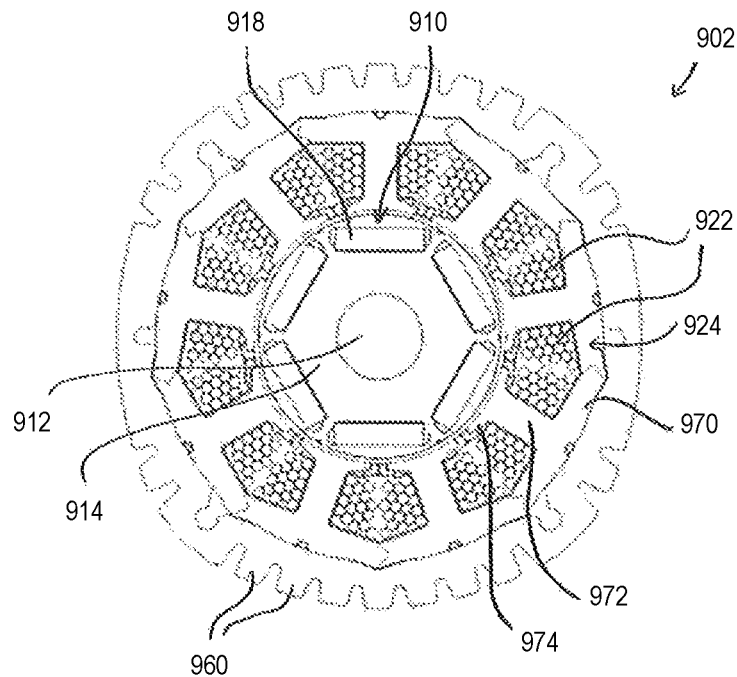
FIG. 55 depicts an axial cross-sectional view of the heat sink, stator, and rotor, according to an embodiment.
Figure 56:
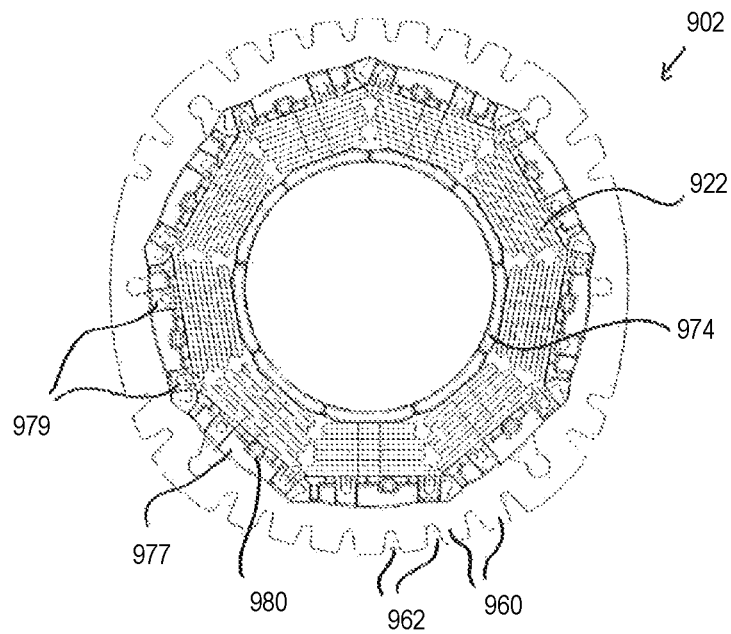
FIG. 56 depicts an axial perspective view of the heat sink and the stator, according to an embodiment.
Figure 57:
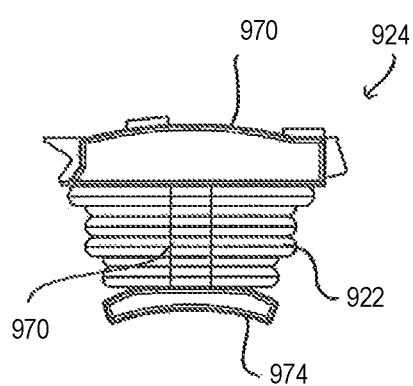
FIGS. 57-60 depict various views of a stator segment for the stator, according to an embodiment.
Figure 58:
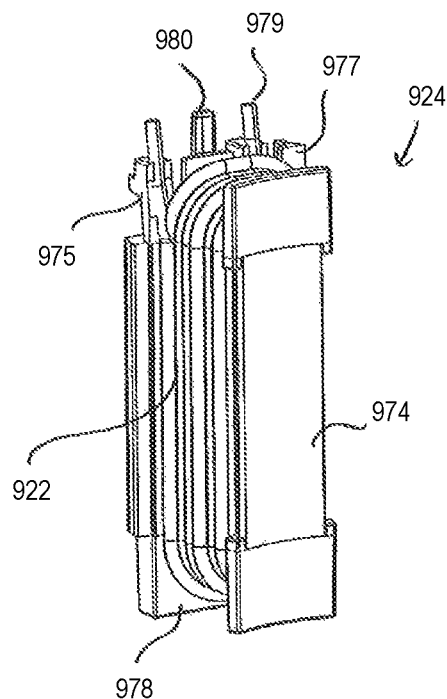
Figure 59:
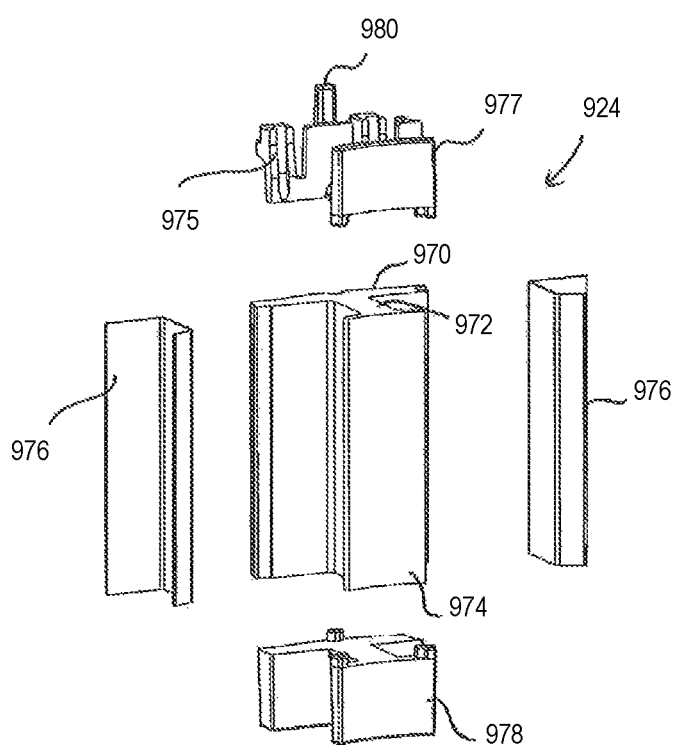
Figure 60:
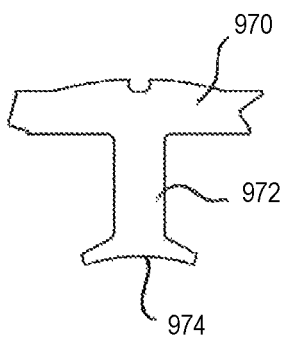

Referring now to FIGS. 53-56, various views of the stator 920 received within the heat sink 902 are provided. FIGS. 53 and 54 respectively depict perspective views of the stator 920 distanced from and within the heat sink 902, respectively, according to an embodiment. FIG. 55 depicts an axial cross-sectional view of the heat sink 902, stator 920, and rotor 910, according to an embodiment. FIG. 56 depicts an axial perspective view of the heat sink 902 and the stator 920, according to an embodiment.

In an embodiment, stator 920 includes a series of segmented windings 922 wound over discrete stator segments 924. The windings 922 are wound on each stator segment 924 independently via a winding machine. The stator segments 924 are shaped to mate in a circular fashion together forming the stator 920 after the windings 922 have been wound. In an embodiment, the heat sink 902 provides radial constraint to securely hold the stator segments 924 together.

FIGS. 57-60 depict various views of the stator segments 924 are depicted. As shown herein, and with continued reference to FIGS. 53-56, each stator segment 924 includes a segment core 970 arranged to form a segment of the outer periphery of the stator 920, and a segment pole 972 extending radially inwardly from the segment core 970 on which the windings 922 are disposed. In an embodiment, arched-shaped pole ends 974 extend laterally from the ends of the segment poles 972 around the rotor 910. In an embodiment, the segment core 970, segment pole 972, and pole ends 974 may be made of metal laminations. In an embodiment, two insulating members 976 are disposed on the sides of the segment poles 927 to insulate the windings 922 from the stator segments 924. Two end insulators 977 and 978 are also disposed at the ends of the of the stator segments 924 for the same purpose. The windings are wound around the end insulators 977, 978 and the insulating member 976. In an embodiment, end insulator 977 further includes two legs 975 that receive two winding terminals 979, and an axial retainer 980 for attachment of the circuit board 906, as described later in detail.

Figure 61:
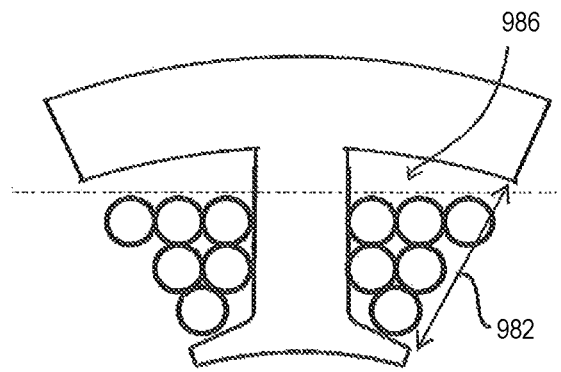
FIG. 61 depicts a conventional prior art stator segment design in which the segment core includes inner and outer arched-shaped surfaces, according to an embodiment.
Figure 62:
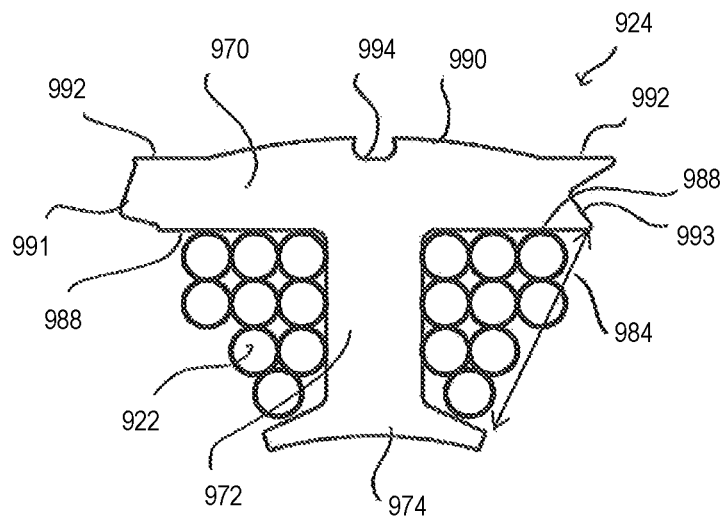
FIG. 62 depicts the stator segment having an improved segment stator segment that significantly improves the slot fill, according to an embodiment.

Referring to FIGS. 61 and 62, an embodiment of the invention for increasing the slot fill within each stator segment 924 is described.

FIG. 61 depicts a conventional prior art stator segment design in which the segment core includes inner and outer arched-shaped surfaces. The ends of the segment core are flat and at a normal angle to the inner and outer surfaces of the segment core. When the stator segments are assembled together, the inner and outer surfaces of the stator segments together form circular inner and outer surfaces for the stator core. While this arrangement provides smooth surfaces for easy and high-precision assembly, it limits the number of turns of the windings that can be fitted within each slot. Specifically, the curvature of the inner surface of the segment core limits the opening 982 through which the windings are received, preventing the windings from being fitted into space 986 using commonly-used winding machines.

FIG. 62 depicts the stator segment 924 having an improved segment stator segment that significantly improves the slot fill, according to an embodiment of the invention. In an embodiment, segment core 970 of the stator segment 924 is provided with flat inner surfaces 988 disposed substantially perpendicularly to the segment pole 972. This construction provides a wider opening 984 compared to the prior art design to allow a higher number of windings to be disposed around the segment pole 972. This construction optimizes the accessible area for wire fill, and therefore increases power density of the motor.

Furthermore, in an embodiment, to ensure that the thickness of the segment core 970 is not too small around the edges, the outer surface of the segment core 970 is provided with two flat edge portions 992 disposed on two sides of an arch-shaped portion 990. In an embodiment, arch-shaped portion 990 is aligned with a radial axis of the segment pole 972, and a notch 994 is provided as a part of the arch-shaped portion 990 for proper piloting and alignment of the stator segments 924 within the heat sink 902. In an embodiment, flat edge portions 992 are substantially parallel to the flat inner surface 998. In an embodiment, each flat edge portion 992 extends approximately 10-20% of the width of the segment core 970. In an embodiment, first and second ends 991 and 993 of the segment core 970 are provided with mating geometric surfaces for improved constraining and retention of the stator segments 924.

Figure 63:
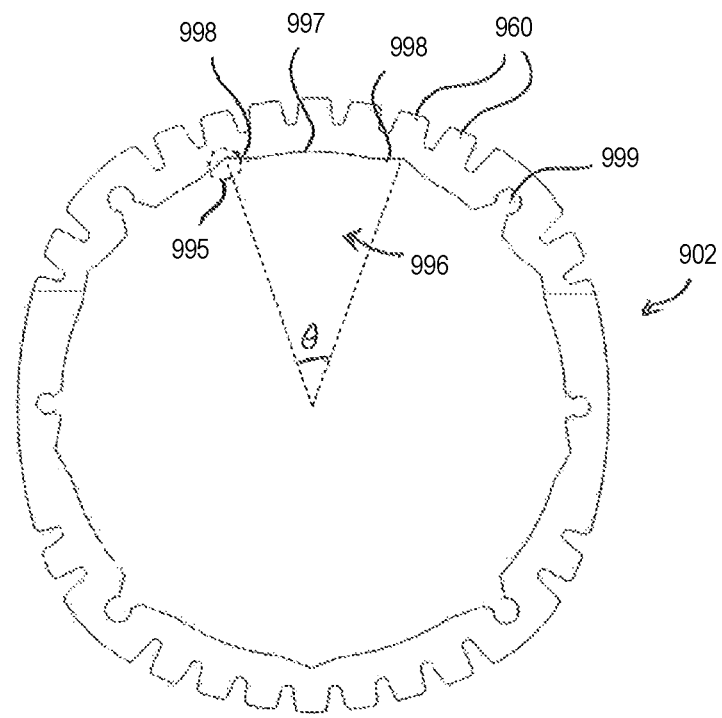
FIG. 63 depicts an axial view of the heat sink alone, according to an embodiment.
Figure 64:
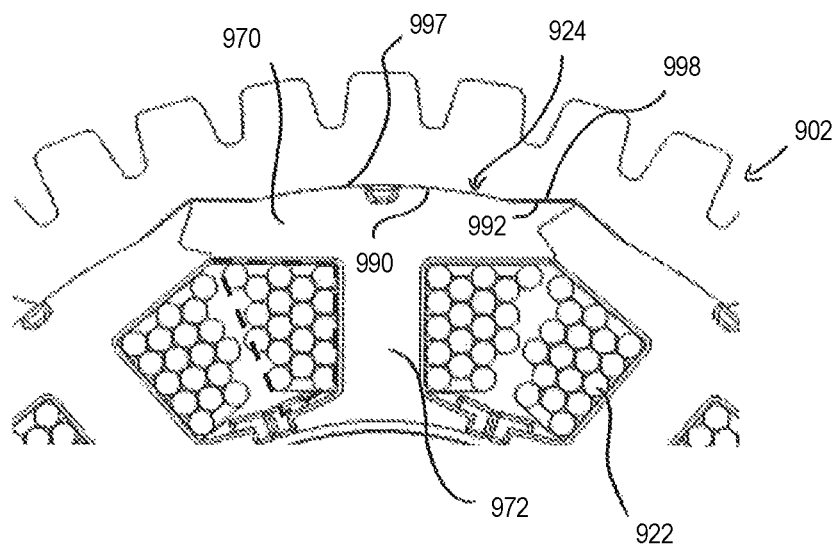
FIG. 64 provides a partial cross-sectional axial view of the stator within the heat sink, according to an embodiment.
Figure 65:
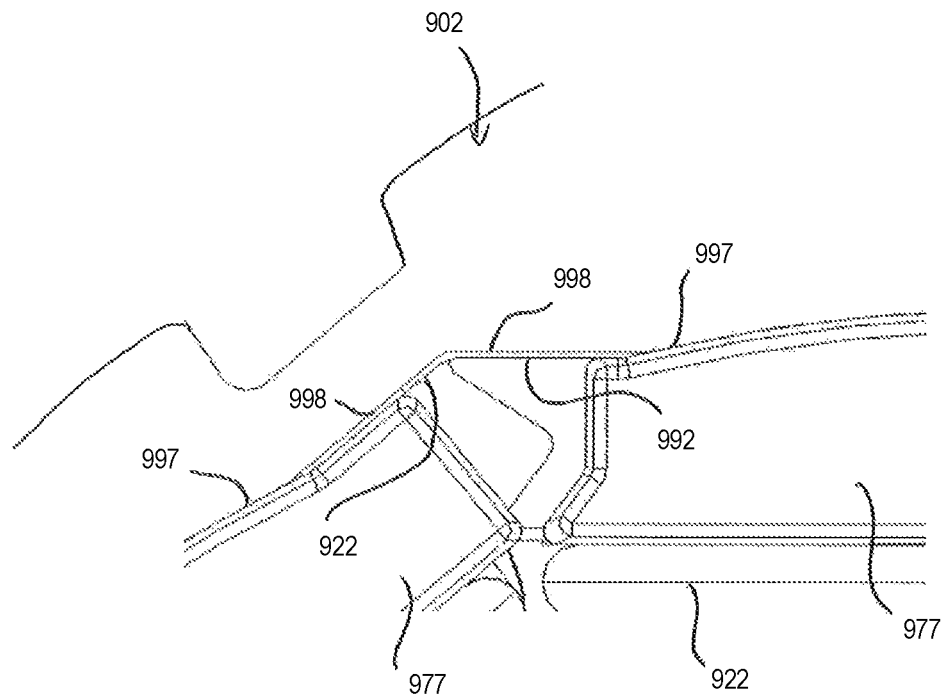
FIG. 65 depicts a zoomed-in perspective axial view of two adjacent segment cores within the heat sink, according to an embodiment.

Referring to FIGS. 63-65, an inner profile of the heat sink 902 optimized for receiving the stator 920 is described herein.

FIG. 63 depicts an axial view of the heat sink 902 alone, according to an embodiment. FIG. 64 provides a partial cross-sectional axial view of the stator 920 within the heat sink 902. FIG. 65 depicts a zoomed-in perspective axial view of two adjacent segment cores 970 within the heat sink 902.

As shown in these figures, and with continued reference to FIGS. 53-56, in an embodiment, heat sink 902 is provided with internal geometry designed for proper radial constraining of the above-described stator segments 924. Specifically, in an embodiment, instead of a fully circular inner surface, the inner surface of the heat sink 902 includes a series of sectors 996, one of which is denoted in FIG. 63 within angular position 8. The sectors 996 correspond to the stator segments 924 is number and surface profile. In an embodiment, each sector 996 includes an arched portion 997 and two flat side portions 998. Arched portions 997 have the same curvature as the arched-shaped portions 990 of the stator segments 924 and are arranged to form-fittingly receive the arched-shaped portions 990 of the stator segments 924 therein. In an embodiment, each arched portion 997 has a radius of curvature that shares the same center as the center of the heat sink 902 outer surface.

In an embodiment, flat side portions 998 extend laterally from two sides of the arched portion 997. Abutting flat side portions 998 of adjacent sectors 996 form recessed portions 995 therebetween in the inner surface of the heat sink 902. As shown in FIG. 64, recesses portions 995 receive flat edge portions 992 of adjacent stator segments 924 therein.

In an embodiment, as shown in FIG. 65, flat side portions 998 are angled to provide a small angular gap (e.g., approximately 1 degrees, up to 0.5 mm in width) between the flat edge portions 992 of the stator segments 924 and flat side portions 998 of the corresponding sectors 996. This arrangement accounts for tolerances associated with the heat sink 902 and stator segments 924 and ensures that the arched-shaped portions 990 of the stator segments 924 come into contact with the arched portions 997 of the heat sink 902 for proper diametric insertion of the stator segments 924 within the heat sink 902.

By form-fitting insertion of the stator segments 924 within the sectors 996 of the heat sink 902, via for example press-fitting, the heat sink 902 provides radial as well as axial constraint to hold the stator segments 924 together around the rotor 910 with a high level of precision. Furthermore, securing the rear and front end caps 930 and 940 to the ends of the heat sink 902 as previously described provides axial and radial retention between the rotor 910 and the stator 920 with a small radial gap therebetween.

In an embodiment, a series of notches 999 may be provided at different positions on the inner surface of the heat sink 902. Welding material may be welded inside the notches 999 for enhanced bonding of the stator 920 to the heat sink 902 and increased relief on the arched portions 997 of the heat sink 902. Notches 999 ensure that the welding material does not interfere with the stator 920 insertion operation.

Referring now to FIGS. 66 to 73, assembly of circuit board 906 to the stator 920 is described herein, according to an embodiment of the invention.

Figure 66:
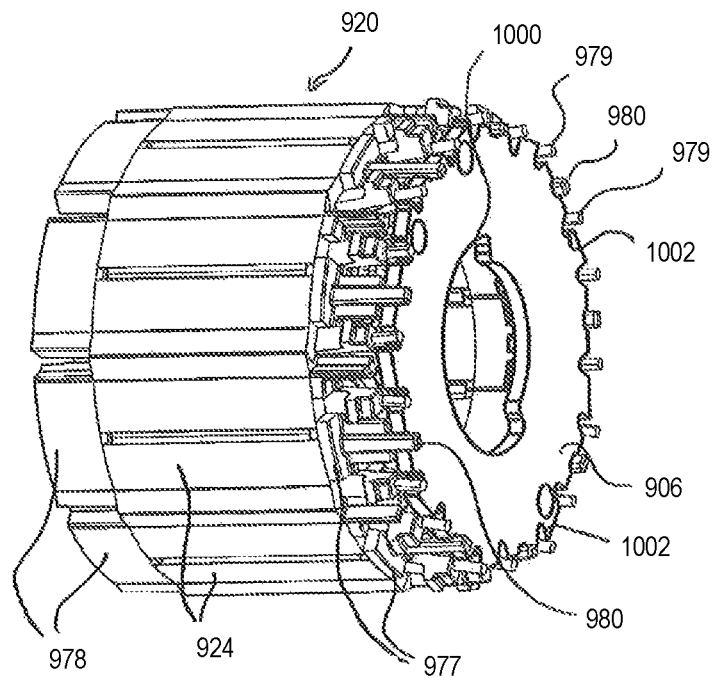
FIG. 66 depicts a perspective view of the stator with a circuit board mounted, according to an embodiment.
Figure 67:
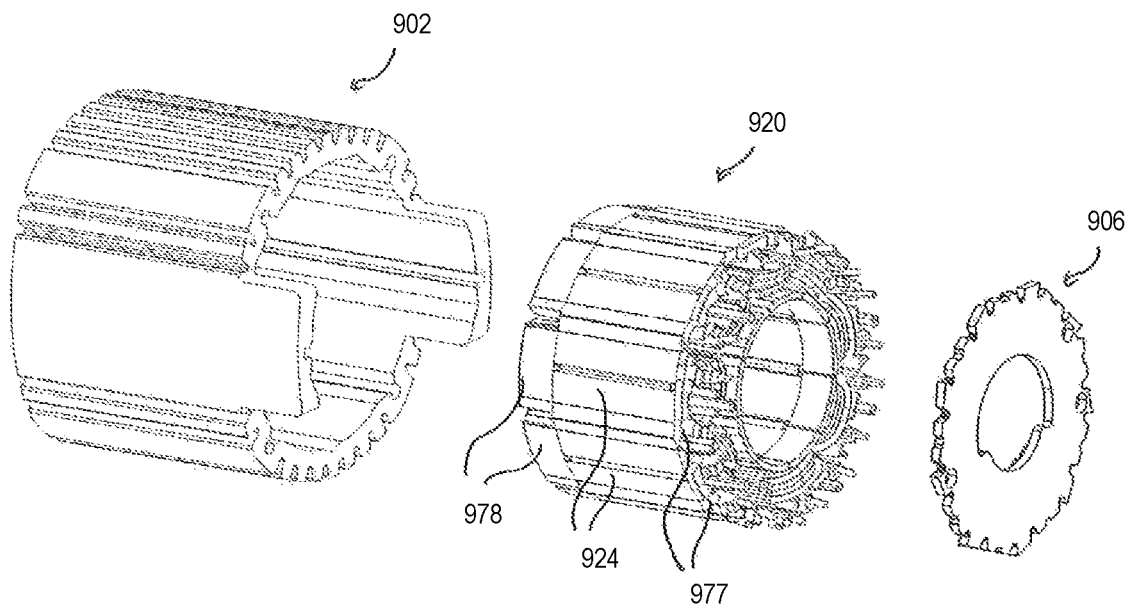
FIG. 67 depicts a perspective exploded view of the heat sink, stator, and circuit board, according to an embodiment.
Figure 68:
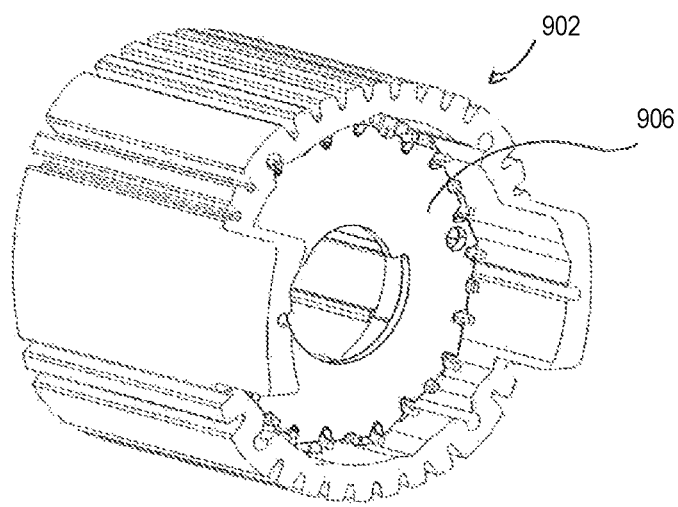
FIG. 68 depicts a perspective view of the stator and circuit board assembled within the heat sink, according to an embodiment.
Figure 69:
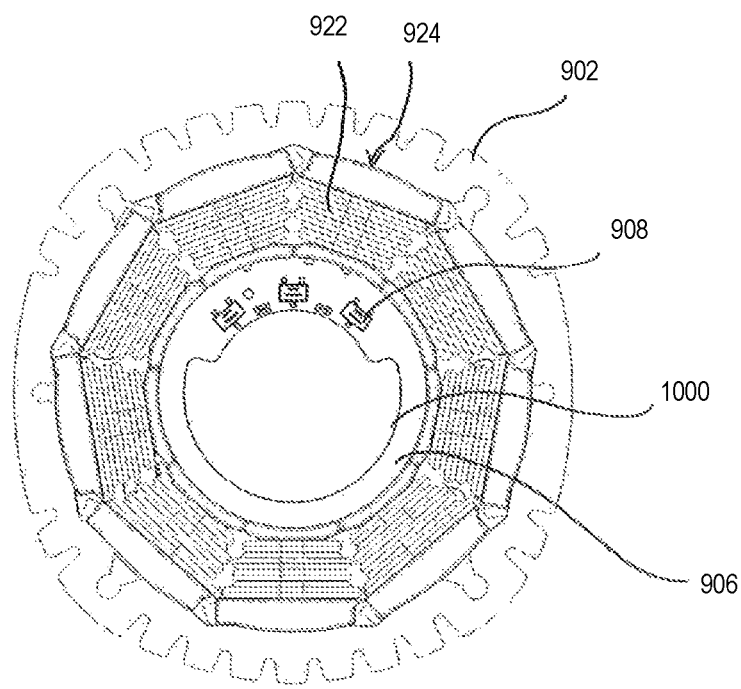
FIGS. 69 and 70 depict axial front and back assembled views of the heat sink, stator, and circuit board, according to an embodiment.
Figure 70:
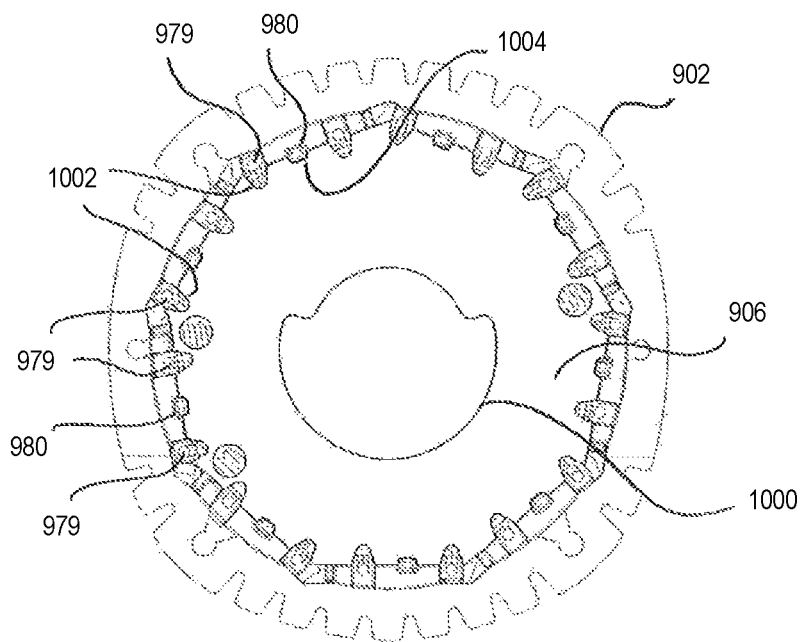

FIG. 66 depicts a perspective view of the stator 920 with circuit board 906 mounted, in an embodiment. FIG. 67 depicts a perspective exploded view of the heat sink 902, stator 920, and circuit board 906, according to an embodiment. FIG. 68 depicts a perspective view of the stator 920 and circuit board 906 assembled within the heat sink 902, according to an embodiment. FIGS. 69 and 70 depict axial front and back assembled views of the heat sink 902, stator 920, and circuit board 906, according to an embodiment.

As previously described briefly, circuit board 906 includes a series of positional sensors 908 disposed around a center through-hole 1000. In addition, circuit board 906 includes conductive routings (not shown) that connect the stator windings 922 of the respective stator segments 924 together. In an embodiment, the conductive routings may be configured to couple corresponding stator windings 922 within each phase of the motor 900 in a series or parallel configuration. Furthermore, the conductive routings may couple stator windings 922 of different phases of the motor 900 in a wye or a delta configuration.

In an embodiment, to facilitate connection of the stator windings 922 to the circuit board 906, circuit board 906 is peripherally provided with a series of outer notches 1002 positioned to receive the winding terminals 979 of the stator segments 924. Conductive routings of the circuit board 906 extend into the notches 1002 to facilitate the desired winding connection between the winding terminals 979. Axial retainers 980 of the stator segments 924, which may be, for example, elastic snaps, hooks, etc., snap onto the counterpart slots 1004 on outer periphery of the circuit board 906 to securely position and retain the circuit board 906 at the end of the stator 920.

Figure 71:
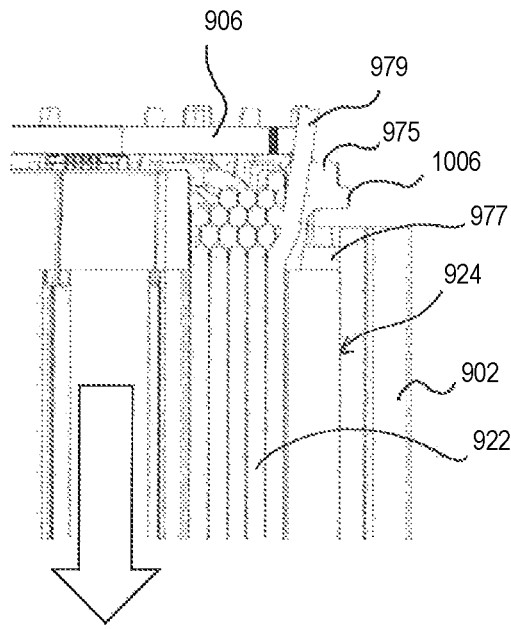
FIGS. 71 and 72 depict partial cross-sectional views of motor assembly during the assembly process, immediately prior to and after the insertion of the stator and circuit board into the heat sink, respectively, according to an embodiment.
Figure 72:
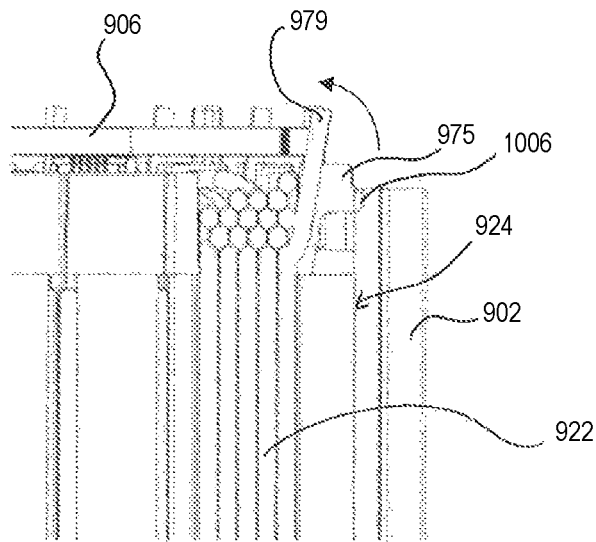
Figure 73:
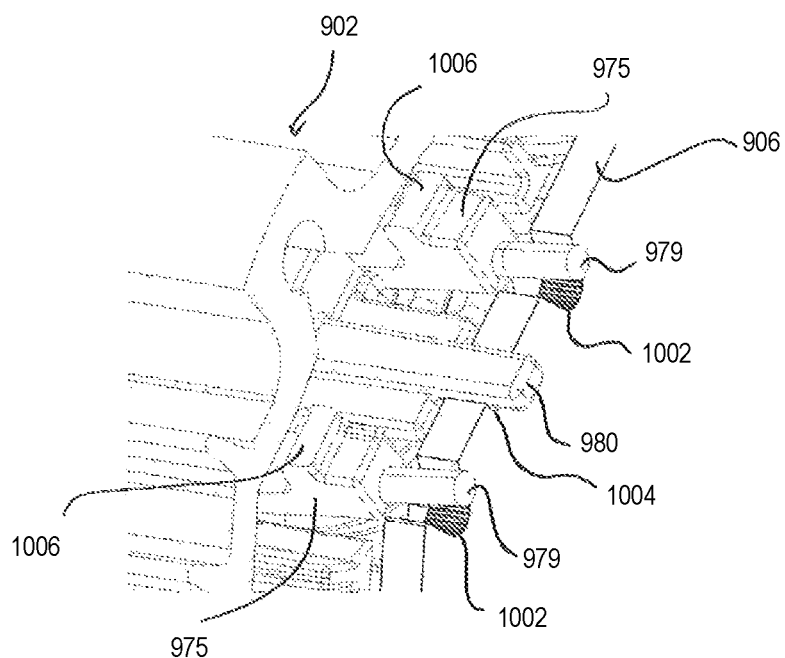
FIG. 73 depicts a partial perspective view of the motor assembly immediately prior to the insertion of the stator and circuit board into the heat sink, according to an embodiment.

FIGS. 71 and 72 depict partial cross-sectional views of motor assembly 900 during the assembly process, immediately prior to and after the insertion of the stator 920 and circuit board 906 into the heat sink 902, respectively, according to an embodiment. FIG. 73 depicts a partial perspective view of the motor assembly 900 immediately prior to the insertion of the stator 920 and circuit board 906 into the heat sink 902.

As shown in these figures, in an embodiment, during the assembly process, the stator segments 924 are initially held together and inserted partially into the heat sink 902, with winding terminals 979 and axial retainers 980 protruding outside the heat sink 902 body. In an embodiment, circuit board 906 is then mounted on the end of the stator 920 with winding terminals 979 disposed within openings of the notches 1002, and axial retainers 980 making snap connections with the slots 1004.

In an embodiment, legs 975 of end insulator 977 are positioned at an angle (e.g., approximately 5-15 degrees) from an insertion axis of the stator 920 to ensure that the winding terminals 979 are received into the openings of the notches 1002 with ease and without impeding the insertion process. In an embodiment, legs 975 include outer projections 1006 provided radially outwardly from the winding terminals 979. In an embodiment, after the circuit board 906 is mounted on the end of the stator 920, the stator 920 is further slid into the heat sink 902. During this step, the inner portion of the end surface of the heat sink 902 encounters the outer projections 1006, applying a radially inward force on the outer projections 1006 that causes the winding terminals 979 to be forced into contact and make an electrical connection with the inner surfaces of the notches 1002. This arrangement ensures that the winging terminals 979 do not block or interfere with the circuit board 906 during the assembly process, but make a secure electrical connection with the circuit board 906 at the completion of the process.

Figure 74:
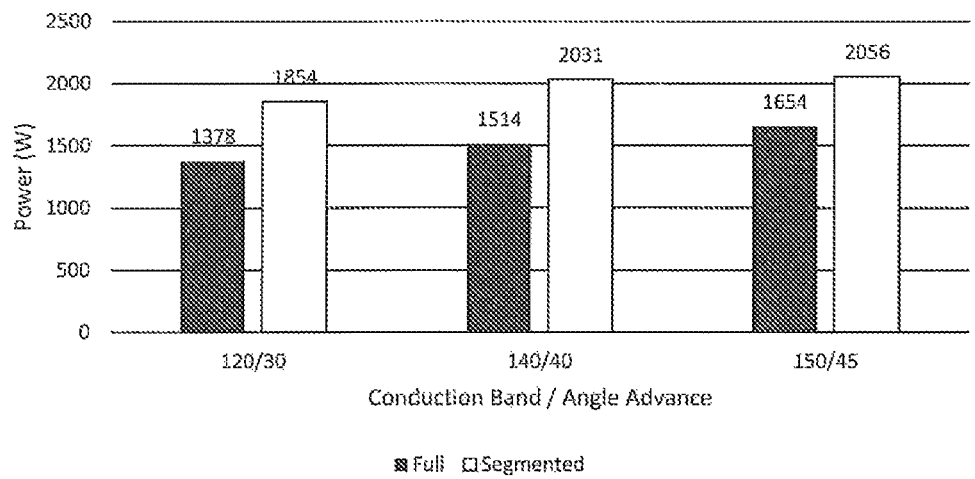
FIGS. 74 and 75 depict power output improvement of an exemplary segmented motor according to the above-described embodiments in comparison to a similarly-sized motor having a conventional stator design, according to an embodiment.
Figure 75:
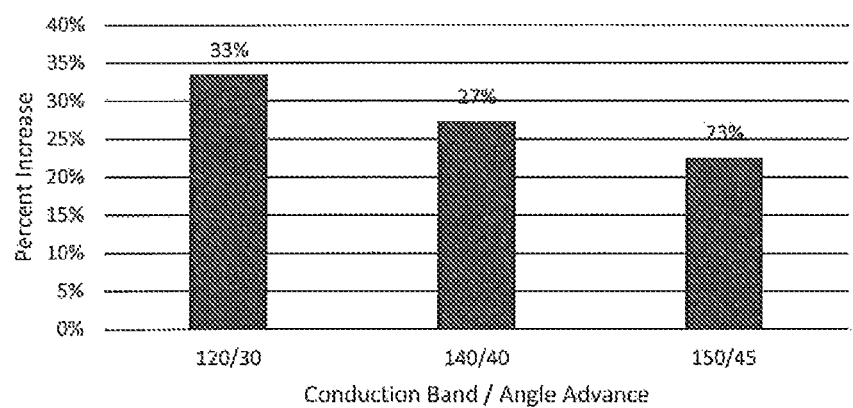

FIGS. 74 and 75 depict power output improvement of an exemplary segmented motor according to the above-described embodiments in comparison to a similarly-sized motor having a conventional stator design, according to an embodiment. In this example, both motors include 6-pole rotors and 9-slot stators. Both stators are 51 mm in outer diameter (i.e., inner diameter of the heat sink) and 25 mm in length (i.e., length of the segment core). In both simulations, the motor is powered by a 20V max battery pack. As shown, at different conduction band and angle advance commutations, the exemplary segmented motor outputs maximum power greater than 1800 W at 120/30 degrees conduction band/angle advance, and over 2000 W at 150/45 conduction band/angle advance. This power output represents an increase of 23% to 33% over the motor having a conventional stator design.

Figure 76:
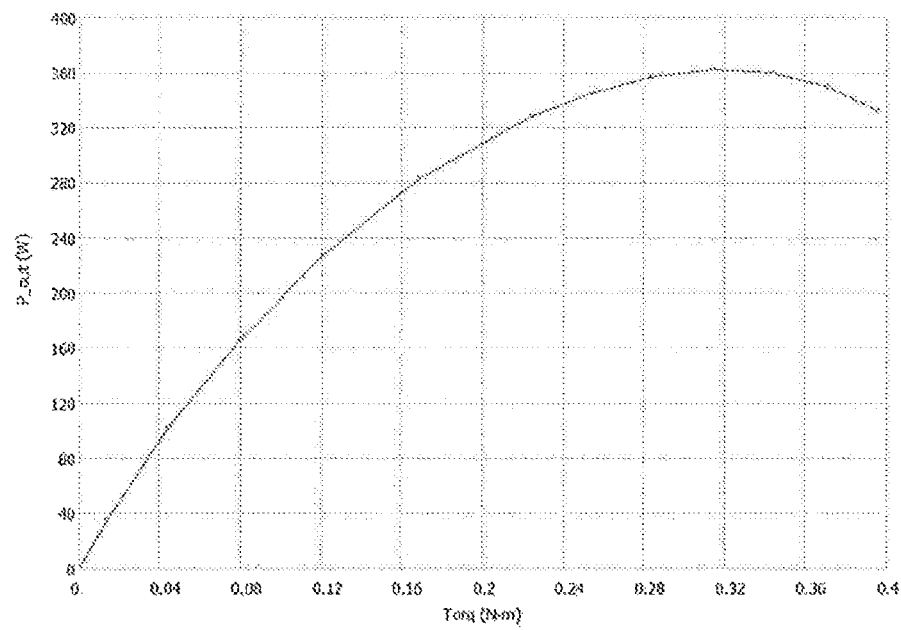
FIG. 76 depicts a power/torque diagram for another exemplary segmented motor according to the above-described embodiments.

FIG. 76 depicts a power/torque diagram for another exemplary segmented motor according to the above-described embodiments. In this example, the motor includes a stator that is 30 mm in outer diameter and 25 mm in length, and produces a maximum power output of over 360 W when powered by a 20V max battery pack.

It was further found that an exemplary motor according to the above-described embodiments having a stator that is 61 mm in outer diameter and 45 mm in length produces a maximum power output of approximately 32000 W when powered by a 60V max battery pack.

Bobbin-Wound Motor with External Heat Sink

The above-described embodiment relates to a stator assembly in which the windings are wound directly onto the segment poles. In such a construction, each segment pole is placed into a winding machine and the magnet wires are wound around the segment pole. In an alternative embodiment, as described in this section, the stator assembly may be made of bobbin-wound segments. Bobbin windings refer to coils wound independently of the stator core. The bobbin coils are initially wound onto a bobbin carrier or a mandrel, and the wound coils are thereafter relocated and assembled onto the stator core poles.

According to an embodiment, any of the above-described embodiments, i.e., motor partially enveloped fully enveloped by an external heat sink, may be provided with a bobbin-wound motor as described herein.

Figure 77:
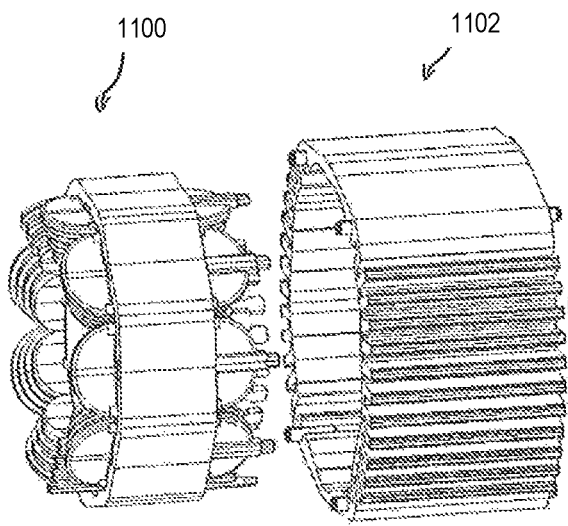
FIG. 77 depicts a partially exploded view of a bobbin-wound stator assembly received within a fully-enveloping heat sink, according to an embodiment.
Figure 78:
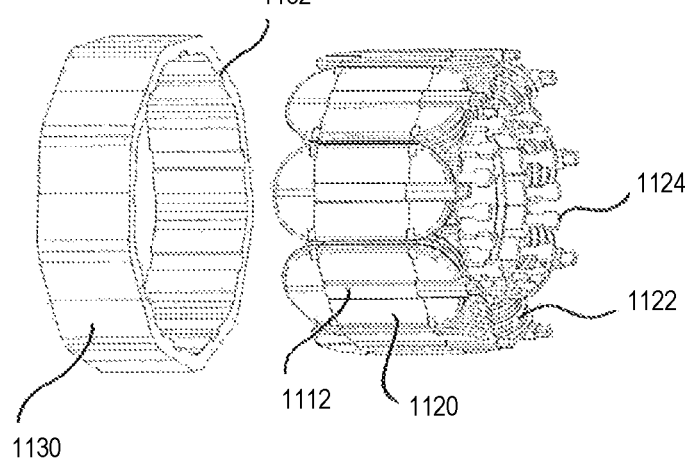
FIG. 78 depicts a partially exploded view of the bobbin-wound stator assembly alone, according to an embodiment.
Figure 79:
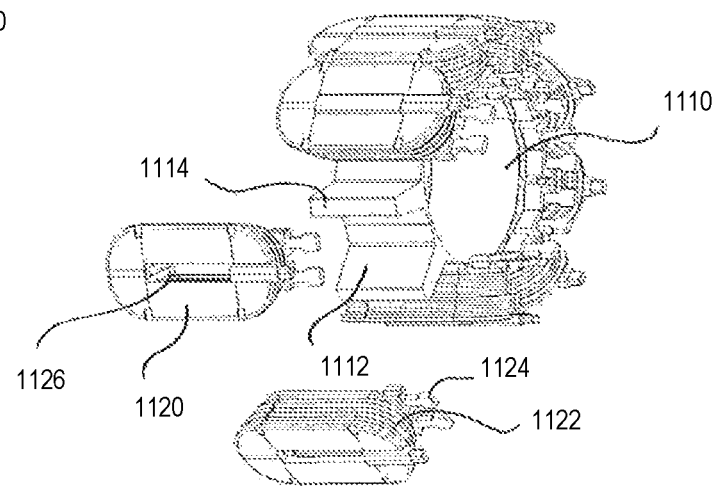
FIG. 79 depicts another partially exploded view of the bobbin-wound stator assembly, according to an embodiment.
Figure 80:
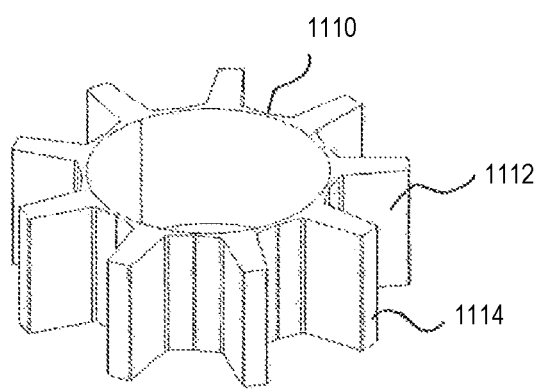
FIGS. 80-83 depict various views of the stator core and the outer ring in a bobbin-wound stator assembly, according to an embodiment.
Figure 81:
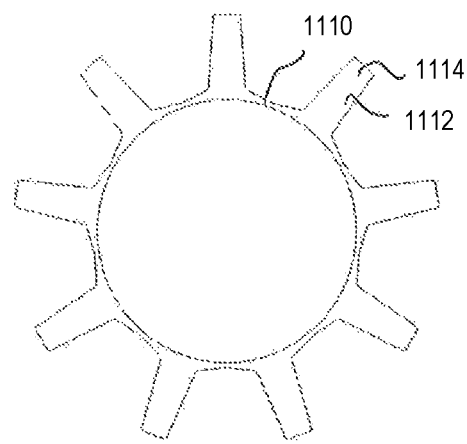
Figure 82:
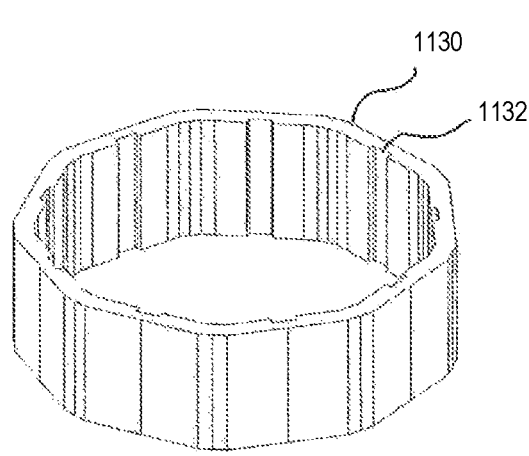
Figure 83:
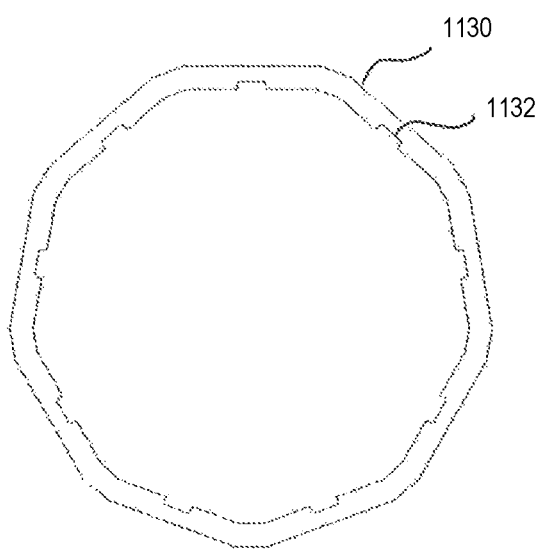

FIG. 77 depicts a partially exploded view of a stator assembly 1100 received within a fully-enveloping heat sink 1102. FIG. 78 depicts a partially exploded view of the stator assembly 1100 alone. FIG. 79 depicts another partially exploded view of the stator assembly 1100. It is reiterated that heat sink 1102 may be constructed according to any of the above-described embodiments, and disposed as an outer-cooing mechanism for the stator assembly 1100 in any power tool construction previously described. The full motor construction, including details of the rotor assembly and other components, is not described herein to avoid repetition.

In an embodiment, stator assembly 1100 includes an inner stator core 1110 having a central annular body sized to receive a rotor assembly (not shown) with a small air gap therebetween, and a series of stator poles 1112 extending radially outwardly from the stator core 1110. A series of stator pieces 1120 are mounted on the stator poles 1112. Stator windings 1122 are wound on the stator pieces 1120, independently from the rest of the stator assembly 1100. The windings 1122 may be formed with bondable magnet wire. In an embodiment, the windings 1122 may be wound on a bobbin carrier or a mandrel and later pressed on the stator pieces 1120. Two winding terminals 1124 are disposed on each stator piece 1120 for attachment to a circuit board (not shown) as previously described. Each stator piece 1120 includes an elongate opening 1126 through which the stator pole 1112 extends after the stator piece 1120 is mounted on the stator pole 1112.

In an embodiment, an outer ring 1130 may be provided to constrain the stator pieces 1120 on the stator core 1110. In an embodiment, the outer ring 1130 includes a series of axial inner slots 1132 arranged to received pole tips 1114 of the stator poles 1112 therein when the stator core 1110 and stator pieces 1120 are inserted inside the inner diameter of the outer ring 1130. In an embodiment, the outer ring 1130 may be pressed onto the stator pieces 1120 and the stator core 1110, forming the back iron for the stator assembly 1100 for the magnetic path between the stator poles 1112. The outer surface of the outer ring 1130 may be provided with appropriate geometry to be received within the heat sink 1102 for external cooling of the stator assembly 1100.

With the outer ring 1130, the heat sink 1102 may be provided as a partially-enveloping construction instead of a fully-enveloping construction as shown. It is noted that, in an embodiment, when heat sink 1102 has a fully-enveloping construction as shown in FIG. 77, the stator core 1110 and the stator pieces 1120 maybe received inside the heat sink 1102 directly without the outer ring 1130. The heat sink 1102 in this embodiment may include axial inner slots similarly to slots 1132 of the outer ring 1130, and may be sized to provide mechanical radial (and even axial) constraint for the stator pieces 1120 on the stator core 1110. The heat sink in this embodiment may also form the back iron for the stator assembly 1100 for the magnetic path between the stator poles 1112.

FIGS. 80-83 depict various views of the stator core 1110 and the outer ring 1130, according to an embodiment.

Figure 84:
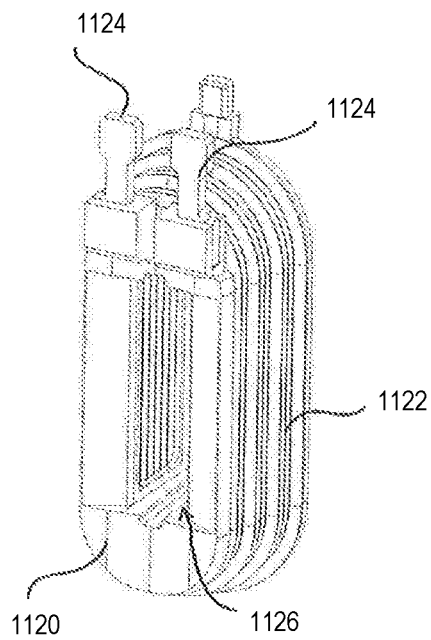
FIGS. 84 and 85 depict perspective and cross-sectional views of a bobbin-wound stator piece, according to an embodiment.
Figure 85:
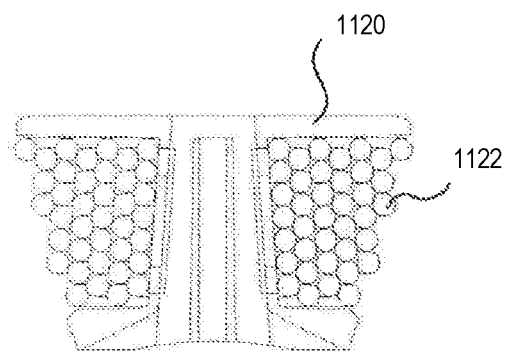
Figure 86:
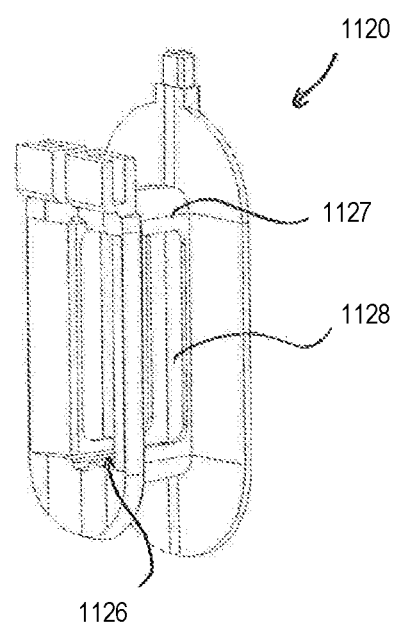
FIGS. 86 and 87 depict perspective and side views of the bobbin-wound stator piece, according to an embodiment.
Figure 87:
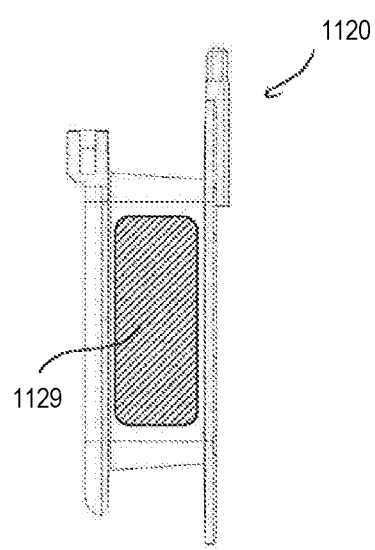

FIGS. 84 and 85 depict perspective and cross-sectional views of a stator piece 1120, according to an embodiment. FIGS. 86 and 87 depict perspective and side views of a stator piece 1120, according to an embodiment.

According to an embodiment, in order to improve thermal conductivity between the stator windings 1122 and the heat sink 1102, the stator pieces 1120 are provided with thermal filler material. In an embodiment, radial walls 1127 of each stator piece 1120, along the sides of the elongate opening 1126, are provided with side openings 1128, as shown in FIG. 86. In an embodiment, the stator pieces 1120 are coated with thermal filler material 1129, fully or partially within the side openings 1128. Thermal filler material may be made of thermally conductive but electrically insulating material, such as silicone caulk, grease, etc. The volume of the thermal filler material may be provided in excess of the spaces within the side openings 1128 to ensure proper bonding between stator windings 1122 and the stator poles 1112.

Outer-Cooled Motor with a Heatshield

Another aspect of the invention is described herein with reference to FIGS. 88-101, according to an embodiment.

Outer-cooled motor designs with external heat sinks, as described above in embodiments of this disclosure, dissipate heat generated by the motor to the outside environment. In many power tool applications, such designs result in heat sink outer surface temperatures tolerable for users to grip and operate. It has been found by the inventors, however, that in some power tool applications, particularly high voltage/high power applications, and/or power tool applications where the motor is required to run for extended periods of time, the outer surface of the heat sink may reach temperature levels intolerable or dangerous to users to touch and operate.

As previously discussed, one solution to alleviate this problem is to apply a coating of thermally non-conductive material selectively to outer extremities of the external heat sink. In an alternative embodiment, described herein, a sleeve (also referred to as a heatshield) is provided outside the heat sink with an airgap therebetween. The heatshield shields the user from high temperature of the heat sink, while providing an air gap for proper external cooling of the heat sink, as described herein in detail.

Figure 88:
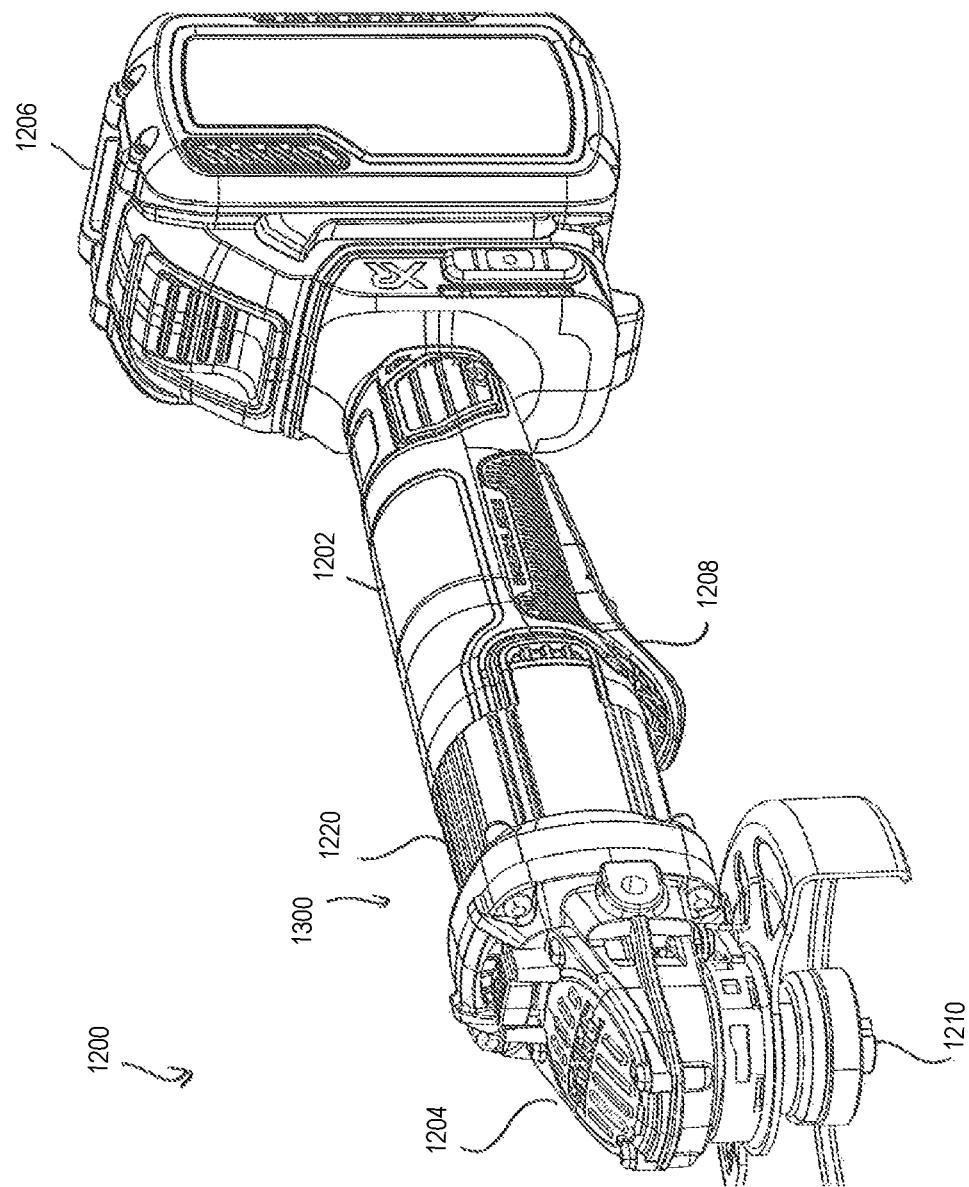
FIG. 88 depicts a side view of an exemplary power tool having a motor assembly provided within an outer heatshield, according to an embodiment.

FIG. 88 depicts a side view of an exemplary power tool 1200 having a motor assembly 1300 provided within an outer heatshield 1220. While power tool 1200 in a grinder by way of example, it will be appreciated that the teachings of this disclosure is merely exemplary, and the power tool of this invention could be any type of cordless or corded power tool, including but not limited to, a drill, impact driver, hammer, hammer drill, circular saw, reciprocating saw, multi-tool, or any similar power tool constructed in accordance with the teachings of this disclosure.

In an embodiment, power tool 1200 may include a handle 1202 disposed on one side of the motor assembly 1300 (and heatshield 1220), and a gear case 1204 disposed on another side of the motor assembly 1300 (and heatshield 1220) opposite the handle 1202. In an embodiment, a battery pack 1206 is removably mounted to the end of the handle 1202. A trigger mechanism 1208 is also mounted on the handle 1202. In an embodiment, the handle 1202 houses a controller and other electronics (not shown) for driving the motor assembly 1300. In an embodiment, the motor assembly 1300 rotatably drives a motor spindle (not shown) within the gear case 1204, which in turns causes rotation of output spindle 1210.

Figure 89:
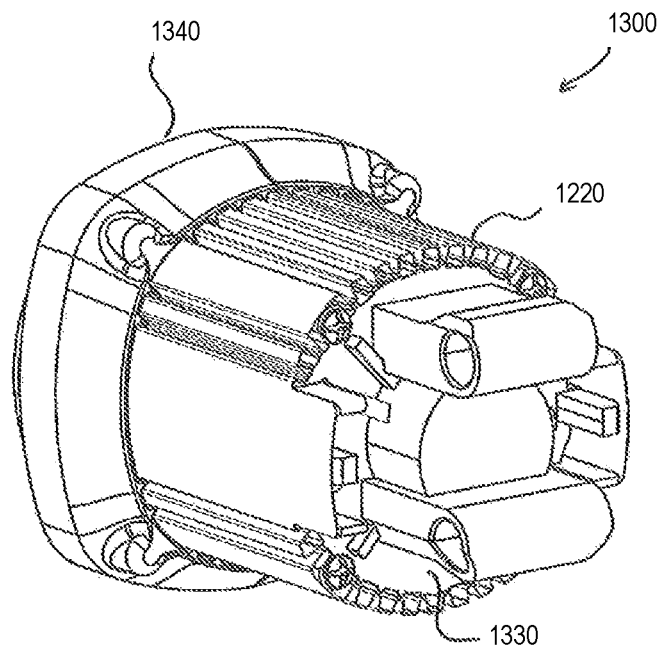
FIGS. 89 and 90 depict front and rear perspective views of an exemplary motor assembly provided within a heatshield, according to an embodiment.
Figure 90:
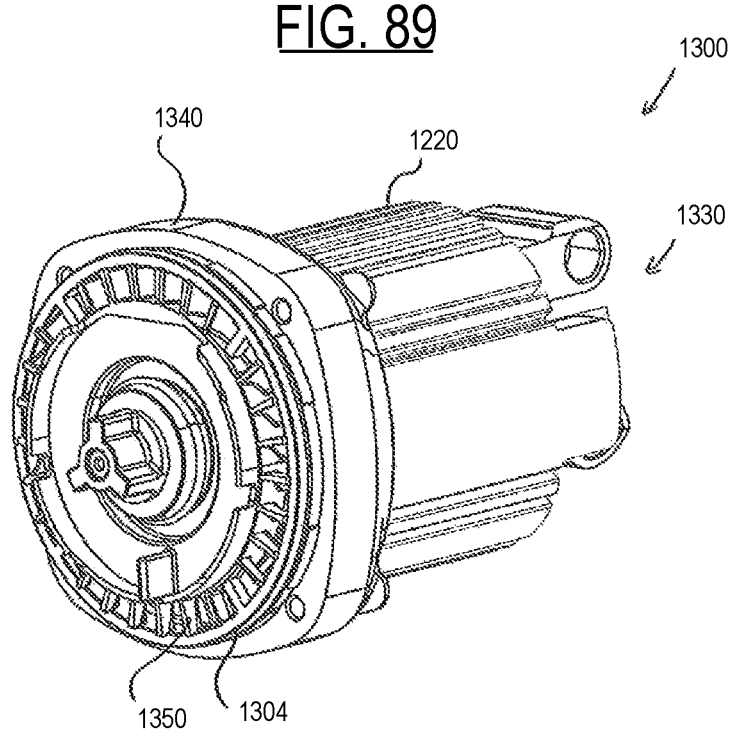
Figure 91:
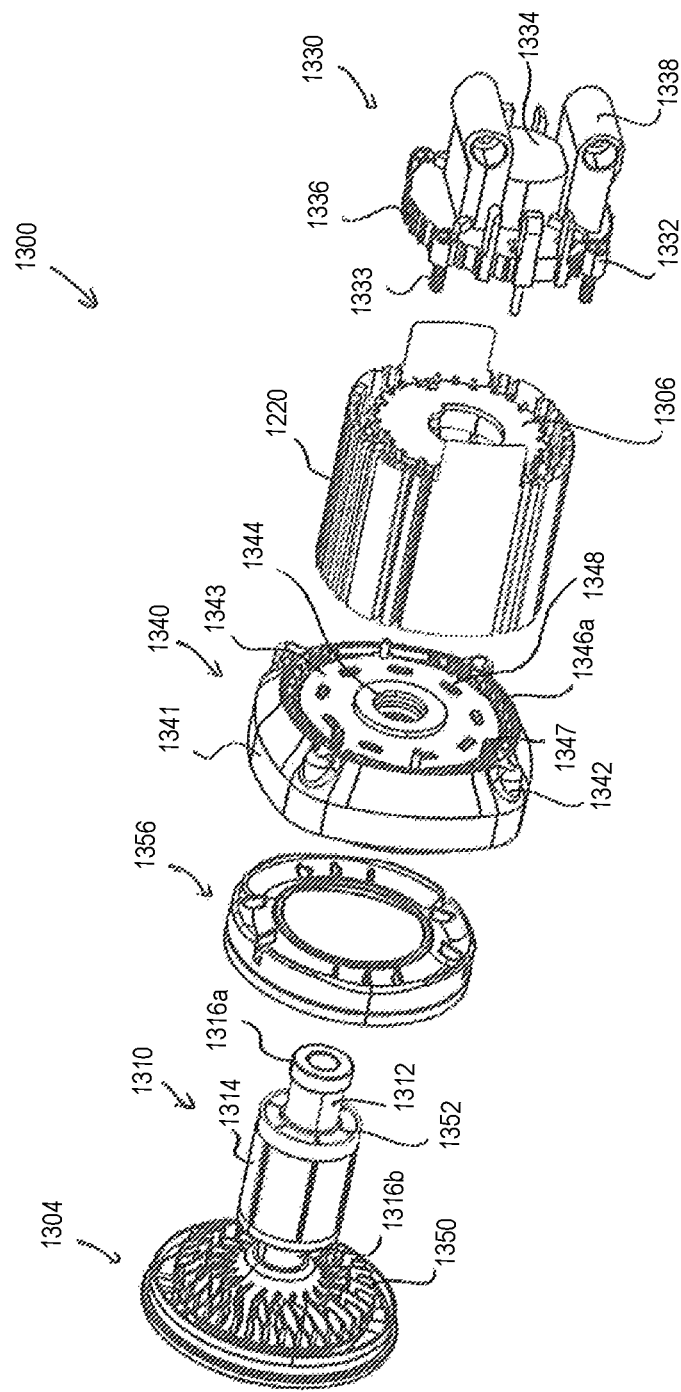
FIGS. 91 and 92 depict front and rear perspective exploded views of the motor assembly with stator and heat sink provided within the heatshield, according to an embodiment.
Figure 92:
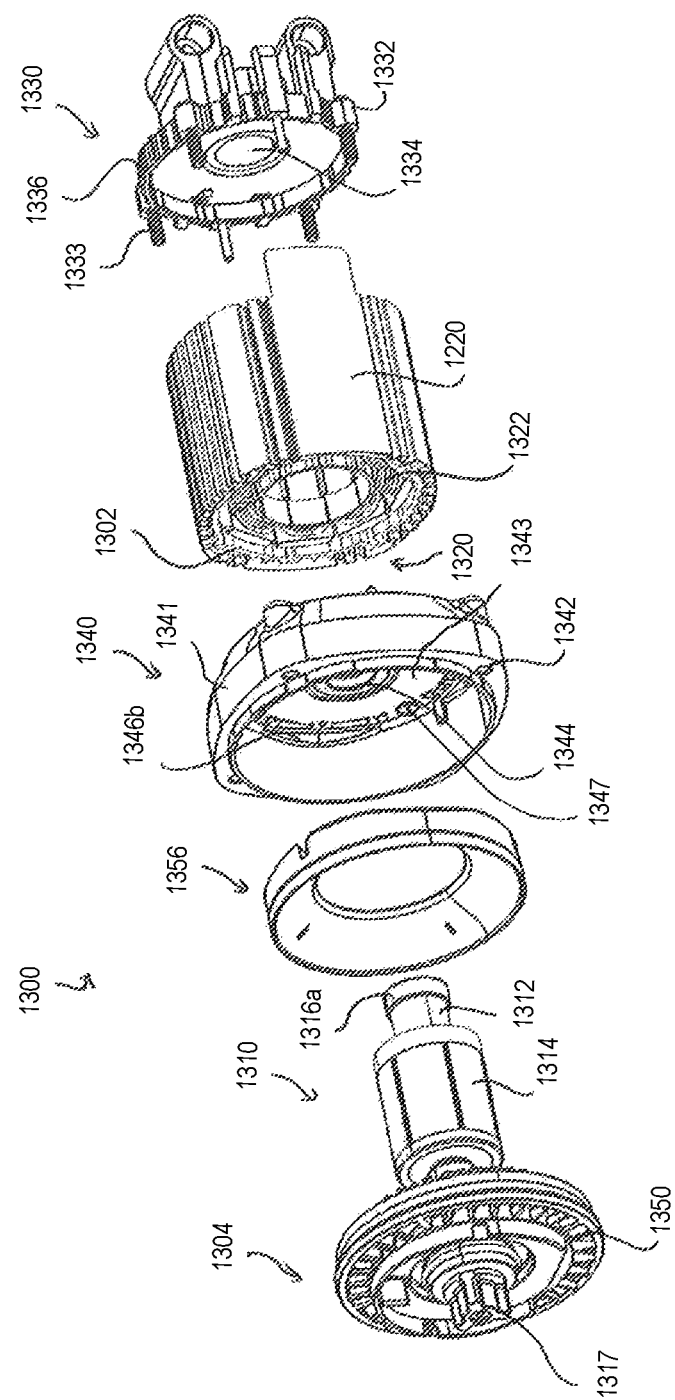

FIGS. 89 and 90 depict front and rear perspective views of an exemplary motor assembly 1300 provided within a heatshield 1220, according to an embodiment. FIGS. 91 and 92 depict front and rear perspective exploded views of the motor assembly 1300 with stator 1320 and heat sink 1302 provided within the heatshield 1220, according to an embodiment.

According to an embodiment, motor assembly 1300 includes mostly the same features as motor assembly 900 of FIGS. 49-52. In summary, in an embodiment, motor assembly 1300 includes a rotor 1310 having a rotor shaft 1312 and a rotor lamination stack 1314 housing a series of permanent magnets, front and rear beings 1316a and 1316b, and a sense magnet ring 1352. The motor assembly 1300 also includes a stator 1320 having segmented stator windings 1322 received within an outer heat sink 1302. In an embodiment, circuit board 1306 includes positional sensors (not shown) for sensing the rotary position of the sense magnet ring 1352, as well as conductive routings for connecting the stator windings 1322. In an embodiment, a rotary fan 1304 having blades 1350 is mounted on one end of the rotor shaft 1312 to rotate with the rotor shaft 1312. Front and rear end caps 1340 and 1330, and a baffle 1356, are also provided, as described later in detail.

Figure 93:
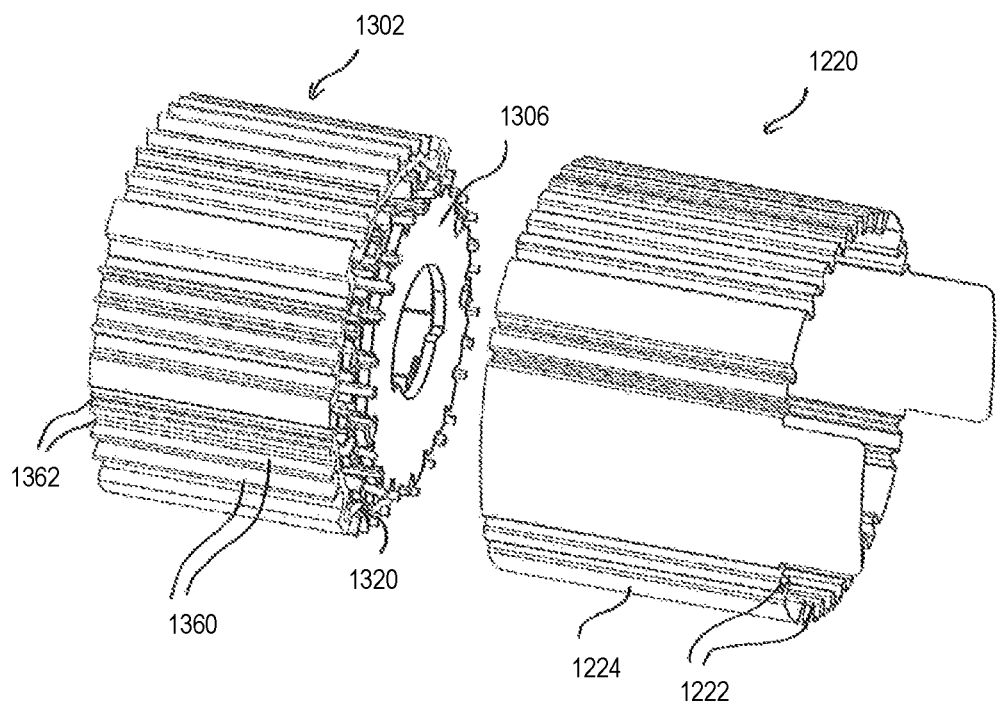
FIG. 93 depicts a perspective view of heatshield and heat sink housing the stator and circuit board, according to an embodiment.
Figure 94:
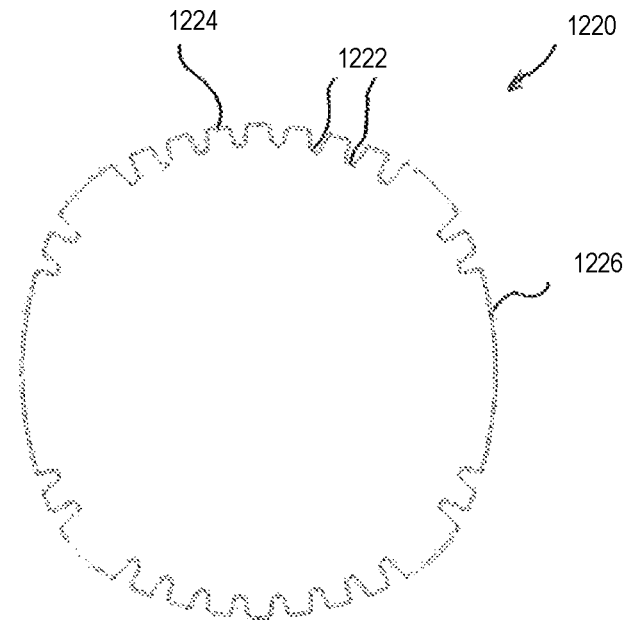
FIG. 94 depicts an axial view of heatshield alone, according to an embodiment.
Figure 95:
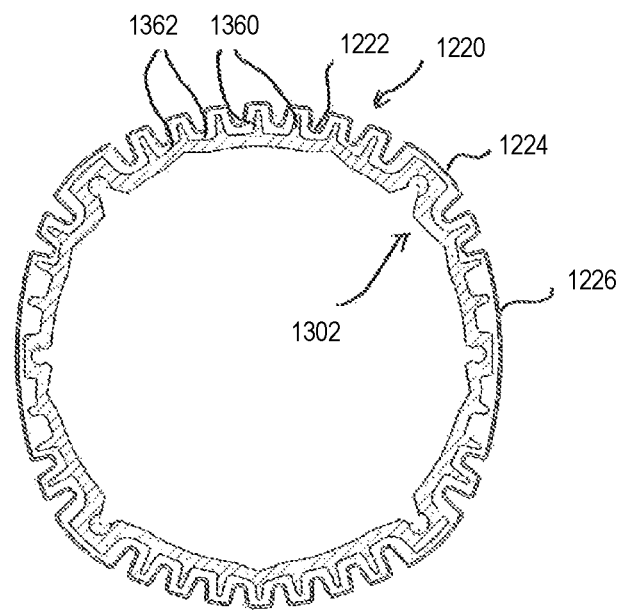
FIG. 95 depicts an axial view of heat sink disposed within heatshield, according to an embodiment.

Referring to FIGS. 93-95, an exemplary arrangement of heat sink 1302 and heatshield 1220 is described herein. FIG. 93 depicts a perspective view of heatshield 1220 and heat sink 1302 housing the stator 1320 and circuit board 1306. FIG. 94 depicts an axial view of heatshield 1220 alone. FIG. 95 depicts an axial view of heat sink 1302 disposed within heatshield 1220.

In an embodiment, heat sink 1302 is provided for external cooling of the stator 1320, as described in previous embodiments. In an embodiment, heat sink 1302 includes a generally cylindrical body surrounding the stator 1320. Heat sink 1302 includes a cylindrical opening that is sized to fittingly receive the stator 1320 therein, with the inner surface of the heat sink 1302 being in thermal and physical contact with the outer surface of the stator 1320. Since heat sink 1302 covers substantially the entire periphery of the stator 1320, it provides for optimal heat transfer from the stator 1320. Heat sink 1302 may be constructed according to the embodiments described above, particularly a fully-enveloping heat sink include a series of outer longitudinal fins 1360 forming longitudinal air channels 1362 therebetween on its outer surface.

In an embodiment, air channels 1362 are arranged to guide air flow generated by fan 1304 along the outer surface of heat sink 1302 parallel to the longitudinal axis of the motor 1300. Fins 1360 increase the outer surface area of the heat sink 1302, while passage of cooling air through the air channels 1362 provides for improved heat dissipation from the heat sink 1302.

In an embodiment, heatshield 1220 is sized to receive the heat sink 1302 therein with a small airgap in between. The airgap allows cooling air to travel along the outer surface of heat sink 1302, including inside the air channels 1362 in the direction of the fan 1304, while the heatshield 1220 shields the user from direct contact with the heat sink 1302.

In an embodiment, heatshield 1220 may be made of thermally insulating material such as plastic. Alternatively, and preferably, heatshield 1220 may be made of thermally conductive material such as metal to provide some heat transfer through the heatshield 1220.

In an embodiment, heatshield 1220 may include an annular body with a fully circular inner and outer surface. Alternatively, in an embodiment, heatshield 1220 may include longitudinal extruded channels 1222 projecting inwardly from its main body 1224. Extruded channels 1222 of heatshield 1220 are sized to project inwardly into air channels 1362 of the heat sink 1302. This arrangement provides a uniform air gap (i.e., of substantially consistent width) between the heat sink 1302 and heatshield 1220. In an embodiment, heatshield 1220 may include non-extruded portions 1226 in addition to extruded channels 1222 as needed to improve the power tool 1200 ergonomics. The airgap between non-extruded portions 1226 and the heat sink 1302 is not uniform. In an embodiment, the airgap between the heat sink 1302 and heatshield 1220 results in a temperature differential of at least 10 degrees Celsius between the heat sink 1302 and heatshield 1220, making the heatshield 1220 more tolerable for a user to touch.

In an embodiment, heatshield 1220 is sized with outer geometry to provide a substantially uniform profile on the power tool 1200 between the handle 1202 and the gear case 1204.

Figure 96:
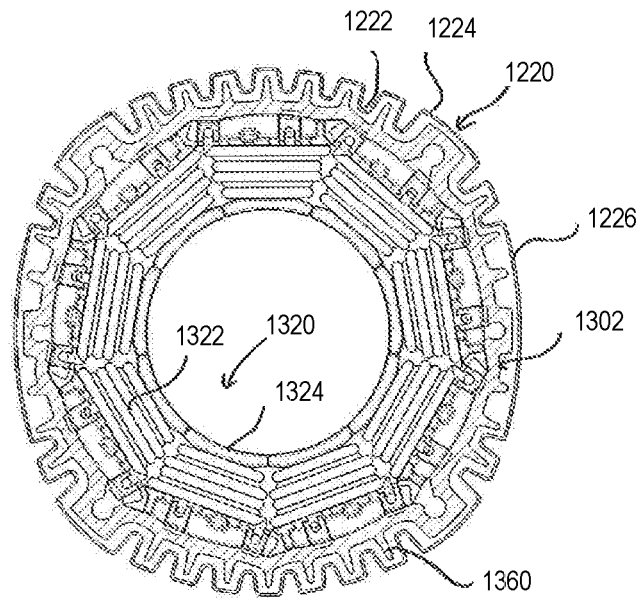
FIG. 96 depicts an axial view of stator and heat sink disposed within heatshield, according to an embodiment.
Figure 97:
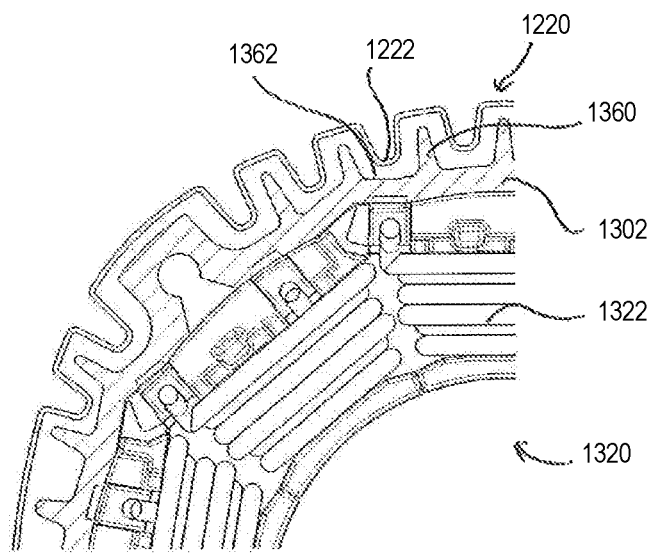
FIG. 97 depicts a zoomed-in axial view of stator and heat sink disposed within heatshield, according to an embodiment.

FIG. 96 depicts an axial view of stator 1320 and heat sink 1302 disposed within heatshield 1220. FIG. 97 depicts a zoomed-in axial view of stator 1320 and heat sink 1302 disposed within heatshield 1220. As shown herein, in an embodiment, stator 1320 is provided with segmented design as described earlier in this disclosure, and includes a series of stator windings 1322 wound over discrete stator segments 1324. Stator segments 1324 are radially constrained and held together by the heat sink 1302, while the air gap between the heat sink 1302 and heatshield 1220 allows for air flow to cool the stator 1320 externally outside the heat sink 1302.

It should be noted that, while in this exemplary embodiment, the stator 1320 is segmented and fully enveloped by the heat sink 1302, the teachings of this embodiment may be applied to other stator/heatsink designs. For example, the stator may be a self-contained assembly having a core, and the heat sink may partially or fully envelope the stator. Furthermore, the heat sink may be provided separately from the stator, or integrally with the stator core. In an embodiment, the heat sink may include outer fins, or may be provided with other geometry. The heatshield 1220 may be provided as an outer sleeve to any such stator/heatsink designs to provide an air channel outside the periphery of the heat sink for cooling the stator.

Figure 98:
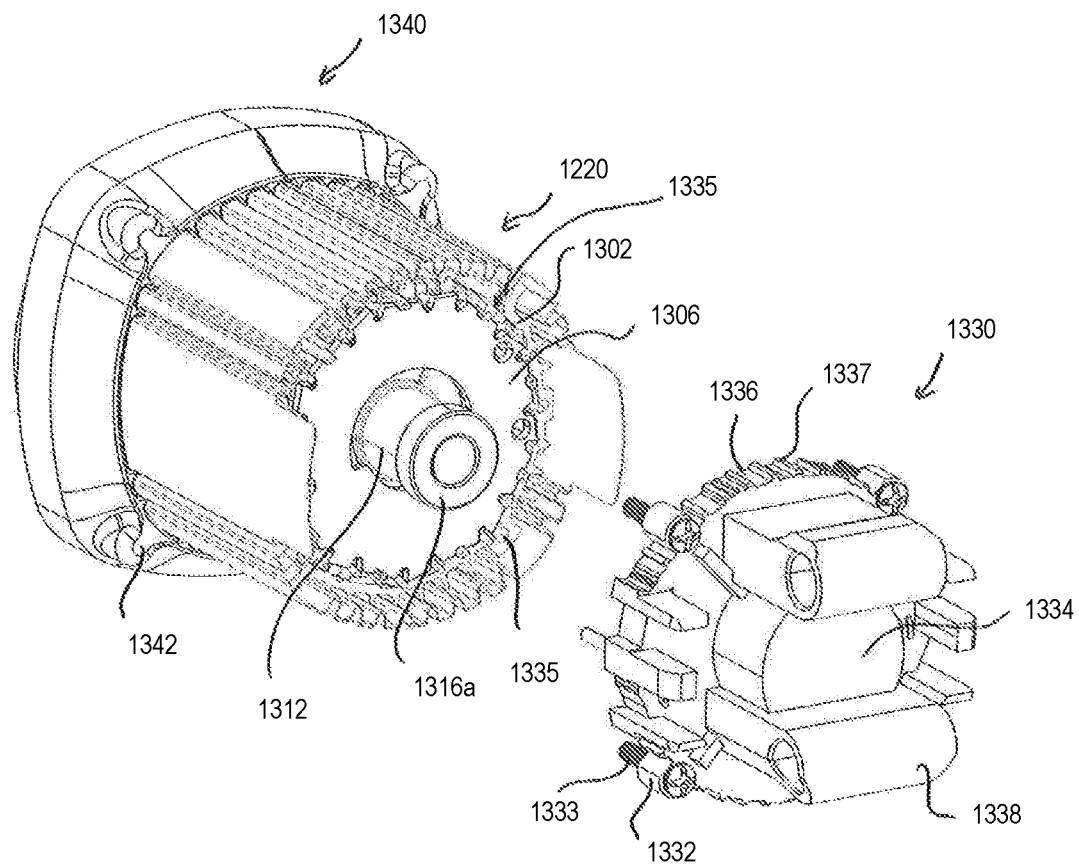
FIGS. 98 and 99 depict partially exploded and zoomed-in perspective views of a rear end cap received at an end of the heatshield on one end of the motor assembly, according to an embodiment.

Referring to the partially exploded view of FIG. 98, and with continued reference to FIGS. 89-92, in an embodiment, rear end cap 1330 is provided on one end of the motor assembly 1300 for mounting the motor assembly 1300 to the power tool handle 1202. Rear end cap 1330 is sized to mate with an end of the heat sink 1302. Rear end cap 1330 includes peripheral receptacles 1332 that receive a series of fasteners 1333 for fastening the rear end cap 1330 to the end of the heat sink 1302. The fasteners 1333 may be fastened into corresponding threaded receptacles 1335 in the heat sink 1302. Alternatively, the fasteners 1333 may be fastened into the heat sink air channels 1362. Front end cap 1330 further includes a center bearing pocket 1334 that receives the rear bearing 1316a of the rotor shaft 1312. In an embodiment, a rear portion of the rear end cap 1330 is provided with a pair of passthrough bosses 1338 for attachment to the tool handle 1202.

Figure 99:
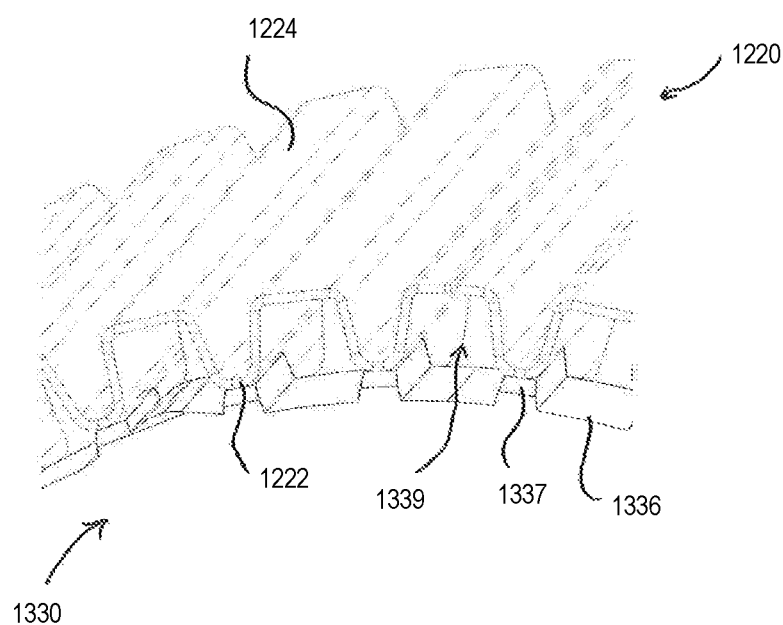

In an embodiment, as shown in FIG. 98 and the zoomed-in perspective view of FIG. 99, an outer periphery 1336 of the rear end cap 1330 is sized to be fittingly received inside the heatshield 1220 in contact with extruded channels 1222. In an embodiment, outer periphery 1336 of the rear end cap 1330 is provided with peripheral teeth 1337 arranged to come into contact with inner radial surfaces of the of the extruded channels 1222. The diameter of the outer periphery 1336 of the rear end cap 1330, or at the very least the diameter of the peripheral teeth 1337 of the rear end cap 1330, is larger than the diameter of the heat sink 1302. As the rear end cap 1330 is fastened to the heat sink 1302 by fasteners 1333, the rear end cap 1330 maintains a radial small airgap between the heat sink 1302 and the heatshield 1220 on its end. This airgap, in an embodiment, may be in the range of 0.5 to 10 mm depending on the size of the motor and its thermal requirements. In an embodiment, openings 1339 formed between adjacent peripheral teeth 1337 and extruded channels 1222 form air inlets for airflow generated by the motor fan 1304 to enter the radial airgap between the heat sink 1302 and the heatshield 1220.

In an embodiment, openings 1339 may be aligned to receive air from within the handle 1202 of the power tool 1200 for improved cooling of the electronic components within the handle 1202. Alternatively, openings 1339 may be provided to suction in air from the outside environment.

Figure 100:
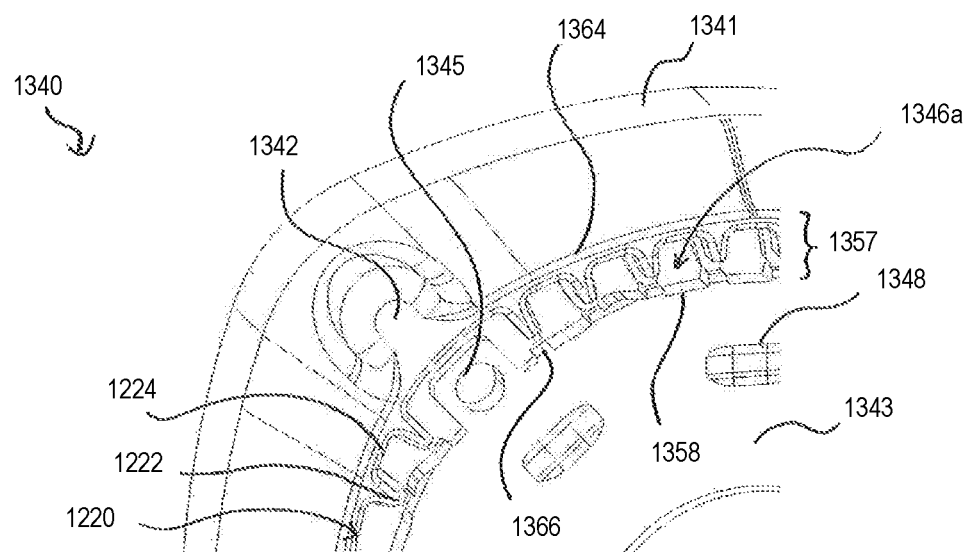
FIGS. 100 and 101 depict rear zoomed-in axial view and a front axial view of a front end cap of the motor assembly, according to an embodiment.
Figure 101:
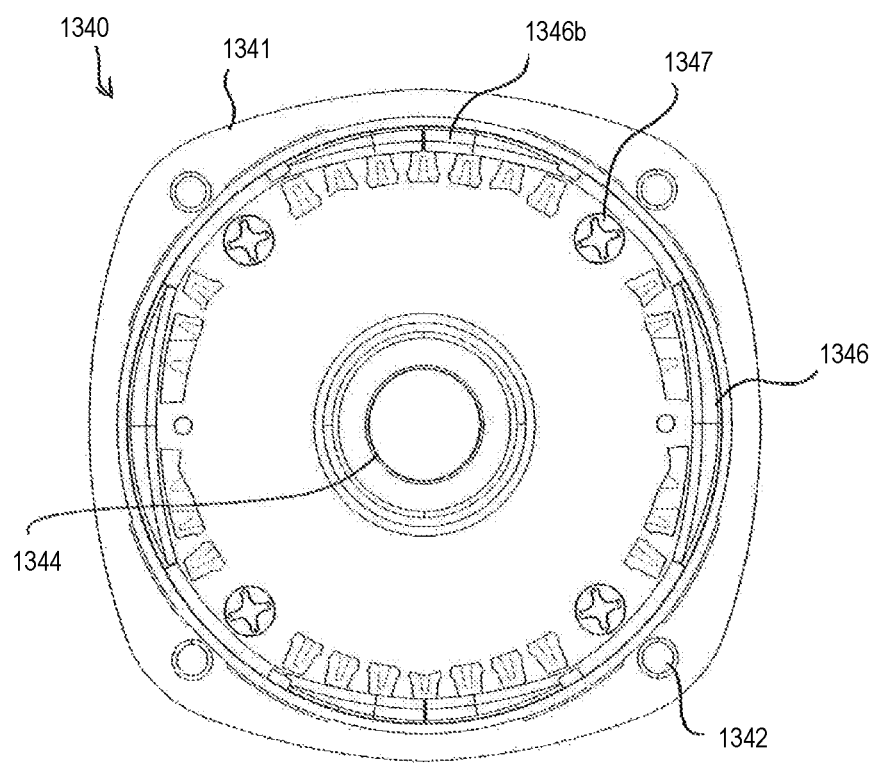

FIG. 100 depicts a rear zoomed-in axial view of the front end cap 1340, according to an embodiment. FIG. 101 depicts a front axial view of the front end cap 1340, according to an embodiment. As shown in these figures, and with continued reference to FIGS. 91 and 92, in an embodiment, front end cap 1340 is provided on an end of the motor assembly 1300 opposite the rear end cap 1330. Front end cap 1340 includes a main annular body 1341 provided with outer receptacles 1342 for fastening the front end cap 1340 to the gear case 1204 of the power tool 1200 via fasteners (not shown). Front end cap 1340 also includes a disc-shaped inner body 1343 arranged around a through-hole 1344 of the front end cap 1340. Inner body 1343 is provided with inner receptacles 1345 for fastening the front end cap 1340 to the heat sink 1302 via fasteners 1347. Fasteners 1347 may be fastened into corresponding threaded receptacles in the heat sink 1302, or within the air channels 1362. In an embodiment, through-hole 1344 is provided as a bearing support for front bearing 1316b of the rotor shaft 1312. Alternatively, through-hole 1344 may be a pass-through opening through which the rotor shaft 1312 freely extends and is piloted in the gear case 1204 via a driver 1317.

In an embodiment, front end cap 1340 may also be provided with a series of peripheral openings forming air inlets 1346a between the main annular body 1341 and the inner body 1343. Air inlets 1346a are aligned with the radial airgap between the heat sink 1302 and the heatshield 1220 to receive air traversing through the radial airgap. Air inlets 1346a on the rear side of the front end cap 1340 are guided through the front air cap 1340 to air conduits 1346b on the front side of the front end cap 1340. A baffle 1356 direct air from the air conduits 1346b towards a middle portion of the fan 1304. Fan 1304 includes blades 1355 that generate air flow that enters though the openings 1399 (between the heatshield 1220 and the rear end cap 1330), passes axially through the radial air gap (between the heatshield 1220 and the heat sink 1302), and exists the radial air gap through the air inlets 1346a, and are guided from the air conduits 1346b in the direction of the fan 1304. In an embodiment, the air flow generated by the fan 1304 may be expelled out of air exhaust ports (not shown) in the gear case 1204.

In an embodiment, a rear face of the inner body 1343 may be provided with a series of recesses 1348 around the through-hole 1344. Recesses 1348 are positioned where the ends of the stator windings 1322 facing the inner body 1343, to account with tolerances associated with the stator windings 1322.

In an embodiment, on the rear face of the front end cap 1340 facing the heatshield 1220, annular area 1357 between the inner body 1343 and the main annular body 1341 is axially recessed to receive the end of the heatshield 1220 therein. This annular area 1357, which is formed by an outer periphery 1358 of the inner body 1343 and an inner rim 1364 of the main annular body 1341, is sized to form-fittingly receive the end of the heatshield 1220 therein. The view of FIG. 100 depicts a cut-out portion of the end of the heatshield 1220 received within the annular area 1357 of the front end cap 1340.

In an embodiment, outer periphery 1358 of the inner body 1343 includes peripheral teeth 1366 arranged to come into contact with inner radial surfaces of the of the extruded channels 1222 of the heatshield 1220. The diameter of the outer periphery 1358 of the inner body 1343, or at the very least the diameter of the peripheral teeth 1366 of the inner body 1343, is larger than the diameter of the heat sink 1302. As the front end cap 1340 is fastened to the heat sink 1302 by fasteners 1347, the front end cap 1340, similarly to the rear end cap 1330, maintains the radial small airgap between the heat sink 1302 and the heatshield 1220 on its end.

In an embodiment, the heat sink 1302 and rear and front end caps 1330 and 1340 together substantially encapsulate and seal the stator 1320 and rotor 1310 from the outside environment, preventing or at the very least minimizing air flow, and in particular contaminated air flow, from entering the magnetic areas of the motor assembly 1300. In an embodiment, additional sealants, such as for example, gaskets, adhesive, etc. may be applied as needed to the rear and front end caps 1330 and 1340 to form a water-sealed containment around the magnetic areas of the motor assembly 1300.

By form-fitting insertion of the stator segments 1324 within the heat sink 1302, via for example press-fitting, the heat sink 1302 provides radial as well as axial constraint to hold the stator segments 1324 together around the rotor 1310 with a high level of precision. Moreover, securing the rear and front end caps 1330 and 1340 to the ends of the heat sink 1302 provides axial and radial retention between the rotor 1310 and the stator 1320 within the heat sink 1302, while maintaining a small radial gap between the rotor 1310 and the stator 1320. Disposition of the rear end cap 1340 and the inner body 1343 of the front end cap 1340 within the two ends of the heatshield 1220 also provides axial and radial retention between the heat sink 1302 and the heatshield 1220, while maintaining the radial gap therebetween.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

LIST OF NUMERICAL REFERENCES

Power Tool 100
Tool Housing 102
Clam Shells 102a, 102b
Motor housing 104
Handle portion 106
Transmission assembly 108
Integrated switch module 110
Chuck 112
Trigger switch 114
Battery terminal 116
Battery receptacle 118
Heat Sink 120a, 120b
Fan 130
Air intakes 140
Side openings 142a, 142b
End cap 150
Motor assembly 200
BLDC motor 202
Rotor 210
Rotor shaft 212
Rotor lamination stack 214
Gear 216

Permeant magnets 218
Rotor bearings 218a, 218b
Stator 220
Stator windings 222
Stator lamination stack 224
Stator end insulator 226
Front bearing support str. 230
Radial plate 232
Bearing pocket 234
Arcuate walls 236
Peripheral opening 237
Guide channel 238
Rear bearing support str. 240
Radial plate 242
Bearing pocket 244
Positional sensor board 246
Positional sensors 248
Sense magnet ring 250
Rotor end cap 252
Connector 254
Arcuate wall 256
Peripheral opening 257
Guide channel 258
Fastener 260
Rail guide 261
Inner surface 262
Outer surface 264
Fins 266
Air channels 268
Fan blades 270
Fan plate 272
First fan surface 274
Second fan surface 276
Air inlets 280
Radial wall 282
Side cap 284
Stator core 290
Stator teeth 292
Stator slots 294
Impact Driver 295
Gap 296
Hammer drill 297
Cutter 298
Reciprocating saw 299
Power Tool 300
Tool housing 302
Handle portion 304
Battery receptacle 306
Saw blade 308
Saw guard 310
Motor assembly 400
Heat sink 402
Fan 404
Electronic switch module 406
Rotor 410
Rotor shaft 412
Rotor lamination stack 414
Driver 416
Permeant magnets 418
Rotor bearings 419
Stator 420
Stator windings 422
Stator lamination stack 424
Stator end insulator 426
Motor terminals 428
Front end cap 430
Receptacles 432
Through-hole 434
Rear end cap 440
Air intakes 442
Peripheral wall 444
Fan blades 450
Sense magnet ring 452
Positional sensors 454
Longitudinal fins 460
Air channels 462
Piloting features 464
Radial wall 465
Bearing pocket 466
Opening 468
Mounting structure 470
Through-holes 472
Fasteners 474
Center receptacle 476
Power tool 500
Handle portion 502
Gear case 504
Radial air intakes 506
Front end 512
Rear end 514
Air vents 516
Reciprocating saw 520
Hammer 522
Motor assembly 600
Heat sink 602
Fins 604
Air channels 606
Switch receptacle 608
Rotor 610
Rotor shaft 612
Rotor lamination stack 614
Front bearing 616
Rear bearing 618
Stator 620
Stator lamination 624
Connector 626
Front bearing support str. 630
Front bearing pocket 632
Connector tab 634
Fasteners 636
Front seal 638
Rear bearing support str. 640
Rear bearing pocket 642
Positional sensor board 644
Fasteners 646
Rear seal 648
Fan 650
Fan blades 652
Rear end cap 660
Air inlets 662
Fasteners 664
Peripheral wall 666
Motor assembly 700
Heat sink 702
Fins 704
End portion 706
Recessed side surface 708
Coating 710
Front bearing support str. 730
Rear bearing support str. 760
Power tool 800
Handle 802
Gear case 804
Battery pack 806

Trigger mechanism 808
Output spindle 810
Motor assembly 900
Heat sink 902
Fan 904
Circuit board 906
Positional sensors 908
Rotor 910
Rotor shaft 912
Rotor lamination stack 914
Rotor bearing 916*a*, 916*b*
Driver 917
Permeant magnets 918
Stator 920
Stator winding 922
Stator segment 924
Rear end cap 930
Receptacles 932
Bearing pocket 934
Outer periphery 936
Passthrough bosses 938
Front end cap 940
Outer receptacles 942
Through-hole 944
Inner receptacles 945
Air inlets 946
Recesses 948
Fan blades 950
Sense magnet ring 952
Longitudinal fins 960
Air channels 962
Segment core 970
Segment pole 972
Pole end 974
Legs 975
Insulating member 976
End insulators 977, 978
Winding terminal 979
Axial retainer 980
Opening 982
Opening 984
Space 986
Flat inner surface 988
Arch-shaped portion 990
First end 991
Flat edge portions 992
Second end 993
Notch 994
Recessed portion 995
Sectors 996
Arched portion 997
Flat side portion 998
Notches 999
Through-hole 1000
Notches 1002
Slots 1004
Stator assembly 1100
Heat sink 1102
Stator core 1110
Stator pole 1112
Pole tip 1114
Stator piece 1120
Stator windings 1122
Winding terminal 1124
Elongate opening 1126
Radial wall 1127
Side openings 1128
Thermal filler material 1129
Outer ring 1130
Slots 1132
Power tool 1200
Handle 1202
Gear case 1204
Battery pack 1206
Trigger mechanism 1208
Output spindle 1210
Heatshield 1220
Extruded channels 1222
Main body 1224
Non-extruded portions 1226
Motor assembly 1300
Heat sink 1302
Fan 1304
Circuit board 1306
Rotor 1310
Rotor shaft 1312
Rotor lamination stack 1314
Rotor bearing 1316*a*, 916*b*
Driver 1317
Stator 1320
Stator winding 1322
Stator segment 1324
Rear end cap 1330
Receptacles 1332
Fasteners 1333
Bearing pocket 1334
Threaded receptacles 1335
Outer periphery 1336
Peripheral teeth 1337
Passthrough bosses 1338
Openings 1339
Front end cap 1340
Main annular body 1341
Outer receptacles 1342
Inner body 1343
Through-hole 1344
Inner receptacles 1345
Air inlets 1346*a*
Air conduits 1346*b*
Fasteners 1347
Recesses 1348
Blades 1350
Sense magnet ring 1352
Baffle 1356
Annular area 1357
Outer periphery 1358
Longitudinal fins 1360
Air channels 1362
Inner rim 1364
Peripheral teeth 1366

The invention claimed is:

1. A power tool comprising an output shaft driven by a motor assembly,
  the motor assembly comprising:
    a stator including a lamination stack forming a stator core, a plurality of stator teeth inwardly projecting from the stator core, and a plurality of stator windings wound around the plurality of stator teeth in connected in phases;
    a rotor rotatably disposed within the stator to magnetically interact with the plurality of stator windings, the rotor having a shaft, a rotor lamination stack mounted on the shaft, and at least one bearing mounted on the shaft;

an external heat sink including a main body defining a hollow opening form-fittingly receiving the stator therein in thermal communication with the stator; and a bearing support structure having a main body radially arranged and secured the main body of the external heat sink, the bearing support structure forming a central bearing pocket arranged to receive and support the bearing of the rotor therein to axially and radially support the rotor with respect to the heat sink;

the power tool further comprising: an elongate housing including a handle portion and a front end secured to one end of the external heat sink; and a gear case supporting at least one transmission or gear component and a front end secured to another end of the external heat sink, wherein an outer profile of the external heat sink is generally in line with the front end of elongate housing and the front end of the gear case.

2. The power tool of claim 1, wherein the bearing support structure is formed as a radial wall projecting integrally from an inner surface of the external heat sink within the hollow opening.

3. The power tool of claim 1, wherein an outer periphery of the bearing support structure is form-fittingly received within the hollow opening of the external heat sink.

4. The power tool of claim 3, further comprising a seal arranged between the outer periphery of the bearing support structure and the main body of the external heat sink.

5. The power tool of claim 1, wherein the bearing support structure is further secured to the stator via a plurality of axially-arranged fasteners.

6. The power tool of claim 1, further comprising a fan disposed on the shaft on a side of the bearing support structure opposite the stator.

7. The power tool of claim 6, wherein the fan comprises a radial body disposed within the hollow opening of the external heat sink and a plurality of fan blades extending from the radial body outside the main body of the external heat sink to generate an airflow on an outer surface of the external heat sink.

8. The power tool of claim 6, further comprising an electronic module including a plurality of hall sensors arranged to detect a rotary position of the rotor, the electronic module including a radial body received within the hollow opening of the heat sink and supported by the heat sink on the same side of the bearing support structure as the fan.

9. The power tool of claim 6, further comprising a rear end cap including a radial body having a plurality of air intakes and a peripheral wall arranged to secure the radial body to the external heat sink.

10. The power tool of claim 1, wherein the bearing support structure is disposed at an end of the heat sink and fastened to the stator.

11. The power tool of claim 1, wherein the external heat sink comprises a plurality of fins forming air channels therebetween extending longitudinally along an outer surface of the external heat sink, wherein outer ends of the plurality of fins form the outer profile of the external heat sink.

12. The power tool of claim 11, further comprising a fan disposed on the shaft on a side of the bearing support structure opposite the stator, wherein the elongate housing comprises a plurality of air intakes at the front end in line with the fan, the fan generating a radial airflow through the air intakes and directing the airflow axially through the air channels.

* * * * *